(12) United States Patent
Shumard et al.

(10) Patent No.: US 12,028,678 B2
(45) Date of Patent: Jul. 2, 2024

(54) PROXIMITY MICROPHONE

(71) Applicant: Shure Acquisition Holdings, Inc., Niles, IL (US)

(72) Inventors: Brent Robert Shumard, Mount Prospect, IL (US); Mark Gilbert, Palatine, IL (US); Emily Ann Wigley, Chicago, IL (US); Roger Stephen Grinnip, III, Lake Zurich, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 263 days.

(21) Appl. No.: 17/086,082

(22) Filed: Oct. 30, 2020

(65) Prior Publication Data

US 2021/0136487 A1 May 6, 2021

Related U.S. Application Data

(60) Provisional application No. 62/929,204, filed on Nov. 1, 2019.

(51) Int. Cl.
*H04R 1/32* (2006.01)
*G06F 3/16* (2006.01)
(Continued)

(52) U.S. Cl.
CPC .......... *H04R 1/326* (2013.01); *G06F 3/167* (2013.01); *G10L 15/22* (2013.01); *G10L 15/28* (2013.01);
(Continued)

(58) Field of Classification Search
CPC .. H04R 1/326; H04R 2201/003; H04R 1/406; H04R 3/005; H04R 2201/401;
(Continued)

(56) References Cited

U.S. PATENT DOCUMENTS

| 1,535,408 A | 4/1925 | Fricke |
| 1,540,788 A | 6/1925 | McClure |

(Continued)

FOREIGN PATENT DOCUMENTS

| CA | 2359771 | 4/2003 |
| CA | 2475283 | 1/2005 |

(Continued)

OTHER PUBLICATIONS

Stergiopoulos, Advanced Beamformers (Year: 2008).*
(Continued)

*Primary Examiner* — Carolyn R Edwards
*Assistant Examiner* — Kuassi A Ganmavo
(74) *Attorney, Agent, or Firm* — Neal, Gerber & Eisenberg LLP

(57) ABSTRACT

Embodiments include a microphone array comprising a first plurality of directional microphone elements arranged in a first cluster formed by directing a front face of said microphone elements towards a center of the first cluster, and a second plurality of directional microphone elements arranged in a second cluster formed by directing a front face of said elements away from a center of the second cluster, wherein the first cluster is disposed vertically above the second cluster. Also provided is a microphone comprising a first microphone array comprising a plurality of directional microphone elements arranged in close proximity to each other and configured to capture near-field sounds within a first range of frequencies, and a second microphone array disposed concentrically around the first microphone array, the second array comprising a plurality of omnidirectional microphone elements configured to capture near-field sounds within a second range of frequencies higher than the first range.

17 Claims, 11 Drawing Sheets

(51) Int. Cl.
  *G10L 15/22* (2006.01)
  *G10L 15/28* (2013.01)
  *G10L 25/51* (2013.01)
  *H04R 1/40* (2006.01)
  *H04R 3/00* (2006.01)

(52) U.S. Cl.
  CPC .............. *G10L 25/51* (2013.01); *H04R 1/406* (2013.01); *H04R 3/005* (2013.01); *H04R 2201/003* (2013.01); *H04R 2201/025* (2013.01); *H04R 2201/401* (2013.01); *H04R 2430/21* (2013.01)

(58) Field of Classification Search
  CPC .......... H04R 2430/21; H04R 2201/025; G10L 15/22; G10L 25/51; G10L 15/28; G06F 3/167
  See application file for complete search history.

(56) References Cited

U.S. PATENT DOCUMENTS

| | | |
|---|---|---|
| 1,965,830 A | 7/1934 | Hammer |
| 2,075,588 A | 3/1937 | Meyers |
| 2,113,219 A | 4/1938 | Olson |
| 2,164,655 A | 7/1939 | Kleerup |
| D122,771 S | 10/1940 | Doner |
| 2,233,412 A | 3/1941 | Hill |
| 2,268,529 A | 12/1941 | Stiles |
| 2,343,037 A | 2/1944 | Adelman |
| 2,377,449 A | 6/1945 | Prevette |
| 2,481,250 A | 9/1949 | Schneider |
| 2,521,603 A | 9/1950 | Prew |
| 2,533,565 A | 12/1950 | Eichelman |
| 2,539,671 A | 1/1951 | Olson |
| 2,777,232 A | 1/1957 | Kulicke |
| 2,828,508 A | 4/1958 | Labarre |
| 2,840,181 A | 6/1958 | Wildman |
| 2,882,633 A | 4/1959 | Howell |
| 2,912,605 A | 11/1959 | Tibbetts |
| 2,938,113 A | 5/1960 | Schnell |
| 2,950,556 A | 8/1960 | Larios |
| 3,019,854 A | 2/1962 | Obryant |
| 3,132,713 A | 5/1964 | Seeler |
| 3,143,182 A | 8/1964 | Sears |
| 3,160,225 A | 12/1964 | Sechrist |
| 3,161,975 A | 12/1964 | McMillan |
| 3,205,601 A | 9/1965 | Gawne |
| 3,239,973 A | 3/1966 | Hannes |
| 3,240,883 A | 3/1966 | Seeler |
| 3,310,901 A | 3/1967 | Sarkisian |
| 3,321,170 A | 5/1967 | Vye |
| 3,509,290 A | 4/1970 | Mochida |
| 3,573,399 A | 4/1971 | Schroeder |
| 3,657,490 A | 4/1972 | Scheiber |
| 3,696,885 A | 10/1972 | Grieg |
| 3,755,625 A | 8/1973 | Maston |
| 3,828,508 A | 8/1974 | Moeller |
| 3,857,191 A | 12/1974 | Sadorus |
| 3,895,194 A | 7/1975 | Fraim |
| 3,906,431 A | 9/1975 | Clearwaters |
| D237,103 S | 10/1975 | Fisher |
| 3,936,606 A | 2/1976 | Wanke |
| 3,938,617 A | 2/1976 | Forbes |
| 3,941,638 A | 3/1976 | Horky |
| 3,992,584 A | 11/1976 | Dugan |
| 4,007,461 A | 2/1977 | Luedtke |
| 4,008,408 A | 2/1977 | Kodama |
| 4,029,170 A | 6/1977 | Phillips |
| 4,032,725 A | 6/1977 | McGee |
| 4,070,547 A | 1/1978 | Dellar |
| 4,072,821 A | 2/1978 | Bauer |
| 4,096,353 A | 6/1978 | Bauer |
| 4,127,156 A | 11/1978 | Brandt |
| 4,131,760 A | 12/1978 | Christensen |
| 4,169,219 A | 9/1979 | Beard |
| 4,184,048 A | 1/1980 | Alcaide |
| 4,198,705 A | 4/1980 | Massa |
| D255,234 S | 6/1980 | Wellward |
| D256,015 S | 7/1980 | Doherty |
| 4,212,133 A | 7/1980 | Lufkin |
| 4,237,339 A | 12/1980 | Bunting |
| 4,244,096 A | 1/1981 | Kashichi |
| 4,244,906 A | 1/1981 | Heinemann |
| 4,254,417 A | 3/1981 | Speiser |
| 4,275,694 A | 6/1981 | Nagaishi |
| 4,296,280 A | 10/1981 | Richie |
| 4,305,141 A | 12/1981 | Massa |
| 4,308,425 A | 12/1981 | Momose |
| 4,311,874 A | 1/1982 | Wallace, Jr. |
| 4,330,691 A | 5/1982 | Gordon |
| 4,334,740 A | 6/1982 | Wray |
| 4,365,449 A | 12/1982 | Liautaud |
| 4,373,191 A | 2/1983 | Fette |
| 4,393,631 A | 7/1983 | Krent |
| 4,414,433 A | 11/1983 | Horie |
| 4,429,850 A | 2/1984 | Weber |
| 4,436,966 A | 3/1984 | Botros |
| 4,449,238 A | 5/1984 | Lee |
| 4,466,117 A | 8/1984 | Goerike |
| 4,485,484 A | 11/1984 | Flanagan |
| 4,489,442 A | 12/1984 | Anderson |
| 4,518,826 A | 5/1985 | Caudill |
| 4,521,908 A | 6/1985 | Miyaji |
| 4,566,557 A | 1/1986 | Lemaitre |
| 4,593,404 A | 6/1986 | Bolin |
| 4,594,478 A | 6/1986 | Gumb |
| D285,067 S | 8/1986 | Delbuck |
| 4,625,827 A | 12/1986 | Bartlett |
| 4,653,102 A | 3/1987 | Hansen |
| 4,658,425 A | 4/1987 | Julstrom |
| 4,669,108 A | 5/1987 | Deinzer |
| 4,675,906 A | 6/1987 | Sessler |
| 4,693,174 A | 9/1987 | Anderson |
| 4,696,043 A | 9/1987 | Iwahara |
| 4,712,231 A | 12/1987 | Julstrom |
| 4,741,038 A | 4/1988 | Elko |
| 4,752,961 A | 6/1988 | Kahn |
| 4,805,730 A | 2/1989 | O'Neill |
| 4,815,132 A | 3/1989 | Minami |
| 4,860,366 A | 8/1989 | Fukushi |
| 4,862,507 A | 8/1989 | Woodard |
| 4,866,868 A | 9/1989 | Kass |
| 4,881,135 A | 11/1989 | Heilweil |
| 4,888,807 A | 12/1989 | Reichel |
| 4,903,247 A | 2/1990 | Van Gerwen |
| 4,923,032 A | 5/1990 | Nuernberger |
| 4,928,312 A | 5/1990 | Hill |
| 4,969,197 A | 11/1990 | Takaya |
| 5,000,286 A | 3/1991 | Crawford |
| 5,038,935 A | 8/1991 | Wenkman |
| 5,058,170 A | 10/1991 | Kanamori |
| 5,088,574 A | 2/1992 | Kertesz, III |
| D324,780 S | 3/1992 | Sebesta |
| 5,121,426 A | 6/1992 | Baumhauer |
| D329,239 S | 9/1992 | Hahn |
| 5,189,701 A | 2/1993 | Jain |
| 5,204,907 A | 4/1993 | Staple |
| 5,214,709 A | 5/1993 | Ribic |
| 5,224,170 A | 6/1993 | Waite, Jr. |
| D340,718 S | 10/1993 | Leger |
| 5,289,544 A | 2/1994 | Franklin |
| D345,346 S | 3/1994 | Alfonso |
| D345,379 S | 3/1994 | Chan |
| 5,297,210 A | 3/1994 | Julstrom |
| 5,322,979 A | 6/1994 | Cassity |
| 5,323,459 A | 6/1994 | Hirano |
| 5,329,593 A | 7/1994 | Lazzeroni |
| 5,335,011 A | 8/1994 | Addeo |
| 5,353,279 A | 10/1994 | Koyama |
| 5,359,374 A | 10/1994 | Schwartz |
| 5,371,789 A | 12/1994 | Hirano |
| 5,383,293 A | 1/1995 | Royal |
| 5,384,843 A | 1/1995 | Masuda |

(56) References Cited

U.S. PATENT DOCUMENTS

| | | |
|---|---|---|
| 5,396,554 A | 3/1995 | Hirano |
| 5,400,413 A | 3/1995 | Kindel |
| D363,045 S | 10/1995 | Phillips |
| 5,473,701 A | 12/1995 | Cezanne |
| 5,509,634 A | 4/1996 | Gebka |
| 5,513,265 A | 4/1996 | Hirano |
| 5,525,765 A | 6/1996 | Freiheit |
| 5,550,924 A | 8/1996 | Helf |
| 5,550,925 A | 8/1996 | Hori |
| 5,555,447 A | 9/1996 | Kotzin |
| 5,574,793 A | 11/1996 | Hirschhorn |
| 5,602,962 A | 2/1997 | Kellermann |
| 5,633,936 A | 5/1997 | Oh |
| 5,645,257 A | 7/1997 | Ward |
| D382,118 S | 8/1997 | Ferrero |
| 5,657,393 A | 8/1997 | Crow |
| 5,661,813 A | 8/1997 | Shimauchi |
| 5,673,327 A | 9/1997 | Julstrom |
| 5,687,229 A | 11/1997 | Sih |
| 5,706,344 A | 1/1998 | Finn |
| 5,715,319 A | 2/1998 | Chu |
| 5,717,171 A | 2/1998 | Miller |
| D392,977 S | 3/1998 | Kim |
| D394,061 S | 5/1998 | Fink |
| 5,761,318 A | 6/1998 | Shimauchi |
| 5,766,702 A | 6/1998 | Lin |
| 5,787,183 A | 7/1998 | Chu |
| 5,796,819 A | 8/1998 | Romesburg |
| 5,848,146 A | 12/1998 | Slattery |
| 5,870,482 A | 2/1999 | Loeppert |
| 5,878,147 A | 3/1999 | Killion |
| 5,888,412 A | 3/1999 | Sooriakumar |
| 5,888,439 A | 3/1999 | Miller |
| D416,315 S | 11/1999 | Nanjo |
| 5,978,211 A | 11/1999 | Hong |
| 5,991,277 A | 11/1999 | Maeng |
| 6,035,962 A | 3/2000 | Lin |
| 6,039,457 A | 3/2000 | O'Neal |
| 6,041,127 A | 3/2000 | Elko |
| 6,049,607 A | 4/2000 | Marash |
| D424,538 S | 5/2000 | Hayashi |
| 6,069,961 A | 5/2000 | Nakazawa |
| 6,125,179 A | 9/2000 | Wu |
| D432,518 S | 10/2000 | Muto |
| 6,128,395 A | 10/2000 | De Vries |
| 6,137,887 A | 10/2000 | Anderson |
| 6,144,746 A | 11/2000 | Azima |
| 6,151,399 A | 11/2000 | Killion |
| 6,173,059 B1 | 1/2001 | Huang |
| 6,198,831 B1 | 3/2001 | Azima |
| 6,205,224 B1 | 3/2001 | Underbrink |
| 6,215,881 B1 | 4/2001 | Azima |
| 6,266,427 B1 | 7/2001 | Mathur |
| 6,285,770 B1 | 9/2001 | Azima |
| 6,301,357 B1 | 10/2001 | Romesburg |
| 6,329,908 B1 | 12/2001 | Frecska |
| 6,332,029 B1 | 12/2001 | Azima |
| D453,016 S | 1/2002 | Nevill |
| 6,386,315 B1 | 5/2002 | Roy |
| 6,393,129 B1 | 5/2002 | Conrad |
| 6,424,635 B1 | 7/2002 | Song |
| 6,442,272 B1 | 8/2002 | Osovets |
| 6,449,593 B1 | 9/2002 | Valve |
| 6,481,173 B1 | 11/2002 | Roy |
| 6,488,367 B1 | 12/2002 | Debesis |
| D469,090 S | 1/2003 | Tsuji |
| 6,505,057 B1 | 1/2003 | Finn |
| 6,507,659 B1 | 1/2003 | Iredale |
| 6,510,919 B1 | 1/2003 | Roy |
| 6,526,147 B1 | 2/2003 | Rung |
| 6,556,682 B1 | 4/2003 | Gilloire |
| 6,592,237 B1 | 7/2003 | Pledger |
| 6,622,030 B1 | 9/2003 | Romesburg |
| D480,923 S | 10/2003 | Neubourg |
| 6,633,647 B1 | 10/2003 | Markow |
| 6,665,971 B2 | 12/2003 | Lowry |
| 6,694,028 B1 | 2/2004 | Matsuo |
| 6,704,422 B1 | 3/2004 | Jensen |
| D489,707 S | 5/2004 | Kobayashi |
| 6,731,334 B1 | 5/2004 | Maeng |
| 6,741,720 B1 | 5/2004 | Myatt |
| 6,757,393 B1 | 6/2004 | Spitzer |
| 6,768,795 B2 | 7/2004 | Feltstroem |
| 6,868,377 B1 | 3/2005 | Laroche |
| 6,885,750 B2 | 4/2005 | Egelmeers |
| 6,885,986 B1 | 4/2005 | Gigi |
| D504,889 S | 5/2005 | Andre |
| 6,889,183 B1 | 5/2005 | Gunduzhan |
| 6,895,093 B1 | 5/2005 | Ali |
| 6,931,123 B1 | 8/2005 | Hughes |
| 6,944,312 B2 | 9/2005 | Mason |
| D510,729 S | 10/2005 | Chen |
| 6,968,064 B1 | 11/2005 | Ning |
| 6,990,193 B2 | 1/2006 | Beaucoup |
| 6,993,126 B1 | 1/2006 | Kyrylenko |
| 6,993,145 B2 | 1/2006 | Combest |
| 7,003,099 B1 | 2/2006 | Zhang |
| 7,013,267 B1 | 3/2006 | Huart |
| 7,031,269 B2 | 4/2006 | Lee |
| 7,035,398 B2 | 4/2006 | Matsuo |
| 7,035,415 B2 | 4/2006 | Belt |
| 7,050,576 B2 | 5/2006 | Zhang |
| 7,054,451 B2 | 5/2006 | Janse |
| D526,643 S | 8/2006 | Ishizaki |
| D527,372 S | 8/2006 | Allen |
| 7,092,516 B2 | 8/2006 | Furuta |
| 7,092,882 B2 | 8/2006 | Arrowood |
| 7,098,865 B2 | 8/2006 | Christensen |
| 7,106,876 B2 | 9/2006 | Santiago |
| 7,110,553 B1 * | 9/2006 | Julstrom ............... H04R 3/005 381/357 |
| 7,120,269 B2 | 10/2006 | Lowell |
| 7,130,309 B2 | 10/2006 | Pianka |
| D533,177 S | 12/2006 | Andre |
| 7,149,320 B2 | 12/2006 | Haykin |
| 7,161,534 B2 | 1/2007 | Tsai |
| 7,187,765 B2 | 3/2007 | Popovic |
| 7,203,308 B2 | 4/2007 | Kubota |
| D542,543 S | 5/2007 | Bruce |
| 7,212,628 B2 | 5/2007 | Popovic |
| D546,318 S | 7/2007 | Yoon |
| D546,814 S | 7/2007 | Takita |
| D547,748 S | 7/2007 | Tsuge |
| 7,239,714 B2 | 7/2007 | De Blok |
| D549,673 S | 8/2007 | Niitsu |
| 7,269,263 B2 | 9/2007 | Dedieu |
| D552,570 S | 10/2007 | Niitsu |
| D559,553 S | 1/2008 | Mischel |
| 7,333,476 B2 | 2/2008 | LeBlanc |
| D566,685 S | 4/2008 | Koller |
| 7,359,504 B1 | 4/2008 | Reuss |
| 7,366,310 B2 | 4/2008 | Stinson |
| 7,387,151 B1 | 6/2008 | Payne |
| 7,412,376 B2 | 8/2008 | Florencio |
| 7,415,117 B2 | 8/2008 | Tashev |
| D578,509 S | 10/2008 | Thomas |
| D581,510 S | 11/2008 | Albano |
| D582,391 S | 12/2008 | Morimoto |
| D587,709 S | 3/2009 | Niitsu |
| D589,605 S | 3/2009 | Reedy |
| 7,503,616 B2 | 3/2009 | Linhard |
| 7,515,719 B2 | 4/2009 | Hooley |
| 7,536,769 B2 | 5/2009 | Pedersen |
| D595,402 S | 6/2009 | Miyake |
| D595,736 S | 7/2009 | Son |
| 7,558,381 B1 | 7/2009 | Ali |
| 7,565,949 B2 | 7/2009 | Tojo |
| D601,585 S | 10/2009 | Andre |
| 7,651,390 B1 | 1/2010 | Profeta |
| 7,660,428 B2 | 2/2010 | Rodman |
| 7,667,728 B2 | 2/2010 | Kenoyer |
| 7,672,445 B1 | 3/2010 | Zhang |
| D613,338 S | 4/2010 | Marukos |
| 7,701,110 B2 | 4/2010 | Fukuda |

(56) References Cited

U.S. PATENT DOCUMENTS

| | | |
|---|---|---|
| 7,702,116 B2 | 4/2010 | Stone |
| D614,871 S | 5/2010 | Tang |
| 7,724,891 B2 | 5/2010 | Beaucoup |
| D617,441 S | 6/2010 | Koury |
| 7,747,001 B2 | 6/2010 | Kellermann |
| 7,756,278 B2 | 7/2010 | Moorer |
| 7,783,063 B2 | 8/2010 | Pocino |
| 7,787,328 B2 | 8/2010 | Chu |
| 7,830,862 B2 | 11/2010 | James |
| 7,831,035 B2 | 11/2010 | Stokes |
| 7,831,036 B2 | 11/2010 | Beaucoup |
| 7,856,097 B2 | 12/2010 | Tokuda |
| 7,881,486 B1 | 2/2011 | Killion |
| 7,894,421 B2 | 2/2011 | Kwan |
| D636,188 S | 4/2011 | Kim |
| 7,925,006 B2 | 4/2011 | Hirai |
| 7,925,007 B2 | 4/2011 | Stokes |
| 7,936,886 B2 | 5/2011 | Kim |
| 7,970,123 B2 | 6/2011 | Beaucoup |
| 7,970,151 B2 | 6/2011 | Oxford |
| D642,385 S | 8/2011 | Lee |
| D643,015 S | 8/2011 | Kim |
| 7,991,167 B2 | 8/2011 | Oxford |
| 7,995,768 B2 | 8/2011 | Miki |
| 8,000,481 B2 | 8/2011 | Nishikawa |
| 8,005,238 B2 | 8/2011 | Tashev |
| 8,019,091 B2 | 9/2011 | Burnett |
| 8,041,054 B2 | 10/2011 | Yeldener |
| 8,059,843 B2 | 11/2011 | Hung |
| 8,064,629 B2 | 11/2011 | Jiang |
| 8,085,947 B2 | 12/2011 | Haulick |
| 8,085,949 B2 | 12/2011 | Kim |
| 8,095,120 B1 | 1/2012 | Blair |
| 8,098,842 B2 | 1/2012 | Florencio |
| 8,098,844 B2 | 1/2012 | Elko |
| 8,103,030 B2 | 1/2012 | Barthel |
| 8,109,360 B2 | 2/2012 | Stewart, Jr. |
| 8,112,272 B2 | 2/2012 | Nagahama |
| 8,116,500 B2 | 2/2012 | Oxford |
| 8,121,834 B2 | 2/2012 | Rosec |
| D655,271 S | 3/2012 | Park |
| D656,473 S | 3/2012 | Laube |
| 8,130,969 B2 | 3/2012 | Buck |
| 8,130,977 B2 | 3/2012 | Chu |
| 8,135,143 B2 | 3/2012 | Ishibashi |
| 8,144,886 B2 | 3/2012 | Ishibashi |
| D658,153 S | 4/2012 | Woo |
| 8,155,331 B2 | 4/2012 | Nakadai |
| 8,170,882 B2 | 5/2012 | Davis |
| 8,175,291 B2 | 5/2012 | Chan |
| 8,175,871 B2 | 5/2012 | Wang |
| 8,184,801 B1 | 5/2012 | Hamalainen |
| 8,189,765 B2 | 5/2012 | Nishikawa |
| 8,189,810 B2 | 5/2012 | Wolff |
| 8,194,863 B2 | 6/2012 | Takumai |
| 8,199,927 B1 | 6/2012 | Raftery |
| 8,204,198 B2 | 6/2012 | Adeney |
| 8,204,248 B2 | 6/2012 | Haulick |
| 8,208,664 B2 | 6/2012 | Iwasaki |
| 8,213,596 B2 | 7/2012 | Beaucoup |
| 8,213,634 B1 * | 7/2012 | Daniel ............... H04R 3/005 381/91 |
| 8,219,387 B2 | 7/2012 | Cutler |
| 8,229,134 B2 | 7/2012 | Duraiswami |
| 8,233,352 B2 | 7/2012 | Beaucoup |
| 8,243,951 B2 | 8/2012 | Ishibashi |
| 8,244,536 B2 | 8/2012 | Arun |
| 8,249,273 B2 | 8/2012 | Inoda |
| 8,259,959 B2 | 9/2012 | Marton |
| 8,275,120 B2 | 9/2012 | Stokes, III |
| 8,280,728 B2 | 10/2012 | Chen |
| 8,284,949 B2 | 10/2012 | Farhang |
| 8,284,952 B2 | 10/2012 | Reining |
| 8,286,749 B2 | 10/2012 | Stewart |
| 8,290,142 B1 | 10/2012 | Lambert |
| 8,291,670 B2 | 10/2012 | Gard |
| 8,297,402 B2 | 10/2012 | Stewart |
| 8,315,380 B2 | 11/2012 | Liu |
| 8,331,582 B2 | 12/2012 | Steele |
| 8,345,898 B2 | 1/2013 | Reining |
| 8,355,521 B2 | 1/2013 | Larson |
| 8,370,140 B2 | 2/2013 | Vitte |
| 8,379,823 B2 | 2/2013 | Ratmanski |
| 8,385,557 B2 | 2/2013 | Tashev |
| D678,329 S | 3/2013 | Lee |
| 8,395,653 B2 | 3/2013 | Feng |
| 8,403,107 B2 | 3/2013 | Stewart |
| 8,406,436 B2 | 3/2013 | Craven |
| 8,428,661 B2 | 4/2013 | Chen |
| 8,433,061 B2 | 4/2013 | Cutler |
| D682,266 S | 5/2013 | Wu |
| 8,437,490 B2 | 5/2013 | Marton |
| 8,443,930 B2 | 5/2013 | Stewart, Jr. |
| 8,447,590 B2 | 5/2013 | Ishibashi |
| 8,472,639 B2 | 6/2013 | Reining |
| 8,472,640 B2 | 6/2013 | Marton |
| D685,346 S | 7/2013 | Szymanski |
| D686,182 S | 7/2013 | Ashiwa |
| 8,479,871 B2 | 7/2013 | Stewart |
| 8,483,398 B2 | 7/2013 | Fozunbal |
| 8,498,423 B2 | 7/2013 | Thaden |
| D687,432 S | 8/2013 | Duan |
| 8,503,653 B2 | 8/2013 | Ahuja |
| 8,515,089 B2 | 8/2013 | Nicholson |
| 8,515,109 B2 | 8/2013 | Dittberner |
| 8,526,633 B2 | 9/2013 | Ukai |
| 8,553,904 B2 | 10/2013 | Said |
| 8,559,611 B2 | 10/2013 | Ratmanski |
| D693,328 S | 11/2013 | Goetzen |
| 8,583,481 B2 | 11/2013 | Viveiros |
| 8,599,194 B2 | 12/2013 | Lewis |
| 8,600,443 B2 | 12/2013 | Kawaguchi |
| 8,605,890 B2 | 12/2013 | Zhang |
| 8,620,650 B2 | 12/2013 | Walters |
| 8,631,897 B2 | 1/2014 | Stewart |
| 8,634,569 B2 | 1/2014 | Lu |
| 8,638,951 B2 | 1/2014 | Zurek |
| D699,712 S | 2/2014 | Bourne |
| 8,644,477 B2 | 2/2014 | Gilbert |
| 8,654,955 B1 | 2/2014 | Lambert |
| 8,654,990 B2 | 2/2014 | Faller |
| 8,660,274 B2 | 2/2014 | Wolff |
| 8,660,275 B2 | 2/2014 | Buck |
| 8,670,581 B2 | 3/2014 | Harman |
| 8,672,087 B2 | 3/2014 | Stewart |
| 8,675,890 B2 | 3/2014 | Schmidt |
| 8,675,899 B2 | 3/2014 | Jung |
| 8,676,728 B1 | 3/2014 | Velusamy |
| 8,682,675 B2 | 3/2014 | Togami |
| 8,724,829 B2 | 5/2014 | Visser |
| 8,730,156 B2 | 5/2014 | Weising |
| 8,744,069 B2 | 6/2014 | Cutler |
| 8,744,101 B1 | 6/2014 | Burns |
| 8,755,536 B2 | 6/2014 | Chen |
| 8,811,601 B2 | 8/2014 | Mohammad |
| 8,818,002 B2 | 8/2014 | Tashev |
| 8,824,693 B2 | 9/2014 | Åhgren |
| 8,842,851 B2 | 9/2014 | Beaucoup |
| 8,855,326 B2 | 10/2014 | Derkx |
| 8,855,327 B2 | 10/2014 | Tanaka |
| 8,861,713 B2 | 10/2014 | Xu |
| 8,861,756 B2 | 10/2014 | Zhu |
| 8,873,789 B2 | 10/2014 | Bigeh |
| D717,272 S | 11/2014 | Kim |
| 8,886,343 B2 | 11/2014 | Ishibashi |
| 8,893,849 B2 | 11/2014 | Hudson |
| 8,898,633 B2 | 11/2014 | Bryant |
| D718,731 S | 12/2014 | Lee |
| 8,903,106 B2 | 12/2014 | Meyer |
| 8,923,529 B2 | 12/2014 | McCowan |
| 8,929,564 B2 | 1/2015 | Kikkeri |
| 8,942,382 B2 | 1/2015 | Elko |
| 8,965,546 B2 | 2/2015 | Visser |
| D725,059 S | 3/2015 | Kim |

(56) References Cited

U.S. PATENT DOCUMENTS

| | | | |
|---|---|---|---|
| D725,631 S | 3/2015 | McNamara | |
| 8,976,977 B2 | 3/2015 | De | |
| 8,983,089 B1 | 3/2015 | Chu | |
| 8,983,834 B2 | 3/2015 | Davis | |
| D726,144 S | 4/2015 | Kang | |
| D727,968 S | 4/2015 | Onoue | |
| 9,002,028 B2 | 4/2015 | Haulick | |
| D729,767 S | 5/2015 | Lee | |
| 9,038,301 B2 | 5/2015 | Zelbacher | |
| 9,088,336 B2 | 7/2015 | Mani | |
| 9,094,496 B2 | 7/2015 | Teutsch | |
| D735,717 S | 8/2015 | Lam | |
| D737,245 S | 8/2015 | Fan | |
| 9,099,094 B2 | 8/2015 | Burnett | |
| 9,107,001 B2 | 8/2015 | Diethorn | |
| 9,111,543 B2 | 8/2015 | Åhgren | |
| 9,113,242 B2 | 8/2015 | Hyun | |
| 9,113,247 B2 | 8/2015 | Chatlani | |
| 9,126,827 B2 | 9/2015 | Hsieh | |
| 9,129,223 B1 | 9/2015 | Velusamy | |
| 9,140,054 B2 | 9/2015 | Oberbroeckling | |
| D740,279 S | 10/2015 | Wu | |
| 9,172,345 B2 | 10/2015 | Kok | |
| D743,376 S | 11/2015 | Kim | |
| D743,939 S | 11/2015 | Seong | |
| 9,196,261 B2 | 11/2015 | Burnett | |
| 9,197,974 B1 | 11/2015 | Clark | |
| 9,203,494 B2 | 12/2015 | Tarighat Mehrabani | |
| 9,215,327 B2 | 12/2015 | Bathurst | |
| 9,215,543 B2 | 12/2015 | Sun | |
| 9,226,062 B2 | 12/2015 | Sun | |
| 9,226,070 B2 | 12/2015 | Hyun | |
| 9,226,088 B2 | 12/2015 | Pandey | |
| 9,232,185 B2 | 1/2016 | Graham | |
| 9,237,391 B2 | 1/2016 | Benesty | |
| 9,247,367 B2 | 1/2016 | Nobile | |
| 9,253,567 B2 | 2/2016 | Morcelli | |
| 9,257,132 B2 | 2/2016 | Gowreesunker | |
| 9,264,553 B2 | 2/2016 | Pandey | |
| 9,264,805 B2 | 2/2016 | Buck | |
| 9,280,985 B2 | 3/2016 | Tawada | |
| 9,286,908 B2 | 3/2016 | Zhang | |
| 9,293,134 B1 * | 3/2016 | Saleem | G10L 15/22 |
| 9,294,839 B2 | 3/2016 | Lambert | |
| 9,301,049 B2 | 3/2016 | Elko | |
| D754,103 S | 4/2016 | Fischer | |
| 9,307,326 B2 | 4/2016 | Elko | |
| 9,319,532 B2 | 4/2016 | Bao | |
| 9,319,799 B2 | 4/2016 | Salmon | |
| 9,326,060 B2 | 4/2016 | Nicholson | |
| D756,502 S | 5/2016 | Lee | |
| 9,330,673 B2 | 5/2016 | Cho | |
| 9,338,301 B2 | 5/2016 | Pocino | |
| 9,338,549 B2 | 5/2016 | Haulick | |
| 9,354,310 B2 | 5/2016 | Visser | |
| 9,357,080 B2 | 5/2016 | Beaucoup | |
| 9,403,670 B2 | 8/2016 | Schelling | |
| 9,426,598 B2 | 8/2016 | Walsh | |
| D767,748 S | 9/2016 | Nakai | |
| 9,451,078 B2 | 9/2016 | Yang | |
| D769,239 S | 10/2016 | Li | |
| 9,462,378 B2 | 10/2016 | Kuech | |
| 9,473,868 B2 | 10/2016 | Huang | |
| 9,479,627 B1 | 10/2016 | Rung | |
| 9,479,885 B1 | 10/2016 | Ivanov | |
| 9,489,948 B1 | 11/2016 | Chu | |
| 9,510,090 B2 | 11/2016 | Lissek | |
| 9,514,723 B2 | 12/2016 | Silfvast | |
| 9,516,412 B2 | 12/2016 | Shigenaga | |
| 9,521,057 B2 | 12/2016 | Klingbeil | |
| 9,549,245 B2 | 1/2017 | Frater | |
| 9,560,446 B1 | 1/2017 | Chang | |
| 9,560,451 B2 | 1/2017 | Eichfeld | |
| 9,565,493 B2 | 2/2017 | Abraham | |
| 9,565,507 B2 | 2/2017 | Case | |
| 9,578,413 B2 | 2/2017 | Sawa | |
| 9,578,440 B2 | 2/2017 | Otto | |
| 9,589,556 B2 | 3/2017 | Gao | |
| 9,591,123 B2 | 3/2017 | Sorensen | |
| 9,591,404 B1 | 3/2017 | Chhetri | |
| D784,299 S | 4/2017 | Cho | |
| 9,615,173 B2 | 4/2017 | Sako | |
| 9,628,596 B1 | 4/2017 | Bullough | |
| 9,635,186 B2 | 4/2017 | Pandey | |
| 9,635,474 B2 | 4/2017 | Kuster | |
| D787,481 S | 5/2017 | Tyss | |
| D788,073 S | 5/2017 | Silvera | |
| 9,640,187 B2 | 5/2017 | Niemisto | |
| 9,641,688 B2 | 5/2017 | Pandey | |
| 9,641,929 B2 | 5/2017 | Li | |
| 9,641,935 B1 | 5/2017 | Ivanov | |
| 9,653,091 B2 | 5/2017 | Matsuo | |
| 9,653,092 B2 | 5/2017 | Sun | |
| 9,655,001 B2 | 5/2017 | Metzger | |
| 9,659,576 B1 | 5/2017 | Kotvis | |
| D789,323 S | 6/2017 | Mackiewicz | |
| 9,674,604 B2 | 6/2017 | Deroo | |
| 9,692,882 B2 | 6/2017 | Mani | |
| 9,706,057 B2 | 7/2017 | Mani | |
| 9,716,944 B2 | 7/2017 | Yliaho | |
| 9,721,582 B1 | 8/2017 | Huang | |
| 9,734,835 B2 | 8/2017 | Fujieda | |
| 9,754,572 B2 | 9/2017 | Salazar | |
| 9,761,243 B2 | 9/2017 | Taenzer | |
| D801,285 S | 10/2017 | Timmins | |
| 9,788,119 B2 | 10/2017 | Vilermo | |
| 9,813,806 B2 | 11/2017 | Graham | |
| 9,818,426 B2 | 11/2017 | Kotera | |
| 9,826,211 B2 | 11/2017 | Sawa | |
| 9,854,101 B2 | 12/2017 | Pandey | |
| 9,854,363 B2 | 12/2017 | Sladeczek | |
| 9,860,439 B2 | 1/2018 | Sawa | |
| 9,866,952 B2 | 1/2018 | Pandey | |
| D811,393 S | 2/2018 | Ahn | |
| 9,894,434 B2 | 2/2018 | Rollow, IV | |
| 9,930,448 B1 | 3/2018 | Chen | |
| 9,936,290 B2 | 4/2018 | Mohammad | |
| 9,966,059 B1 | 5/2018 | Ayrapetian | |
| 9,973,848 B2 | 5/2018 | Chhetri | |
| 9,980,042 B1 | 5/2018 | Benattar | |
| D819,607 S | 6/2018 | Chui | |
| D819,631 S | 6/2018 | Matsumiya | |
| 10,015,589 B1 | 7/2018 | Ebenezer | |
| 10,021,506 B2 | 7/2018 | Johnson | |
| 10,021,515 B1 | 7/2018 | Mallya | |
| 10,034,116 B2 | 7/2018 | Kadri | |
| 10,054,320 B2 | 8/2018 | Choi | |
| 10,153,744 B1 | 12/2018 | Every | |
| 10,165,386 B2 | 12/2018 | Lehtiniemi | |
| D841,589 S | 2/2019 | Böhmer | |
| 10,206,030 B2 | 2/2019 | Matsumoto | |
| 10,210,882 B1 | 2/2019 | McCowan | |
| 10,231,062 B2 | 3/2019 | Pedersen | |
| 10,244,121 B2 | 3/2019 | Mani | |
| 10,244,219 B2 | 3/2019 | Sawa | |
| 10,269,343 B2 | 4/2019 | Wingate | |
| 10,367,948 B2 | 7/2019 | Wells-Rutherford | |
| D857,873 S | 8/2019 | Shimada | |
| 10,389,861 B2 | 8/2019 | Mani | |
| 10,389,885 B2 | 8/2019 | Sun | |
| D860,319 S | 9/2019 | Beruto | |
| D860,997 S | 9/2019 | Jhun | |
| D864,136 S | 10/2019 | Kim | |
| 10,440,469 B2 | 10/2019 | Barnett | |
| D865,723 S | 11/2019 | Cho | |
| 10,566,008 B2 | 2/2020 | Thorpe | |
| 10,602,267 B2 | 3/2020 | Grosche | |
| D883,952 S | 5/2020 | Lucas | |
| 10,650,797 B2 | 5/2020 | Kumar | |
| D888,020 S | 6/2020 | Lyu | |
| 10,728,653 B2 | 7/2020 | Graham | |
| D900,070 S | 10/2020 | Lantz | |
| D900,071 S | 10/2020 | Lantz | |
| D900,072 S | 10/2020 | Lantz | |

(56) References Cited

U.S. PATENT DOCUMENTS

| | | |
|---|---|---|
| D900,073 S | 10/2020 | Lantz |
| D900,074 S | 10/2020 | Lantz |
| 10,827,263 B2 | 11/2020 | Christoph |
| 10,863,270 B1 | 12/2020 | O'Neill et al. |
| 10,930,297 B2 | 2/2021 | Christoph |
| 10,959,018 B1 | 3/2021 | Shi |
| 10,979,805 B2 | 4/2021 | Chowdhary |
| 10,979,806 B1 * | 4/2021 | Johnson ................ H04N 23/90 |
| D924,189 S | 7/2021 | Park |
| 11,109,133 B2 | 8/2021 | Lantz |
| D940,116 S | 1/2022 | Cho |
| 11,218,802 B1 | 1/2022 | Kandadai |
| 2001/0031058 A1 | 10/2001 | Anderson |
| 2002/0015500 A1 | 2/2002 | Belt |
| 2002/0041679 A1 | 4/2002 | Beaucoup |
| 2002/0048377 A1 | 4/2002 | Vaudrey |
| 2002/0064158 A1 | 5/2002 | Yokoyama |
| 2002/0064287 A1 | 5/2002 | Kawamura |
| 2002/0069054 A1 | 6/2002 | Arrowood |
| 2002/0110255 A1 | 8/2002 | Killion |
| 2002/0126861 A1 | 9/2002 | Colby |
| 2002/0131580 A1 | 9/2002 | Smith |
| 2002/0140633 A1 | 10/2002 | Rafii |
| 2002/0146282 A1 | 10/2002 | Wilkes |
| 2002/0149070 A1 | 10/2002 | Sheplak |
| 2002/0159603 A1 | 10/2002 | Hirai |
| 2003/0026437 A1 | 2/2003 | Janse |
| 2003/0053639 A1 | 3/2003 | Beaucoup |
| 2003/0059061 A1 | 3/2003 | Tsuji |
| 2003/0063762 A1 | 4/2003 | Tajima |
| 2003/0063768 A1 | 4/2003 | Cornelius |
| 2003/0072461 A1 | 4/2003 | Moorer |
| 2003/0107478 A1 | 6/2003 | Hendricks |
| 2003/0118200 A1 | 6/2003 | Beaucoup |
| 2003/0122777 A1 | 7/2003 | Grover |
| 2003/0138119 A1 | 7/2003 | Pocino |
| 2003/0156725 A1 | 8/2003 | Boone |
| 2003/0161485 A1 | 8/2003 | Smith |
| 2003/0163326 A1 | 8/2003 | Maase |
| 2003/0169888 A1 | 9/2003 | Subotic |
| 2003/0185404 A1 | 10/2003 | Milsap |
| 2003/0198339 A1 | 10/2003 | Roy |
| 2003/0198359 A1 | 10/2003 | Killion |
| 2003/0202107 A1 | 10/2003 | Slattery |
| 2004/0013038 A1 | 1/2004 | Kajala |
| 2004/0013252 A1 | 1/2004 | Craner |
| 2004/0076305 A1 | 4/2004 | Santiago |
| 2004/0105557 A1 | 6/2004 | Matsuo |
| 2004/0125942 A1 | 7/2004 | Beaucoup |
| 2004/0175006 A1 | 9/2004 | Kim |
| 2004/0202345 A1 | 10/2004 | Stenberg |
| 2004/0240664 A1 | 12/2004 | Freed |
| 2005/0005494 A1 | 1/2005 | Way |
| 2005/0041530 A1 | 2/2005 | Goudie |
| 2005/0069156 A1 | 3/2005 | Haapapuro |
| 2005/0094580 A1 | 5/2005 | Kumar |
| 2005/0094795 A1 | 5/2005 | Rambo |
| 2005/0149320 A1 | 7/2005 | Kajala |
| 2005/0157897 A1 | 7/2005 | Saltykov |
| 2005/0175189 A1 | 8/2005 | Lee |
| 2005/0175190 A1 | 8/2005 | Tashev |
| 2005/0213747 A1 | 9/2005 | Popovich |
| 2005/0221867 A1 | 10/2005 | Zurek |
| 2005/0238196 A1 | 10/2005 | Furuno |
| 2005/0270906 A1 | 12/2005 | Ramenzoni |
| 2005/0271221 A1 | 12/2005 | Cerwin |
| 2005/0286698 A1 | 12/2005 | Bathurst |
| 2005/0286729 A1 | 12/2005 | Harwood |
| 2006/0083390 A1 | 4/2006 | Kaderavek |
| 2006/0088173 A1 | 4/2006 | Rodman |
| 2006/0093128 A1 | 5/2006 | Oxford |
| 2006/0098403 A1 | 5/2006 | Smith |
| 2006/0104458 A1 | 5/2006 | Kenoyer |
| 2006/0109983 A1 | 5/2006 | Young |
| 2006/0151256 A1 | 7/2006 | Lee |
| 2006/0159293 A1 | 7/2006 | Azima |
| 2006/0161430 A1 | 7/2006 | Schweng |
| 2006/0165242 A1 | 7/2006 | Miki |
| 2006/0192976 A1 | 8/2006 | Hall |
| 2006/0198541 A1 | 9/2006 | Henry |
| 2006/0204022 A1 | 9/2006 | Hooley |
| 2006/0215866 A1 | 9/2006 | Francisco |
| 2006/0222187 A1 | 10/2006 | Jarrett |
| 2006/0233353 A1 | 10/2006 | Beaucoup |
| 2006/0239471 A1 | 10/2006 | Mao |
| 2006/0262942 A1 | 11/2006 | Oxford |
| 2006/0269080 A1 | 11/2006 | Oxford |
| 2006/0269086 A1 | 11/2006 | Page |
| 2006/0280318 A1 * | 12/2006 | Warren ................ H04R 25/407 |
| | | 381/122 |
| 2007/0006474 A1 | 1/2007 | Taniguchi |
| 2007/0009116 A1 | 1/2007 | Reining |
| 2007/0019828 A1 | 1/2007 | Hughes |
| 2007/0019829 A1 * | 1/2007 | Yonehara ................ H04R 19/04 |
| | | 381/174 |
| 2007/0053524 A1 | 3/2007 | Haulick |
| 2007/0093714 A1 | 4/2007 | Beaucoup |
| 2007/0110257 A1 * | 5/2007 | Dedieu .................. H04R 1/406 |
| | | 381/91 |
| 2007/0116255 A1 | 5/2007 | Derkx |
| 2007/0120029 A1 | 5/2007 | Keung |
| 2007/0165871 A1 | 7/2007 | Roovers |
| 2007/0230712 A1 | 10/2007 | Belt |
| 2007/0253561 A1 | 11/2007 | Williams |
| 2007/0269066 A1 | 11/2007 | Derleth |
| 2008/0008339 A1 | 1/2008 | Ryan |
| 2008/0033723 A1 | 2/2008 | Jang |
| 2008/0046235 A1 | 2/2008 | Chen |
| 2008/0056517 A1 | 3/2008 | Algazi |
| 2008/0101622 A1 | 5/2008 | Sugiyama |
| 2008/0130907 A1 | 6/2008 | Sudo |
| 2008/0144848 A1 | 6/2008 | Buck |
| 2008/0152167 A1 * | 6/2008 | Taenzer ................ H04R 3/005 |
| | | 381/94.2 |
| 2008/0168283 A1 | 7/2008 | Penning |
| 2008/0188965 A1 | 8/2008 | Bruey |
| 2008/0212805 A1 | 9/2008 | Fincham |
| 2008/0232607 A1 | 9/2008 | Tashev |
| 2008/0247567 A1 | 10/2008 | Kjolerbakken |
| 2008/0253553 A1 | 10/2008 | Li |
| 2008/0253589 A1 | 10/2008 | Trahms |
| 2008/0259731 A1 | 10/2008 | Happonen |
| 2008/0260175 A1 | 10/2008 | Elko |
| 2008/0267422 A1 | 10/2008 | Cox |
| 2008/0279400 A1 | 11/2008 | Knoll |
| 2008/0285772 A1 | 11/2008 | Haulick |
| 2009/0003586 A1 | 1/2009 | Lai |
| 2009/0030536 A1 | 1/2009 | Gur |
| 2009/0052684 A1 | 2/2009 | Ishibashi |
| 2009/0086998 A1 | 4/2009 | Jeong |
| 2009/0087000 A1 | 4/2009 | Ko |
| 2009/0087001 A1 | 4/2009 | Jiang |
| 2009/0094817 A1 | 4/2009 | Killion |
| 2009/0129609 A1 | 5/2009 | Oh |
| 2009/0147967 A1 | 6/2009 | Ishibashi |
| 2009/0150149 A1 | 6/2009 | Cutter |
| 2009/0161880 A1 | 6/2009 | Hooley |
| 2009/0169027 A1 | 7/2009 | Ura |
| 2009/0173030 A1 | 7/2009 | Gulbrandsen |
| 2009/0173570 A1 | 7/2009 | Levit |
| 2009/0226004 A1 | 9/2009 | Sorensen |
| 2009/0233545 A1 | 9/2009 | Sutskover |
| 2009/0237561 A1 | 9/2009 | Kobayashi |
| 2009/0254340 A1 | 10/2009 | Sun |
| 2009/0274318 A1 | 11/2009 | Ishibashi |
| 2009/0310794 A1 | 12/2009 | Ishibashi |
| 2010/0011644 A1 | 1/2010 | Kramer |
| 2010/0034397 A1 | 2/2010 | Nakadai |
| 2010/0074433 A1 | 3/2010 | Zhang |
| 2010/0111323 A1 | 5/2010 | Marton |
| 2010/0111324 A1 | 5/2010 | Yeldener |
| 2010/0119097 A1 | 5/2010 | Ohtsuka |
| 2010/0123785 A1 | 5/2010 | Chen |
| 2010/0128892 A1 | 5/2010 | Chen |

(56) References Cited

U.S. PATENT DOCUMENTS

| | | |
|---|---|---|
| 2010/0128901 A1 | 5/2010 | Herman |
| 2010/0131749 A1 | 5/2010 | Kim |
| 2010/0142721 A1 | 6/2010 | Wada |
| 2010/0142732 A1* | 6/2010 | Craven ............... H04S 3/00 |
| | | 381/170 |
| 2010/0150364 A1 | 6/2010 | Buck |
| 2010/0158268 A1 | 6/2010 | Marton |
| 2010/0165071 A1 | 7/2010 | Ishibashi |
| 2010/0166219 A1 | 7/2010 | Marton |
| 2010/0189275 A1 | 7/2010 | Christoph |
| 2010/0189299 A1 | 7/2010 | Grant |
| 2010/0202628 A1 | 8/2010 | Meyer |
| 2010/0208605 A1 | 8/2010 | Wang |
| 2010/0215184 A1 | 8/2010 | Buck |
| 2010/0215189 A1 | 8/2010 | Marton |
| 2010/0217590 A1 | 8/2010 | Nemer |
| 2010/0245624 A1 | 9/2010 | Beaucoup |
| 2010/0246873 A1 | 9/2010 | Chen |
| 2010/0284185 A1 | 11/2010 | Ngai |
| 2010/0305728 A1 | 12/2010 | Aiso |
| 2010/0314513 A1 | 12/2010 | Evans |
| 2011/0002469 A1 | 1/2011 | Ojala |
| 2011/0007921 A1 | 1/2011 | Stewart |
| 2011/0033063 A1 | 2/2011 | McGrath |
| 2011/0038229 A1 | 2/2011 | Beaucoup |
| 2011/0096136 A1 | 4/2011 | Liu |
| 2011/0096631 A1 | 4/2011 | Kondo |
| 2011/0096915 A1 | 4/2011 | Nemer |
| 2011/0164761 A1 | 7/2011 | McCowan |
| 2011/0194719 A1 | 8/2011 | Frater |
| 2011/0211706 A1 | 9/2011 | Tanaka |
| 2011/0235821 A1 | 9/2011 | Okita |
| 2011/0268287 A1 | 11/2011 | Ishibashi |
| 2011/0311064 A1 | 12/2011 | Teutsch |
| 2011/0311085 A1 | 12/2011 | Stewart |
| 2011/0317862 A1 | 12/2011 | Hosoe |
| 2012/0002835 A1 | 1/2012 | Stewart |
| 2012/0014049 A1 | 1/2012 | Ogle |
| 2012/0027227 A1 | 2/2012 | Kok |
| 2012/0070015 A1 | 3/2012 | Oh |
| 2012/0076316 A1 | 3/2012 | Zhu |
| 2012/0080260 A1 | 4/2012 | Stewart |
| 2012/0093344 A1 | 4/2012 | Sun |
| 2012/0117474 A1 | 5/2012 | Miki |
| 2012/0128160 A1 | 5/2012 | Kim |
| 2012/0128175 A1 | 5/2012 | Visser |
| 2012/0155688 A1 | 6/2012 | Wilson |
| 2012/0155703 A1 | 6/2012 | Hernandez-Abrego |
| 2012/0163625 A1 | 6/2012 | Siotis |
| 2012/0169826 A1 | 7/2012 | Jeong |
| 2012/0177219 A1 | 7/2012 | Mullen |
| 2012/0182429 A1 | 7/2012 | Forutanpour |
| 2012/0207335 A1 | 8/2012 | Spaanderman |
| 2012/0224709 A1 | 9/2012 | Keddem |
| 2012/0243698 A1 | 9/2012 | Elko |
| 2012/0262536 A1 | 10/2012 | Chen |
| 2012/0275621 A1* | 11/2012 | Elko ............... H04R 19/01 |
| | | 381/92 |
| 2012/0288079 A1 | 11/2012 | Burnett |
| 2012/0288114 A1 | 11/2012 | Duraiswami |
| 2012/0294472 A1 | 11/2012 | Hudson |
| 2012/0327115 A1 | 12/2012 | Chhetri |
| 2012/0328142 A1 | 12/2012 | Horibe |
| 2013/0002797 A1 | 1/2013 | Thapa |
| 2013/0004013 A1 | 1/2013 | Stewart |
| 2013/0015014 A1 | 1/2013 | Stewart |
| 2013/0016847 A1 | 1/2013 | Steiner |
| 2013/0028451 A1 | 1/2013 | De Roo |
| 2013/0029684 A1 | 1/2013 | Kawaguchi |
| 2013/0034241 A1 | 2/2013 | Pandey |
| 2013/0039504 A1 | 2/2013 | Pandey |
| 2013/0083911 A1 | 4/2013 | Bathurst |
| 2013/0094689 A1 | 4/2013 | Tanaka |
| 2013/0101141 A1 | 4/2013 | McElveen |
| 2013/0121498 A1* | 5/2013 | Giesbrecht ............ H04M 9/082 |
| | | 381/92 |
| 2013/0136274 A1 | 5/2013 | Aehgren |
| 2013/0142343 A1 | 6/2013 | Matsui |
| 2013/0147835 A1 | 6/2013 | Lee |
| 2013/0156198 A1 | 6/2013 | Kim |
| 2013/0182190 A1 | 7/2013 | McCartney |
| 2013/0206501 A1 | 8/2013 | Yu |
| 2013/0216066 A1 | 8/2013 | Yerrace |
| 2013/0226593 A1 | 8/2013 | Magnusson |
| 2013/0251181 A1 | 9/2013 | Stewart |
| 2013/0264144 A1 | 10/2013 | Hudson |
| 2013/0271559 A1 | 10/2013 | Feng |
| 2013/0294616 A1 | 11/2013 | Mulder |
| 2013/0297302 A1 | 11/2013 | Pan |
| 2013/0304476 A1 | 11/2013 | Kim |
| 2013/0304479 A1 | 11/2013 | Teller |
| 2013/0329908 A1 | 12/2013 | Lindahl |
| 2013/0332156 A1 | 12/2013 | Tackin |
| 2013/0336516 A1 | 12/2013 | Stewart |
| 2013/0343549 A1 | 12/2013 | Vemireddy |
| 2014/0003635 A1 | 1/2014 | Mohammad |
| 2014/0010383 A1 | 1/2014 | Mackey |
| 2014/0016794 A1 | 1/2014 | Lu |
| 2014/0029761 A1 | 1/2014 | Maenpaa |
| 2014/0037097 A1 | 2/2014 | Labosco |
| 2014/0050332 A1 | 2/2014 | Nielsen |
| 2014/0072151 A1 | 3/2014 | Ochs |
| 2014/0098233 A1 | 4/2014 | Martin |
| 2014/0098964 A1 | 4/2014 | Rosca |
| 2014/0122060 A1 | 5/2014 | Kaszczuk |
| 2014/0177857 A1 | 6/2014 | Kuster |
| 2014/0233777 A1 | 8/2014 | Tseng |
| 2014/0233778 A1 | 8/2014 | Hardiman |
| 2014/0264654 A1 | 9/2014 | Salmon |
| 2014/0265774 A1 | 9/2014 | Stewart |
| 2014/0270271 A1 | 9/2014 | Dehe |
| 2014/0286518 A1 | 9/2014 | Stewart |
| 2014/0295768 A1 | 10/2014 | Wu |
| 2014/0301586 A1 | 10/2014 | Stewart |
| 2014/0307882 A1 | 10/2014 | Leblanc |
| 2014/0314251 A1 | 10/2014 | Rosca |
| 2014/0341392 A1 | 11/2014 | Lambert |
| 2014/0357177 A1 | 12/2014 | Stewart |
| 2014/0363008 A1 | 12/2014 | Chen |
| 2015/0003638 A1 | 1/2015 | Kasai |
| 2015/0024799 A1* | 1/2015 | Swanson ............... G10H 3/182 |
| | | 381/92 |
| 2015/0025878 A1 | 1/2015 | Gowreesunker |
| 2015/0030172 A1 | 1/2015 | Gaensler |
| 2015/0033042 A1 | 1/2015 | Iwamoto |
| 2015/0050967 A1 | 2/2015 | Bao |
| 2015/0055796 A1 | 2/2015 | Nugent |
| 2015/0055797 A1 | 2/2015 | Nguyen |
| 2015/0063579 A1 | 3/2015 | Bao |
| 2015/0070188 A1 | 3/2015 | Aramburu |
| 2015/0078581 A1 | 3/2015 | Etter |
| 2015/0078582 A1 | 3/2015 | Graham |
| 2015/0097719 A1 | 4/2015 | Balachandreswaran |
| 2015/0104023 A1 | 4/2015 | Bilobrov |
| 2015/0117672 A1 | 4/2015 | Christoph |
| 2015/0118960 A1 | 4/2015 | Petit |
| 2015/0126255 A1 | 5/2015 | Yang |
| 2015/0156578 A1 | 6/2015 | Alexandridis |
| 2015/0163577 A1 | 6/2015 | Benesty |
| 2015/0185825 A1 | 7/2015 | Mullins |
| 2015/0189423 A1 | 7/2015 | Giannuzzi |
| 2015/0208171 A1 | 7/2015 | Funakoshi |
| 2015/0237424 A1 | 8/2015 | Wilker |
| 2015/0281832 A1 | 10/2015 | Kishimoto |
| 2015/0281833 A1 | 10/2015 | Shigenaga |
| 2015/0281834 A1 | 10/2015 | Takano |
| 2015/0312662 A1 | 10/2015 | Kishimoto |
| 2015/0312691 A1 | 10/2015 | Virolainen |
| 2015/0326968 A1 | 11/2015 | Shigenaga |
| 2015/0341734 A1 | 11/2015 | Sherman |
| 2015/0350621 A1 | 12/2015 | Sawa |
| 2015/0358734 A1 | 12/2015 | Butler |
| 2016/0011851 A1 | 1/2016 | Zhang |

(56) References Cited

U.S. PATENT DOCUMENTS

| | | |
|---|---|---|
| 2016/0021478 A1 | 1/2016 | Katagiri |
| 2016/0029120 A1 | 1/2016 | Nesta |
| 2016/0031700 A1 | 2/2016 | Sparks |
| 2016/0037277 A1 | 2/2016 | Matsumoto |
| 2016/0055859 A1 | 2/2016 | Finlow-Bates |
| 2016/0080867 A1 | 3/2016 | Nugent |
| 2016/0088392 A1 | 3/2016 | Huttunen |
| 2016/0100092 A1 | 4/2016 | Bohac |
| 2016/0105473 A1 | 4/2016 | Klingbeil |
| 2016/0111109 A1 | 4/2016 | Tsujikawa |
| 2016/0127527 A1 | 5/2016 | Mani |
| 2016/0134928 A1 | 5/2016 | Ogle |
| 2016/0142548 A1 | 5/2016 | Pandey |
| 2016/0142814 A1 | 5/2016 | Deroo |
| 2016/0142815 A1 | 5/2016 | Norris |
| 2016/0148057 A1 | 5/2016 | Oh |
| 2016/0150315 A1 | 5/2016 | Tzirkel-Hancock |
| 2016/0150316 A1 | 5/2016 | Kubota |
| 2016/0155455 A1 | 6/2016 | Ojanperä |
| 2016/0165340 A1 | 6/2016 | Benattar |
| 2016/0173976 A1 | 6/2016 | Podhradsky |
| 2016/0173978 A1 | 6/2016 | Li |
| 2016/0189727 A1 | 6/2016 | Wu |
| 2016/0192068 A1 | 6/2016 | Ng |
| 2016/0196836 A1 | 7/2016 | Yu |
| 2016/0234593 A1 | 8/2016 | Matsumoto |
| 2016/0245698 A1* | 8/2016 | Pau .................. G01J 3/2803 |
| 2016/0275961 A1 | 9/2016 | Yu |
| 2016/0295279 A1 | 10/2016 | Srinivasan |
| 2016/0300584 A1 | 10/2016 | Pandey |
| 2016/0302002 A1 | 10/2016 | Lambert |
| 2016/0302006 A1 | 10/2016 | Pandey |
| 2016/0323667 A1 | 11/2016 | Shumard |
| 2016/0323668 A1 | 11/2016 | Abraham |
| 2016/0330545 A1 | 11/2016 | McElveen |
| 2016/0337523 A1 | 11/2016 | Pandey |
| 2016/0353200 A1 | 12/2016 | Bigeh |
| 2016/0357508 A1 | 12/2016 | Moore |
| 2017/0019744 A1 | 1/2017 | Matsumoto |
| 2017/0064451 A1 | 3/2017 | Park |
| 2017/0105066 A1 | 4/2017 | McLaughlin |
| 2017/0134849 A1 | 5/2017 | Pandey |
| 2017/0134850 A1 | 5/2017 | Graham |
| 2017/0164101 A1 | 6/2017 | Rollow, IV |
| 2017/0180861 A1 | 6/2017 | Chen |
| 2017/0206064 A1 | 7/2017 | Breazeal |
| 2017/0230748 A1 | 8/2017 | Shumard |
| 2017/0264999 A1 | 9/2017 | Fukuda |
| 2017/0295429 A1* | 10/2017 | Poletti .................. H04R 1/406 |
| 2017/0303887 A1 | 10/2017 | Richmond |
| 2017/0308352 A1 | 10/2017 | Kessler |
| 2017/0374454 A1 | 12/2017 | Bernardini |
| 2018/0083848 A1 | 3/2018 | Siddiqi |
| 2018/0102136 A1 | 4/2018 | Ebenezer |
| 2018/0109873 A1 | 4/2018 | Xiang |
| 2018/0115799 A1 | 4/2018 | Thiele |
| 2018/0160224 A1 | 6/2018 | Graham |
| 2018/0196585 A1 | 7/2018 | Densham |
| 2018/0219922 A1 | 8/2018 | Bryans |
| 2018/0227666 A1 | 8/2018 | Barnett |
| 2018/0292079 A1 | 10/2018 | Branham |
| 2018/0310096 A1* | 10/2018 | Shumard ................ H04R 3/005 |
| 2018/0313558 A1 | 11/2018 | Byers |
| 2018/0338205 A1 | 11/2018 | Abraham |
| 2018/0359565 A1 | 12/2018 | Kim |
| 2019/0014399 A1* | 1/2019 | Sano ..................... H04R 1/02 |
| 2019/0042187 A1 | 2/2019 | Truong |
| 2019/0069086 A1* | 2/2019 | Chen .................... H04R 1/406 |
| 2019/0166424 A1 | 5/2019 | Harney |
| 2019/0182607 A1 | 6/2019 | Pedersen |
| 2019/0215540 A1 | 7/2019 | Nicol |
| 2019/0230436 A1 | 7/2019 | Tsingos |
| 2019/0259408 A1 | 8/2019 | Freeman |
| 2019/0268683 A1 | 8/2019 | Miyahara |
| 2019/0295540 A1 | 9/2019 | Grima |
| 2019/0295569 A1 | 9/2019 | Wang |
| 2019/0319677 A1 | 10/2019 | Hansen |
| 2019/0371354 A1 | 12/2019 | Lester |
| 2019/0373362 A1 | 12/2019 | Ansai |
| 2019/0385629 A1 | 12/2019 | Moravy |
| 2019/0387311 A1 | 12/2019 | Schultz |
| 2020/0015021 A1 | 1/2020 | Leppanen |
| 2020/0021910 A1 | 1/2020 | Rollow, IV |
| 2020/0037068 A1 | 1/2020 | Barnett |
| 2020/0068297 A1 | 2/2020 | Rollow, IV |
| 2020/0100009 A1 | 3/2020 | Lantz |
| 2020/0100025 A1 | 3/2020 | Shumard |
| 2020/0107137 A1 | 4/2020 | Koutrouli |
| 2020/0137485 A1 | 4/2020 | Yamakawa |
| 2020/0145753 A1 | 5/2020 | Rollow, IV |
| 2020/0152218 A1 | 5/2020 | Kikuhara |
| 2020/0162618 A1 | 5/2020 | Enteshari |
| 2020/0228663 A1 | 7/2020 | Wells-Rutherford |
| 2020/0251119 A1 | 8/2020 | Yang |
| 2020/0275204 A1 | 8/2020 | Labosco |
| 2020/0278043 A1 | 9/2020 | Cao |
| 2020/0288237 A1 | 9/2020 | Abraham |
| 2020/0329308 A1* | 10/2020 | Tateishi ................. G10L 15/22 |
| 2021/0012789 A1 | 1/2021 | Husain |
| 2021/0021940 A1 | 1/2021 | Petersen |
| 2021/0044881 A1 | 2/2021 | Lantz |
| 2021/0051397 A1 | 2/2021 | Veselinovic |
| 2021/0098014 A1 | 4/2021 | Tanaka |
| 2021/0098015 A1 | 4/2021 | Pandey |
| 2021/0120335 A1 | 4/2021 | Veselinovic |
| 2021/0200504 A1 | 7/2021 | Park |
| 2021/0289291 A1* | 9/2021 | Craven ................... H04S 3/00 |
| 2021/0375298 A1 | 12/2021 | Zhang |

FOREIGN PATENT DOCUMENTS

| | | |
|---|---|---|
| CA | 2505496 | 10/2006 |
| CA | 2838856 | 12/2012 |
| CA | 2846323 | 9/2014 |
| CN | 1780495 | 5/2006 |
| CN | 101217830 | 7/2008 |
| CN | 101833954 | 9/2010 |
| CN | 101860776 | 10/2010 |
| CN | 101894558 | 11/2010 |
| CN | 102646418 | 8/2012 |
| CN | 102821336 | 12/2012 |
| CN | 102833664 | 12/2012 |
| CN | 102860039 | 1/2013 |
| CN | 104036784 | 9/2014 |
| CN | 104053088 | 9/2014 |
| CN | 104080289 | 10/2014 |
| CN | 104347076 | 2/2015 |
| CN | 104581463 | 4/2015 |
| CN | 105355210 | 2/2016 |
| CN | 105548998 | 5/2016 |
| CN | 106162427 | 11/2016 |
| CN | 106251857 | 12/2016 |
| CN | 106851036 | 6/2017 |
| CN | 107221336 | 9/2017 |
| CN | 107534725 | 1/2018 |
| CN | 108172235 | 6/2018 |
| CN | 109087664 | 12/2018 |
| CN | 208190895 | 12/2018 |
| CN | 208462000 U * | 2/2019 |
| CN | 109727604 | 5/2019 |
| CN | 110010147 | 7/2019 |
| CN | 306391029 | 3/2021 |
| DE | 2941485 | 4/1981 |
| EM | 0077546430001 | 3/2020 |
| EP | 0381498 | 8/1990 |
| EP | 0594098 | 4/1994 |
| EP | 0869697 | 10/1998 |
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |

(56) References Cited

FOREIGN PATENT DOCUMENTS

| | | |
|---|---|---|
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2710788 | 3/2014 |
| EP | 2721837 | 4/2014 |
| EP | 2772910 | 9/2014 |
| EP | 2778310 | 9/2014 |
| EP | 2942975 | 11/2015 |
| EP | 2988527 | 2/2016 |
| EP | 3131311 | 2/2017 |
| GB | 2393601 | 3/2004 |
| GB | 2446620 | 8/2008 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | 1484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | WO-2020053601 A1 * | 3/2020 ............ H04R 1/406 |
| WO | 2020168873 | 8/2020 |
| WO | 2020191354 | 9/2020 |
| WO | 211843001 | 11/2020 |

OTHER PUBLICATIONS

Ryan, Optimum Near Field Response for microphone arrays (Year: 2000).*

Ser, Self calibration based robust near field adaptive beamforming for microphone arrays (Year: 2007).*

Canetto, et al., "Speech Enhancement Systems Based on Microphone Arrays," VI Conference of the Italian Society for Applied and Industrial Mathematics, May 27, 2002, 9 pp.

International Search Report and Written Opinion for PCT/US2020/058385 dated Mar. 31, 2021, 20 pp.

"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021.

"Vsa 2050 II Digitally Steerable col. Speaker," Web page https://www.rcf.it/en_US/products/product-detail/vsa-2050-ii/972389, 15 pages, Dec. 24, 2018.

Advanced Network Devices, IPSCM Ceiling Tile IP Speaker, Feb. 2011, 2 pgs.

Advanced Network Devices, IPSCM Standard 2' by 2' Ceiling Tile Speaker, 2 pgs.

Affes, et al., "A Signal Subspace Tracking Algorithm for Microphone Array Processing of Speech," IEEE Trans. on Speech and Audio Processing, vol. 5, No. 5, Sep. 1997, pp. 425-437.

Affes, et al., "A Source Subspace Tracking Array of Microphones for Double Talk Situations," 1996 IEEE International Conference on Acoustics, Speech, and Signal Processing Conference Proceedings, May 1996, pp. 909-912.

Affes, et al., "An Algorithm for Multisource Beamforming and Multitarget Tracking," IEEE Trans. on Signal Processing, vol. 44, No. 6, Jun. 1996, pp. 1512-1522.

Affes, et al., "Robust Adaptive Beamforming via LMS-Like Target Tracking," Proceedings of IEEE International Conference on Acoustics, Speech and Signal Processing, Apr. 1994, pp. IV-269-IV-272.

Ahonen, et al., "Directional Analysis of Sound Field with Linear Microphone Array and Applications in Sound Reproduction," Audio Engineering Sociaty, Convention Paper 7329, May 2008, 11 pp.

Alarifi, et al., "Ultra Wideband Indoor Positioning Technologies: Analysis and Recent Advances," Sensors 2016, vol. 16, No. 707, 36 pp.

(56) References Cited

OTHER PUBLICATIONS

Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/datasheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound, 1'X2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFkAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
Avnetwork, "Top Five Conference Room Mic Myths," Feb. 25, 2015, 14 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003.
Benesty, et al., "Differential Beamforming," Fundamentals of Signal Enhancement and Array Signal Processing, First Edition, 2017, 39 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM-33-PZ A1, 2013, 1 pg.
Bno055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Buck, et al., "Self-Calibrating Microphone Arrays for Speech Signal Acquisition: A Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Cao, "Survey on Acoustic Vector Sensor and its Applications in Signal Processing" Proceedings of the 33rd Chinese Control Conference, Jul. 2014, 17 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.

(56) References Cited

OTHER PUBLICATIONS

Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 p.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAlalQobChMI2JTw-Ynm6AIVgbblCh3F4QKuEAkYBiABEgJZMPD_BWE>, 3 pp.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
Clearone, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.
Clearone, Beamforming Microphone Array, Mar. 2012, 6 pgs.
Clearone, Ceiling Microphone Array Installation Manual, Jan. 9, 2012, 20 pgs.
Clearone, Converge/Converge Pro, Manual, 2008, 51 pp.
Clearone, Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Alternative Approach to Interpolated Array Processing for Uniform Circular Arrays, Asia-Pacific Conference on Circuits and Systems, 2002, pp. 411-414.
Cox, et al., "Robust Adaptive Beamforming," IEEE Trans. Acoust., Speech, and Signal Processing, vol. ASSP-35, No. 10, Oct. 1987, pp. 1365-1376.
CTG Audio, Ceiling Microphone CTG CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, As early as 2009, 2 pp.
CTG Audio, CTG User Manual for the FS-400/800 Beamforming Mixers, Nov. 2008, 26 pp.
CTG Audio, Expand Your IP Teleconferencing to Full Room Audio, Obtained from website htt. ):/www ct audio com/ex and-, our-i-teleconforencino-to-ful-room-audio-while-conquennc.1-echo-cancelation-issues Mull, 2014.
CTG Audio, Frequently Asked Questions, as early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the CTG FS-400 and FS-800 with Beamforming Technology, as early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report Mar. 1995, Univ. of Karlskrona/Ronneby, Apr. 1995, 64 pgs.
Decawave, Application Note: APR001, UWB Regulations, a Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
Dibiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing For Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAlalQobChMI2JTw-Ynm6AIVgbblCh3F4QKuEAkYCSABEgKybPD_BWE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. 1-121-1-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "HoloLens concept lets you control your smart home via augmented reality," digitaltrends, Jul. 26, 2016, 12 pp.
Double Condenser Microphone SM 69, Datasheet, Georg Neumann GmbH, available at <https://ende.neumann.com/product_files/7453/download>, 8 pp.
Eargle, "The Microphone Handbook," Elar Publ. Co., 1st ed., 1981, 4 pp.
Enright, Notes From Logan, June edition of Scanlines, Jun. 2009, 9 pp.
Fan, et al., "Localization Estimation of Sound Source by Microphones Array," Procedia Engineering 7, 2010, pp. 312-317.
Firoozabadi, et al., "Combination of Nested Microphone Array and Subband Processing for Multiple Simultaneous Speaker Localization," 6th International Symposium on Telecommunications, Nov. 2012, pp. 907-912.
Flanagan et al., Autodirective Microphone Systems, Acustica, vol. 73, 1991, pp. 58-71.
Flanagan, et al., "Computer-Steered Microphone Arrays for Sound Transduction in Large Rooms," J. Acoust. Soc. Am. 78 (5), Nov. 1985, pp. 1508-1518.
Fohhn Audio New Generation of Beam Steering Systems Available Now, audioXpress Staff, May 10, 2017, 8 pp.
Fox, et al., "A Subband Hybrid Beamforming for In-Car Speech Enhancement," 20th European Signal rocessing Conference, Aug. 2012, 5 pp.
Frost, III, An Algorithm for Linearly Constrained Adaptive Array Processing, Proc. IEEE, vol. 60, No. 8, Aug. 1972, pp. 926-935.
Gannot et al., Signal Enhancement using Beamforming and Nonstationarity with Applications to Speech, IEEE Trans. on Signal Processing, vol. 49, No. 8, Aug. 2001, pp. 1614-1626.

(56) References Cited

OTHER PUBLICATIONS

Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.
Gritton et al., Echo Cancellation Algorithms, IEEE ASSP Magazine, vol. 1, issue 2, Apr. 1984, pp. 30-38.
Hald, et al., "A class of optimal broadband phased array geometries designed for easy construction," 2002 Int'l Congress & Expo. on Noise Control Engineering, Aug. 2002, 6 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforming and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: The Evolution of Multi-party Teleconferencing, IEEE Signal Processing Magazine, Jan. 2011, pp. 20-32.
ICONYX Gen5, Product Overview; Renkus-Heinz, Dec. 24, 2018, 2 pp.
International Search Report and Written Opinion for PCT/US2016/022773 dated Jun. 10, 2016.
International Search Report and Written Opinion for PCT/US2016/029751 dated Nov. 28, 2016, 21 pp.
International Search Report and Written Opinion for PCT/US2018/013155 dated Jun. 8, 2018.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2021/070625 dated Sep. 17, 2021, 17 pp.
International Search Report for PCT/US2020/024005 dated Jun. 12, 2020, 12 pp.
Invensense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pp.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundija, et al., "Baffled circular loudspeaker array with broad-band high directivity," 2010 IEEE International Conference on Acoustics, Speech and Signal Processing, Dallas, TX, 2010, pp. 73-76.

(56) References Cited

OTHER PUBLICATIONS

Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Optimization, IEEE Trans. on Signal Processing, vol. 45, No. 3, Mar. 1997, pp. 526-532.
LecNet2 Sound System Design Guide, Lectrosonics, Jun. 2, 2006.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project Dicit, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
Mccowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. I-281-I-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), INRIA Sophia Antipolis, Oct. 3, 2012, 79 pgs.
Order, Conduct of the Proceeding, *Clearone, Inc.* v. *Shure Acquisition Holdings, Inc.*, Nov. 2, 2020, 10 pp.
Pados et al., An Iterative Algorithm for the Computation of the MVDR Filter, IEEE Trans. on Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pp.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: A Review of Studies," The Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.

(56) References Cited

OTHER PUBLICATIONS

Rao, et al., "Fast LMS/Newton Algorithms for Stereophonic Acoustic Echo Cancelation," IEEE Transactions on Signal Processing, vol. 57, No. 8, Aug. 2009.

Reuven et al., Joint Acoustic Echo Cancellation and Transfer Function GSC in the Frequency Domain, 23rd IEEE Convention of Electrical and Electronics Engineers in Israel, Sep. 2004, pp. 412-415.

Reuven et al., Joint Noise Reduction and Acoustic Echo Cancellation Using the Transfer-Function Generalized Sidelobe Canceller, Speech Communication, vol. 49, 2007, pp. 623-635.

Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.

Ristimaki, Distributed Microphone Array System for Two-Way Audio Communication, Helsinki Univ. of Technology, Master's Thesis, Jun. 15, 2009, 73 pgs.

Rombouts et al., An Integrated Approach to Acoustic Noise and Echo Cancellation, Signal Processing 85, 2005, pp. 849-871.

Sällberg, "Faster Subband Signal Processing," IEEE Signal Processing Magazine, vol. 30, No. 5, Sep. 2013, 6 pp.

Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.

Sennheiser, New microphone solutions for ceiling and desk installation, https://en-us.sennheiser.com/news-new-microphone-solutions-for-ceiling-and-desk-installation, Feb. 2011, 2 pgs.

Sennheiser, TeamConnect Ceiling, https://en-us.sennheiser.com/conference-meeting-rooms-teamconnect-ceiling, 2017, 7 pgs.

Serdes, Wikipedia article, last edited on Jun. 25, 2018; retrieved on Jun. 27, 2018, 3 pp., https://en.wikipedia.org/wiki/SerDes.

Sessler, et al., "Directional Transducers," IEEE Transactions on Audio and Electroacoustics, vol. AU-19, No. 1, Mar. 1971, pp. 19-23.

Sessler, et al., "Toroidal Microphones," Journal of Acoustical Society of America, vol. 46, No. 1, 1969, 10 pp.

Shure AMS Update, vol. 1, No. 1, 1983, 2 pgs.

Shure AMS Update, vol. 1, No. 2, 1983, 2 pgs.

Shure AMS Update, vol. 4, No. 4, 1997, 8 pgs.

Shure Debuts Microflex Advance Ceiling and Table Array Microphones, Press Release, Feb. 9, 2016, 4 pp.

Shure Inc., A910-HCM Hard Ceiling Mount, retrieved from website <http://www.shure.com/en-US/products/accessories/a910hcm> on Jan. 16, 2020, 3 pp.

Shure Inc., Microflex Advance, http://www.shure.com/americas/microflex-advance, 12 pgs.

Shure Inc., MX395 Low Profile Boundary Microphones, 2007, 2 pgs.

Shure Inc., MXA910 Ceiling Array Microphone, http://www.shure.com/americas/products/microphones/microflex-advance/mxa910-ceiling-array-microphone, 7 pgs.

Shure, MXA910 With IntelliMix, Ceiling Array Microphone, available at <https://www.shure.com/en-us/products/microphones/mxa910>, as early as 2020, 12 pp.

Shure, New MXA910 Variant Now Available, Press Release, Dec. 13, 2019, 5 pp.

Shure, Q&A in Response to Recent US Court Ruling on Shure MXA910, Available at <https://www.shure.com/en-US/meta/legal/q-and-a-inresponse-to-recent-us-court-ruling-on-shure-mxa910-response>, as early as 2020, 5 pp.

Shure, RK244G Replacement Screen and Grille, Datasheet, 2013, 1 p.

Shure, The Microflex Advance MXA310 Table Array Microphone, Available at <https://www.shure.com/en-US/products/microphones/mxa310>, as early as 2020, 12 pp.

Signal Processor MRX7-D Product Specifications, Yamaha Corporation, 2016.

Silverman et al., Performance of Real-Time Source-Location Estimators for a Large-Aperture Microphone Array, IEEE Transactions on Speech and Audio Processing, vol. 13, No. 4, Jul. 2005, pp. 593-606.

Sinha, Ch. 9: Noise and Echo Cancellation, in Speech Processing in Embedded Systems, Springer, 2010, pp. 127-142.

SM 69 Stereo Microphone, Datasheet, Georg Neumann GmbH, Available at <https://ende.neumann.com/product_files/6552/download>, 1 p.

Soda et al., Introducing Multiple Microphone Arrays for Enhancing Smart Home Voice Control, the Institute of Electronics, Information and Communication Engineers, Technical Report of IEICE, Jan. 2013, 6 pgs.

Soundweb London Application Guides, BSS Audio, 2010.

Symetrix, Inc., SymNet Network Audio Solutions Brochure, 2008, 32 pgs.

SymNet Network Audio Solutions Brochure, Symetrix, Inc., 2008.

Tan, et al., "Pitch Detection Algorithm: Autocorrelation Method and AMDF," Department of Computer Engineering, Prince of Songkhla University, Jan. 2003, 6 pp.

Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.

Tetelbaum et al., Design and Implementation of a Conference Phone Based on Microphone Array Technology, Proc. Global Signal Processing Conference and Expo (GSPx), Sep. 2004, 6 pgs.

Tiete et al., SoundCompass: A Distributed MEMS Microphone Array-Based Sensor for Sound Source Localization, Sensors, Jan. 23, 2014, pp. 1918-1949.

TOA Corp., Ceiling Mount Microphone AN-9001 Operating Instructions, http://www.toaelectronics.com/media/an9001_mt1e.pdf, 1 pg.

Togami, et al., "Subband Beamformer Combined with Time-Frequency ICA for Extraction of Target Source Under Reverberant Environments," 17th European Signal Processing Conference, Aug. 2009, 5 pp.

U.S. Appl. No. 16/598,918, filed Oct. 10, 2019, 50 pp.

Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.

Van Trees, Optimum Array Processing: Part IV of Detection, Estimation, and Modulation Theory, 2002, 54 pgs., pp. i-xxv, 90-95, 201-230.

Van Veen et al., Beamforming: A Versatile Approach to Spatial Filtering, IEEE Assp Magazine, vol. 5, issue 2, Apr. 1988, pp. 4-24.

Vicente, "Adaptive Array Signal Processing Using the Concentric Ring Array and the Spherical Array," Ph.D. Dissertation, University of Missouri, May 2009, 226 pp.

Wang et al., Combining Superdirective Beamforming and Frequency-Domain Blind Source Separation for Highly Reverberant Signals, EURASIP Journal on Audio, Speech, and Music Processing, vol. 2010, pp. 1-13.

Warsitz, et al., "Blind Acoustic Beamforming Based on Generalized Eigenvalue Decomposition," IEEE Transactions on Audio, Speech and Language Processing, vol. 15, No. 5, 2007, 11 pp.

Weinstein, et al., "LOUD: A 1020-Node Microphone Array and Acoustic Beamformer," 14th International Congress on Sound & Vibration, Jul. 2007, 8 pgs.

Weinstein, et al., "LOUD: A 1020-Node Modular Microphone Array and Beamformer for Intelligent Computing Spaces," MIT Computer Science and Artifical Intelligence Laboratory, 2004, 18 pp.

Wung, "A System Approach to Multi-Channel Acoustic Echo Cancellation and Residual Echo Suppression for Robust Hands-Free Teleconferencing," Georgia Institute of Technology, May 2015, 167 pp.

XAP Audio Conferencing Brochure, ClearOne Communications, Inc., 2002.

Yamaha Corp., MRX7-D Signal Processor Product Specifications, 2016, 12 pgs.

Yamaha Corp., PJP-100H IP Audio Conference System Owner's Manual, Sep. 2006, 59 pgs.

Yamaha Corp., PJP-EC200 Conference Echo Canceller Brochure, Oct. 2009, 2 pgs.

(56) References Cited

OTHER PUBLICATIONS

Yan et al., Convex Optimization Based Time-Domain Broadband Beamforming with Sidelobe Control, Journal of the Acoustical Society of America, vol. 121, No. 1, Jan. 2007, pp. 46-49.

Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.

Yermeche, et al., "Real-Time DSP Implementation of a Subband Beamforming Algorithm for Dual Microphone Speech Enhancement," 2007 IEEE International Symposium on Circuits and Systems, 4 pp.

Zavarehei, et al., "Interpolation of Lost Speech Segments Using LP-HNM Model with Codebook Post-Processing," IEEE Transactions on Multimedia, vol. 10, No. 3, Apr. 2008, 10 pp.

Zhang, et al., "F-T-LSTM based Complex Network for Joint Acoustic Echo Cancellation and Speech Enhancement," Audio, Speech and Language Processing Group, Jun. 2021, 5 pp.

Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.

Zhang, et al., "Selective Frequency Invariant Uniform Circular Broadband Beamformer," EURASIP Journal on Advances in Signal Processing, vol. 2010, pp. 1-11.

Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.

\* cited by examiner

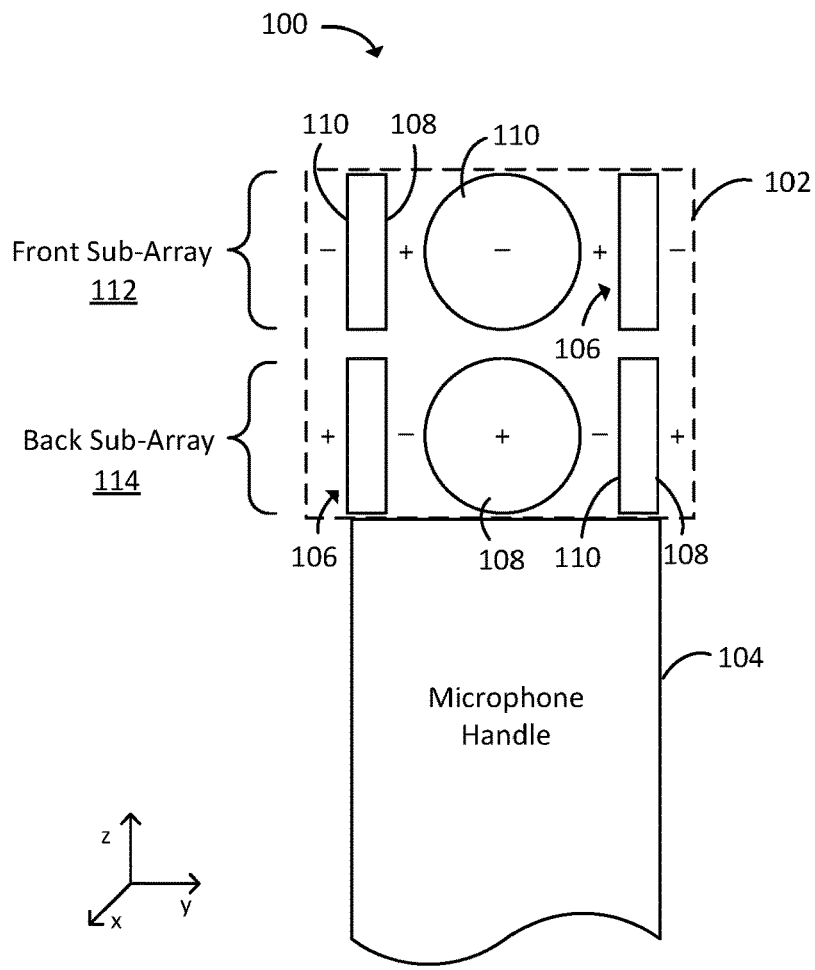
FIG. 1
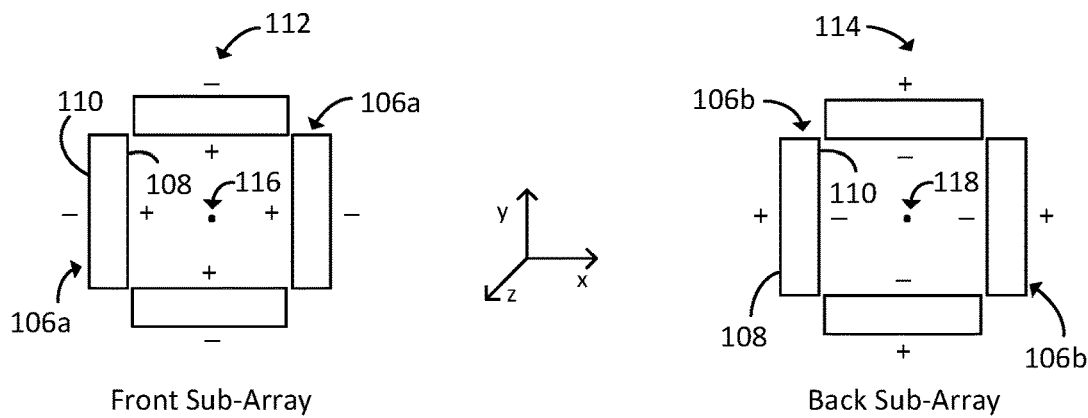
Front Sub-Array
Back Sub-Array
FIG. 2A   FIG. 2B

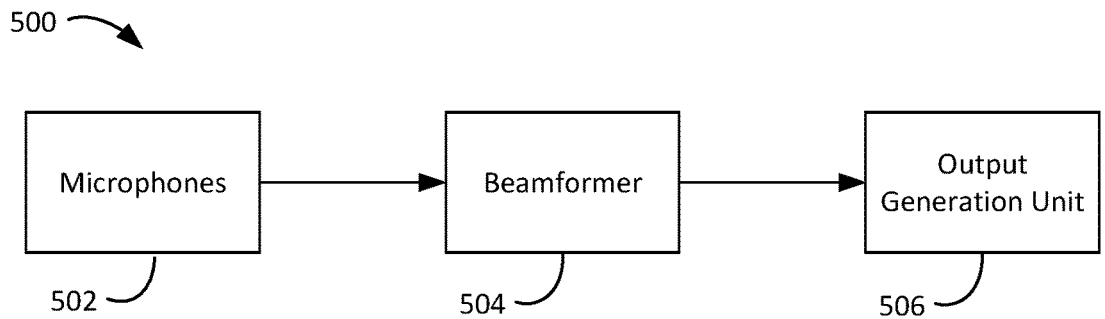
FIG. 13
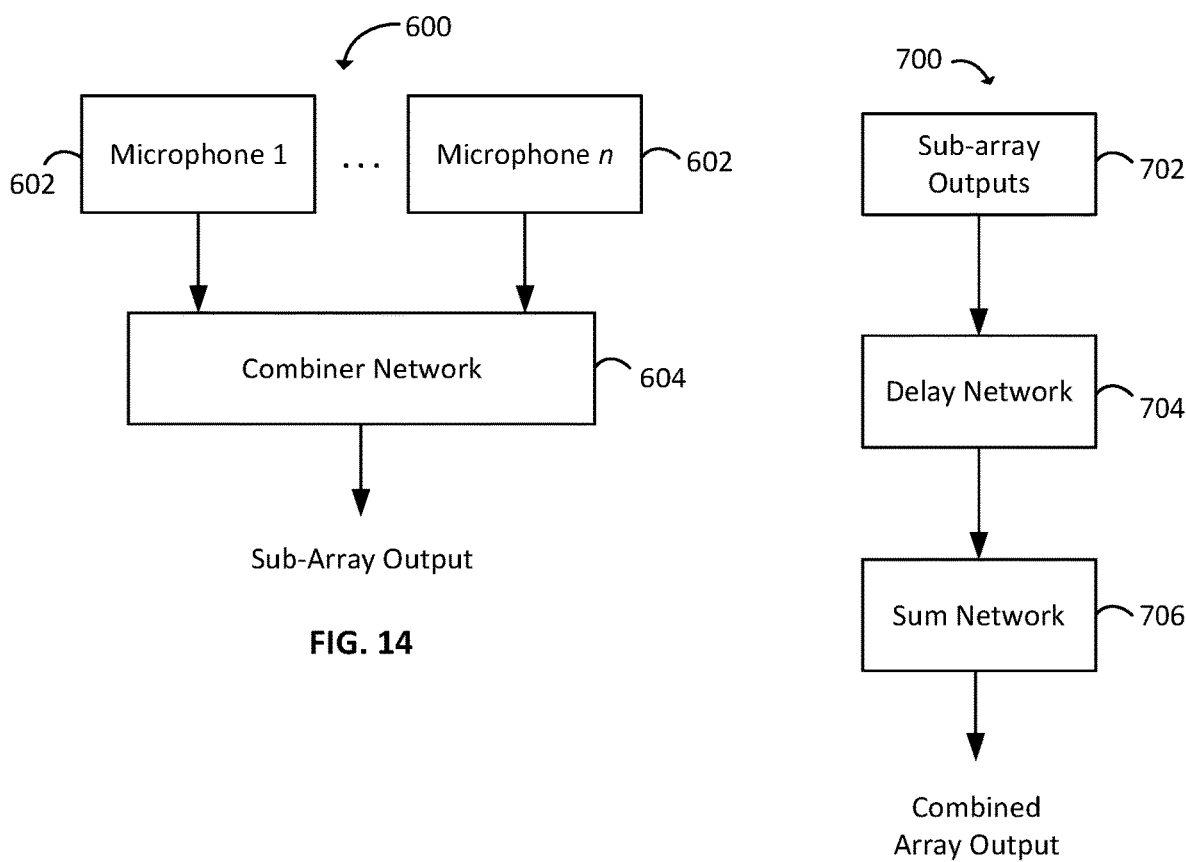
FIG. 14
FIG. 15

PROXIMITY MICROPHONE

CROSS-REFERENCE

This application claims priority to U.S. Provisional Patent Application No. 62/929,204, filed on Nov. 1, 2019, the contents of which are incorporated herein by reference in their entirety.

TECHNICAL FIELD

This application generally relates to microphones. In particular, this application relates to a microphone configured to provide near-field acceptance and far-field rejection in high sound pressure level environments.

BACKGROUND

There are several different types of microphones and related transducers, such as, for example, dynamic, crystal, condenser/capacitor (externally biased and electret), Micro-Electrical-Mechanical-System ("MEMS"), etc., each having its advantages and disadvantages depending on the application. The various microphones can be designed to produce different polar response patterns, including, for example, omnidirectional, cardioid, subcardioid, supercardioid, hypercardioid, and bidirectional. The type(s) of microphone used, and the polar pattern chosen for each microphone (or microphone cartridge(s) included therein), may depend on, for example, the locations of the audio sources, the desire to exclude unwanted noises, the locations of such noises, the physical space requirements, and/or other considerations.

At live performances or events (such as, e.g., concerts, lectures, and other on-stage performances; sports events, racing events, and other spectator events; news broadcasts and other live reports; etc.), one or more microphones may be used to capture sounds from one or more audio sources. The audio sources may include one or more human speakers or vocalists, one or more musical instruments, and/or other live sounds generated in association with the event. However, in harsh and high sound pressure level (SPL) environments, it can be difficult to isolate relatively quiet audio sources (e.g., voice signals from an announcer, reporter, or performer) from the loud environmental noise present all around the audio source (e.g., audience or crowd noise, event noise, etc.). This is because many traditional microphones have polar patterns that tend to capture unwanted noise as well the desired audio. Moreover, undesirable acoustic feedback will occur if the gain of the microphone is raised too high in an effort to obtain a higher SPL for the desired sound source and/or a lower SPL for noise and other nearby and distant sources.

Condenser microphones may be more suitable for quieter or distant sound sources because they have higher sensitivity than other traditional microphones and have a smooth, natural-sounding, response across a wide frequency range, including higher frequencies. Such frequency responses are possible because the diaphragms of condenser microphone transducers are typically made thinner and lighter than those of dynamic microphones, for example, due to the fact that the condenser diaphragms do not have a voice coil mass attached thereto within the acoustical space of the transducer. However, traditional condenser microphones typically have fixed polar patterns, few manually selectable settings, and a limited maximum sound pressure level, thus making them less than ideal for live or on-stage events. For example, condenser microphones may cause distortion and/or clipping in high SPL environments.

While the use of multiple cartridges may allow for the formation of various independent polar patterns, such designs still may not uniformly form the desired polar patterns and may not ideally capture sound due to frequency response irregularities, as well as interference and reflections within and between the cartridges. Moreover, placing multiple condenser cartridges in a single handheld microphone, for example, can be cost, and space, prohibitive.

Micro-Electrical-Mechanical-System ("MEMS") microphones, or microphones that have a MEMS element as the core transducer, have become increasingly popular due to their small package size (e.g., thereby, allowing for an overall lower profile device) and high performance characteristics (such as, e.g., high signal-to-noise ratio ("SNR"), low power consumption, good sensitivity, etc.). In addition, MEMS microphones are generally easier to assemble and available at a lower cost than, for example, the condenser microphone cartridges found in many existing microphones. However, due to the physical constraints of the MEMS microphone packaging, the polar pattern of a conventional MEMS microphone is inherently omnidirectional, which means the microphone is equally sensitive to sounds coming from any and all directions, regardless of the microphone's orientation. This can be less than ideal for on-stage and other live performance environments, in particular.

Accordingly, there is still a need for a microphone capable of high isolation in high SPL environments, so as to provide full, natural-sounding speech pickup in even the nosiest environment.

SUMMARY

The invention is intended to solve the above-noted and other problems by providing a microphone that is designed to, among other things, provide near-field acceptance for audio sources in very close proximity of the microphone, provide far-field broadband cancellation for all other audio sources, nearby and distant, and provide high performance characteristics suitable for live or on-stage environments, such as, e.g., a high directionality, high signal-to-noise ratio (SNR), wideband audio coverage, high isolation, high gain before feedback, etc.

One exemplary embodiment provides a microphone array comprising a first plurality of directional microphone elements arranged in a first cluster formed by directing a front face of said microphone elements towards a center of the first cluster, and a second plurality of directional microphone elements arranged in a second cluster formed by directing a front face of said microphone elements away from a center of the second cluster, wherein the first cluster of microphone elements is disposed vertically above the second cluster of microphone elements.

Another exemplary embodiment provides a microphone comprising a first microphone array comprising a plurality of directional microphone elements arranged in close proximity to each other and configured to capture near-field sounds within a first range of frequencies, and a second microphone array disposed concentrically around the first microphone array, the second array comprising a plurality of omnidirectional microphone elements configured to capture near-field sounds within a second range of frequencies higher than the first range.

Yet another exemplary embodiment provides a microphone comprising a microphone array that comprises a plurality of omnidirectional microphone elements arranged in a plurality of concentric sub-arrays, each sub-array comprising a respective subset of the microphone elements, the subsets of microphone elements being vertically aligned, and the sub-arrays being arranged in a stacked configuration, wherein the plurality of sub-arrays have a substantially uniform radius, substantially equal spacing between the microphone elements in each sub-array, and a substantially uniform vertical distance between adjacent sub-arrays.

According to certain aspects, said microphone further comprises a first beamforming component configured to form first and second bidirectional outputs based on audio signals received from first and second pairs of the omnidirectional microphone elements, respectively.

According to additional aspects, the microphone further comprises a second beamforming component configured to form a first sub-array output by combining a first plurality of bidirectional outputs generated by the first beamforming component, and form a second sub-array output by combining a second plurality of bidirectional outputs generated by the first beamforming component.

According to some aspects, the plurality of sub-arrays includes a top sub-array, a central sub-array, and a bottom sub-array, and the first plurality of bidirectional outputs is formed by pairing each microphone element in the central sub-array with a respective one of the microphone elements in the top sub-array, and the second plurality of bidirectional outputs is formed by pairing each microphone element in the central sub-array with a respective one of the microphone elements in the bottom sub-array.

According to additional aspects, the microphone further comprises a third beamforming component configured to generate a forward-facing output for the microphone array by combining the first sub-array output with the second sub-array output.

Another exemplary embodiment provides a microphone comprising a microphone array that comprises a plurality of omnidirectional microphone elements arranged in a plurality of concentric sub-arrays, each microphone element being located in a respective one of the sub-arrays, the sub-arrays being vertically aligned and arranged in a stacked configuration, and the plurality of sub-arrays comprising a top sub-array, a central sub-array, and a bottom sub-array. The microphone further comprises one or more beamforming components configured to form a first plurality of bidirectional outputs by pairing each microphone element in the central sub-array with a respective one of the microphone elements in the top sub-array; form a second plurality of bidirectional outputs by pairing each microphone element in the central sub-array with a respective one of the microphone elements in the bottom sub-array; and generate a forward-facing output for the microphone array based on the first and second bidirectional outputs.

According to certain aspects, the one or more beamforming components are further configured to form a first virtual sub-array output by combining the first plurality of bidirectional outputs; form a second virtual sub-array output by combining the second plurality of bidirectional outputs; and generate the forward-facing output for the microphone array by combining the first virtual sub-array output with the second virtual sub-array output.

According to certain aspects, the microphone array has a peak sensitivity at a working distance of less than about four inches from the center of the microphone array.

Another exemplary embodiment provides a microphone comprising a microphone array that comprises a plurality of microphone elements arranged in a plurality of layers, the layers being stacked such that each microphone element of a given layer is vertically aligned with respective microphone elements in the other layers, wherein the microphone array is configured to capture near-field sounds and reject far-field sounds within a first range of frequencies.

According to certain aspects, the first range of frequencies is about 20 hertz (Hz) to about 18.5 kilohertz (kHz).

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 1 is a schematic diagram illustrating a side view of an exemplary proximity microphone in accordance with one or more embodiments.

FIGS. 2A and 2B are schematic diagrams illustrating top views of exemplary front and back sub-arrays, respectively, of the proximity microphone of FIG. 1 in accordance with one or more embodiments.

FIG. 13 is a block diagram of an exemplary microphone system comprising the spatial microphone array of FIGS. 6 and 7 in accordance with one or more embodiments.

FIG. 14 is a block diagram of an exemplary microphone combining beamformer included in the microphone system of FIG. 13 in accordance with one or more embodiments.

FIG. 15 is a block diagram of an exemplary delay and sum beamformer included in the microphone system of FIG. 13 in accordance with one or more embodiments.

DETAILED DESCRIPTION

Figure 3:
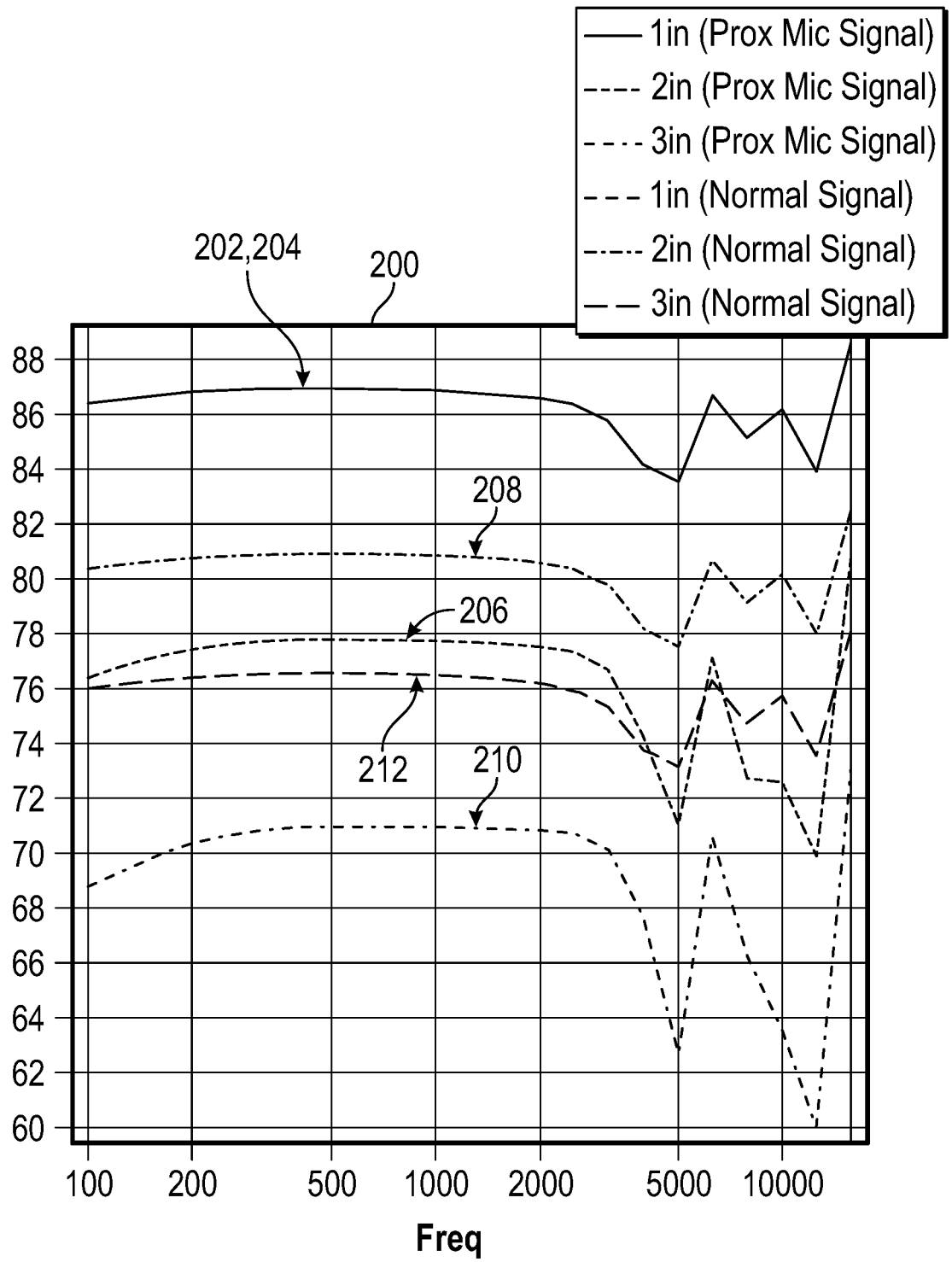
FIG. 3 is a plot comparing signal attenuation at various audio source distances for the proximity microphone array of FIGS. 1 and 2 to that for a conventional microphone in accordance with one or more embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The techniques described herein provide for a high performing close proximity microphone configured for near-field pickup and far-field cancellation, for example, in order to better capture close range voice signals amidst a loud, noisy environment. Exemplary embodiments include a microphone array comprising a first cluster or layer of directional microphone elements positioned above a second cluster or layer of directional microphone elements that are inverted in polarity compared to the first cluster. For example, the microphone elements may be bidirectional microphones, such as, e.g., condenser microphone cartridges, and the front sides of the microphone elements in the first layer may be facing inwards or towards each other, while the front sides of the microphone element in the second layer may be facing outwards or away from each other. With this arrangement, sounds approaching the sides of the microphone array can cancel each other due to the opposing polarities of the two layers of microphone elements. And sounds approaching at a reasonable distance away from the top, or bottom, of the microphone array (e.g., more than a few inches) fall within the nulls of the microphone elements and therefore, are naturally rejected. Moreover, due to the way the directionalities of the microphone elements cancel each other out in this arrangement, the microphone array is left with a narrow pickup angle capable of only capturing sounds that are in very close proximity to the microphone elements (e.g., within a few inches).

Exemplary embodiments also include adding a second microphone array concentrically around the first microphone array in order to better handle high frequency audio. For example, while the first microphone array can provide far-field rejection and near-field acceptance of low and mid-band frequencies, performance above a certain cut-off frequency (e.g., around 6.5 kHz) may be limited due to geometrical constraints of the microphone elements in the first microphone array. The second microphone array may include a plurality of omnidirectional microphones (e.g., MEMS microphones) arranged spatially around the first microphone array, for example, so as to form two or more rings with uniform vertical spacing between the rings and uniform horizontal spacing between the elements in each ring. Certain beamforming techniques may be applied to the second microphone array to create a single, forward facing, three-dimensional array lobe that is tuned to handle frequencies above the cut-off frequency of the first array, minimize far-field acceptance above this cut-off frequency, and provide a usable working distance at high frequencies. Thus, a microphone comprising both the first microphone array and the second microphone array may be capable of providing full range audio coverage (e.g., 20 Hz to 20 kHz) with a higher SNR than, for example, that of the individual microphone elements.

Other exemplary embodiments provide a microphone comprising only the second microphone array, or a plurality of omnidirectional microphones (e.g., MEMS) arranged in a plurality of concentric sub-arrays with uniform vertical spacing between the sub-arrays and uniform horizontal or radial spacing between the elements of each sub-array. Due to a geometry of the three-dimensional array (also referred to herein as a "spatial microphone array"), selected pairs of the omnidirectional microphones can be combined, using certain beamforming techniques, to simulate the optimal bidirectional behavior of the condenser microphones in the first array, without experiencing performance limitations at frequencies above the cut-off frequency of the first microphone array. Indeed, such embodiments can provide a usable working distance (e.g., within a few inches) across the entire applicable audible range, including very high frequencies. Moreover, a microphone comprising just the second microphone array may provide a reduction in overall materials and assembly costs, more consistent behavior across all frequencies due to the removal of internal reflective surfaces inherently present with condenser microphones, and an increase in bandwidth due to the apparent center of the pairs of omnidirectional microphones being closer together than the condenser microphones.

FIG. 1 illustrates an exemplary microphone 100 comprising a microphone array 102 configured to form a narrow, shallow pick-up pattern capable of detecting sounds at various frequencies from one or more audio sources within a close proximity of the microphone array 102, in accordance with embodiments. The microphone 100 may be utilized in various environments, including, for example, a live or on-stage performance, a live news broadcast, an announcer at a sporting event, and other live, noisy events, as well as other environments where the audio source includes one or more human speakers (e.g., a conferencing environment, studio recordings, etc.). Other sounds may be present in the environment which may be undesirable, such as noise from audience members, spectators, passers-by and other persons, the surrounding environment, musical instruments and other equipment or devices, etc. In a typical situation, the microphone 100 may be positioned directly in front of an audio source, in order to detect and capture sound from the audio source, such as speech spoken by a human speaker, though other configurations and placements of the microphone 100 and/or audio sources are also contemplated and possible.

In the illustrated embodiment, the microphone 100 includes a handle 104 to allow for handheld operation of the microphone 100, or attachment to a microphone stand or holder. In other embodiments, the microphone 100 can include a base (not shown) to allow for table-top operation. In still other embodiments, the microphone 100 can be configured for hands-free operation (e.g., as part of a wireless system). In any case, the microphone 100 may further include a support (e.g., support 304 shown in FIGS. 3 and 4) for supporting the microphone array 102, or the transducers, cartridges, capsules, and/or other elements included therein. The support may comprise, for example, a substrate, printed circuit board, frame, or any other suitable component.

The microphone array 102 comprises multiple microphone elements 106 that can form multiple pickup patterns for optimally detecting and capturing sound from the audio source. In embodiments, the polar patterns formed by each of the microphone elements 106 are directional and may include bidirectional, cardioid, subcardioid, supercardioid, and/or hypercardioid. As such, each directional microphone element 106 can have a pre-designated front side or face 108 that is configured to be oriented directly in front of a given audio source (e.g., 0 degrees relative to the source) and an opposing back side or face 110 configured to be oriented away from the audio source (e.g., 180 degrees relative to the source).

In some embodiments, the microphone elements 106 are condenser microphone cartridges, either externally biased or electret type, with a bidirectional polar pattern configured to pick up sounds at the front face 108 and back face 110 equally, or nearly equally, well. In some embodiments, the "front" and "back" designations for a given microphone element 106 may be programmatically assigned by the processor depending on the design considerations for the microphone 100. In one example embodiment, the processor can flip the "front" orientation of certain elements 106 to "back" and the "back" orientation of certain elements 106 to "front," as needed to implement the techniques described herein.

Figure 16:
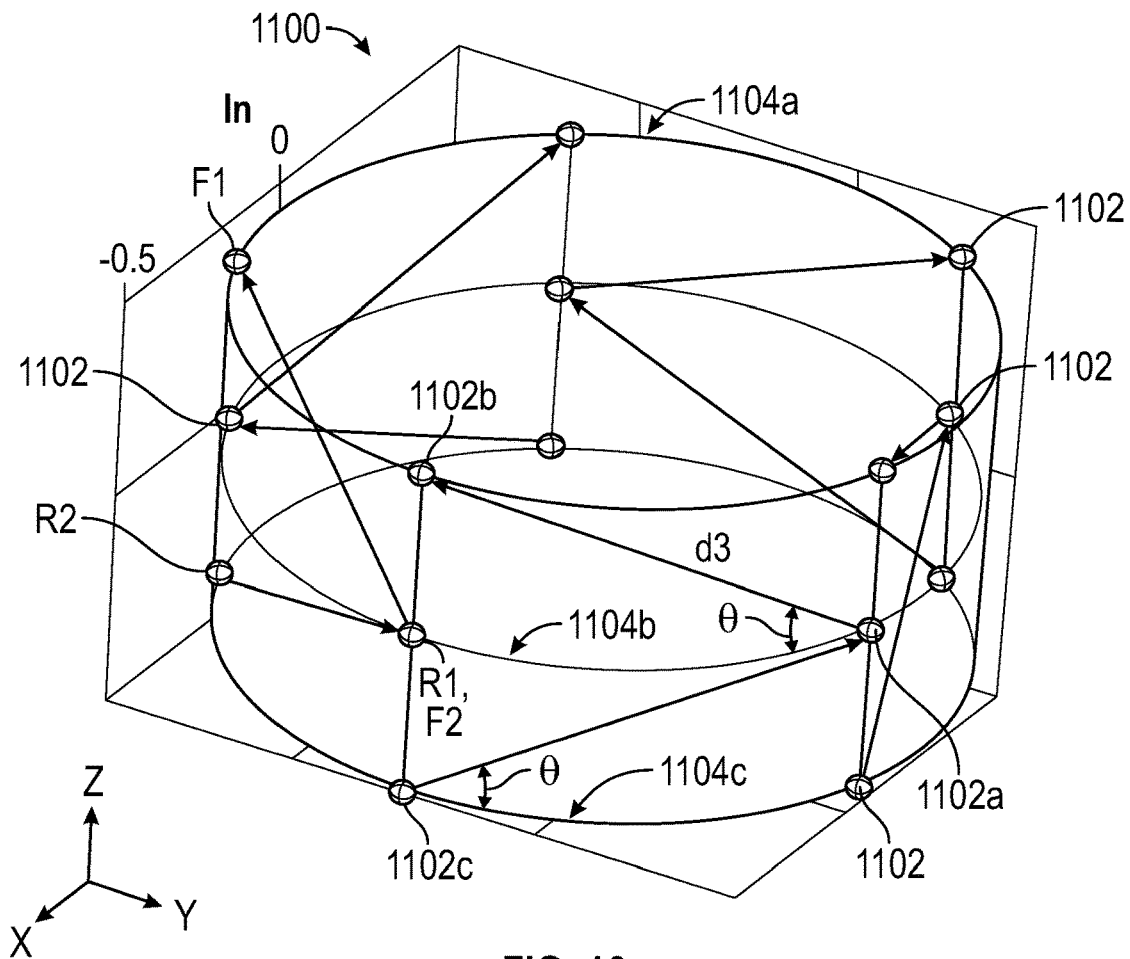
FIG. 16 is a schematic diagram illustrating a front perspective view of an exemplary proximity microphone array comprising all omnidirectional microphones, in accordance with one or more embodiments.
Figure 17:
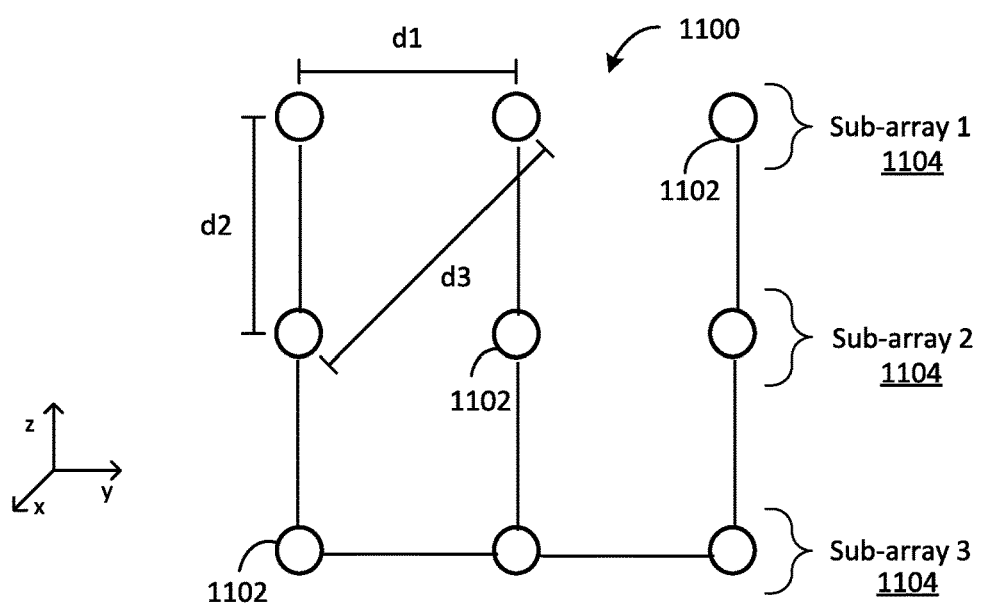
FIG. 17 is a block diagram illustrating a side view of the proximity microphone array of FIG. 16, in accordance with one or more embodiments.

In other embodiments, the microphone elements 106 can be any other type of microphone configured to form a bidirectional, or other directional, polar pattern (e.g., inherently or using beamforming techniques), such as, for example, MEMS (micro-electrical mechanical system) transducers, dynamic microphones, ribbon microphones, piezoelectric microphones, etc. In one embodiment (e.g., as shown in FIGS. 16 and 17), each microphone element 106 can be an omnidirectional microphone (e.g., MEMS microphone) coupled to a beamformer that is configured to create a bi-directional polar pattern using the outputs of the microphone elements 106. For example, the beamformer (e.g., beamformer 504 shown in FIG. 13) may utilize certain DSP techniques (e.g., sum and difference beamforming techniques shown in FIG. 19) to cause pairs of omnidirectional microphones to behave as bi-directional microphones.

Each of the microphone elements 106 can convert detected sound into an audio signal. In some cases, the audio signal can be a digital audio output. In other cases, the audio signal can be an analog audio output, and components of the microphone 100, such as analog to digital converters, processors, and/or other components, may process the analog audio signals to ultimately generate one or more digital audio output signals. The digital audio output signals may conform to the Dante standard for transmitting audio over Ethernet, in some embodiments, or may conform to another standard. In certain embodiments, one or more pickup patterns may be formed by the processor of the microphone 100 from the audio signals generated by the microphone elements 106, and the processor may generate a digital audio output signal corresponding to each of the pickup patterns. In other embodiments, the microphone elements 106 may output analog audio signals and other components and devices (e.g., processors, mixers, recorders, amplifiers, etc.) external to the microphone 100 may process the analog audio signals.

According to embodiments, the directional microphone elements 106 of the microphone array 102 can be arranged in multiple layers or rows configured to cancel or reduce sounds coming from the sides of the microphone 100 and/or beyond a pre-specified distance from the microphone 100. As shown in FIG. 1, a first or top layer may be formed by a first sub-array 112 comprising a first subset of the microphone elements 106 (i.e. microphone elements 106a) and a second or bottom layer may be formed by a second sub-array 114 comprising a second subset of, or the remaining, microphone elements 106 (i.e. microphone elements 106b). As a result, the top layer 112 of microphones 106a can be positioned closer to the audio source (e.g., a vocalist's mouth), and the bottom layer 114 of microphones 106b can be positioned behind them. Due to this positioning, sound may reach the first sub-array 112 at least slightly before reaching the second sub-layer 114. This delay in sound propagation may be adjusted by the microphone 100 when generating the audio output signal using appropriate signal processing, as will be appreciated.

In other embodiments, the microphone array 102 may include only the first layer 112 of microphones 106a for picking up sounds from all sides of the microphone 100 (e.g., as shown in FIG. 2A). In such cases, for example, the microphones 106a may be optimally spaced and/or arranged to maximize close-range audio pick-up (e.g., a vocalist's voice) and minimize other, unwanted sounds or noise, as described herein.

Referring back to FIG. 1, the first sub-array 112 can be disposed at a vertical distance directly above the second sub-array 114, so that the array 102 comprises two separate rows of microphone elements 106. In addition, the two sub-arrays 112 and 114 may be axially aligned, such that a center 116 of the first sub-array 112 is directly above a center 118 of the second sub-array 114. The exact distance between the two layers or sub-arrays can vary depending on factors related to the microphone elements 106 themselves (e.g., size-based constraints, frequency response characteristics, etc.), as well as constraints on the overall microphone packaging size (e.g., a size of the microphone grille for encasing the microphone assembly), a desired overall frequency response, and other considerations. The distance between the microphone layers may also be selected in order to achieve a desired working distance for the overall microphone 100. In embodiments, the space between the two sub-arrays 112 and 114 is preferably between 0 and 1 inch (e.g., about 0.5 inch).

Referring additionally to FIGS. 2A and 2B, within each sub-array 112, 114, the corresponding subset of microphone elements 106a, 106b can be arranged, or grouped together, in a cluster, in accordance with embodiments. For example, each cluster can be formed by positioning the corresponding microphone elements 106a, 106b adjacent to, or in close proximity with, each other. The exact distance or spacing between adjacent microphone elements 106 within each sub-array or cluster can vary depending on a number of factors, including, for example, the dimensions of the individual microphone elements or cartridges, frequency response characteristics of the same, and a desired working distance for the overall microphone array 102, or a maximum distance from the center of the array at which an audio source can be located and still be picked up by the microphone 100. In one embodiment, the microphone elements 106a of the first sub-array 112 are arranged so that the working distance of the microphone 100 is approximately three to four inches from a geometric center 116 of the first sub-array 112.

In embodiments, the microphone elements 106 are further arranged within each sub-array 112, 114 so that the front sides 108 of the first cluster of microphone elements 106a have a first orientation and the front sides 108 of the second cluster of microphone elements 106b have a second orientation, generally opposite the first. For example, the microphone elements 106 may be arranged so that an overall on-axis orientation of the elements 106b in the second sub-array 114 is approximately 180 degrees rotated from an overall on-axis orientation of the elements 106a in the first sub-array 112. To achieve such arrangement, the first sub-array 112 can be formed by directing the front side 108 of each microphone element 106a inwards, or towards the center 116 of the first cluster 112, as shown in FIG. 2A. And the second sub-array 114 can be formed by directing the front side 108 of each microphone element 106b outwards, or away from the center 118 of the second cluster 114, as shown in FIG. 2B. In addition, the first and second sub-arrays 112 and 114 can be radially aligned so that each microphone element 106a of the first cluster 112 is substantially aligned, along a vertical axis, with a respective one of the microphone elements 106b of the second cluster 114, as shown in FIG. 1. Thus, in each set of vertically-aligned microphone elements, the polarity of the microphone element 106a from the first cluster 112 can be opposite the polarity of the microphone element 106b from the second cluster 114.

According to embodiments, by arranging the microphone elements 106 in this manner, the directionalities of the individual microphone elements 106 purposely conflict with each other, so that only a narrow pick-up angle is left to detect sounds. Moreover, the remaining array lobe may be capable of picking up sounds only at close-range (e.g., within 4 inches above the microphone 100), enabling the microphone array 102 to detect sounds in the near-field and reject sounds in the far-field. For example, the microphone array 102 can cancel or reduce sounds detected at the sides of the microphone array 102 (e.g., at 0, 90, 180, and 270 degrees around the microphone 100) due to the opposing polarities of the microphone elements 106a and 106b in the first and second layers, or sub-arrays 112 and 114. The extent to which the microphones conflict may depend on the type of directionality exhibited by each of the microphone elements 106. For example, if the microphone elements 106 are bi-directional microphone cartridges, the polar patterns of the microphone elements 106 may cancel each other out completely, or substantially, along the sides of the microphone array 102.

The microphone array 102 can also reject sounds that are a reasonable distance away from the microphone array 102 (e.g., more than 4 inches) and fall within the nulls of the directional microphone cartridges 106. The exact locations of these nulls can vary depending on the type of directionality exhibited by the microphone elements 106 and the orientation of the transducer or cartridge within the array 102. For example, if the microphone elements 106 are bi-directional microphone cartridges placed in a horizontal orientation, as shown in FIG. 1, the nulls may be directed towards the very top and very bottom of the microphone array 102, along a vertical axis running through a central point of the microphone array 102 (e.g., the centers 116 and 118 of the first and second sub-arrays 112 and 114, respectively). Nulls may also be present at other locations, for example, at approximately 45-degree intervals around the microphone 100, due to the way the bi-directional polar patterns of the microphone elements 106 interact around the array 102. Other nulls may also be created from using the microphone cartridges 106 in aggregate, but these may be frequency dependent.

Conversely, sounds that are close enough to be in the proximity of the microphone cartridges 106 may not be reduced or rejected, thus leaving a narrow, shallow lobe around the center of the microphone array 102 for audio pick-up. In embodiments, the pick-up angle created by this lobe may be so narrow and shallow that only spherical waves (e.g., voice signals or a person speaking or singing directly into the microphone 100) can fall within the lobe of the microphone array 102. For example, even plane waves (e.g., from surrounding musical instruments) of equal or higher SPL may be rejected by the narrow, shallow pick-up angle of the microphone array 102. This may be possible because the microphone 100 is configured to take advantage of the fact that spherical losses are typically high when a microphone is in close proximity to the source. More specifically, in the microphone 100, the audio signal produced by the front microphone sub-array 112 in the near field may be higher than the audio signal produced by the rear or back microphone sub-array 114 because the front microphone elements 106a have increased sensitivity due to spherical losses in the near field. Accordingly, when an audio source is in close proximity to the microphone 100, the source signal (e.g., vocals) may not be completely cancelled out by the microphone array 102. However, when the audio source is further away from the microphone 100, the difference between the response of the front sub-array 112 and the response of the rear sub-array 114 may be closer to parity and therefore, the audio signals produced by the two sub-arrays 112 and 114 may cancel out, completely or nearly so. For example, in one embodiment, for a given pair of vertically-spaced microphone elements 106a and 106b, there may be a six decibel (dB) loss between the outputs of the two elements for near field sounds, thus resulting in less cancellation, and only a 1.7 dB loss for far-field sounds, thus resulting in more cancellation.

Referring back to FIG. 1, while the microphone elements 106 are arranged in a radially symmetric configuration overall, the exact alignment of the microphone layers 112 and 114 relative to each other can vary. In some embodiments, the microphone elements 106 are placed at right angles to each other, in order to maximize on-axis rejection by the individual elements 106. For example, as shown in FIG. 1, such configuration may be achieved by positioning the front side 108 of a first microphone element 106a directly opposite the front side 108 of a second microphone element 106a of the same cluster 112 and repeating this arrangement with the remaining pair of microphone elements 106a, such that the cluster 112 essentially has four sides surrounding the center 116 of the first cluster 112, as shown in FIG. 2A. The second cluster 114 may be formed in a similar manner, except the polarities of the microphone elements 106b are inverted or reversed, as shown in FIG. 2B. That is, the back side 110 of a first microphone element 106b is positioned directly opposite the back side 110 of a second microphone element 106b of the same cluster 114, and this arrangement is repeated with the remaining pair of microphone elements 106b, so that the cluster 114 essentially has four sides surrounding the center 118 as well.

Figure 4:
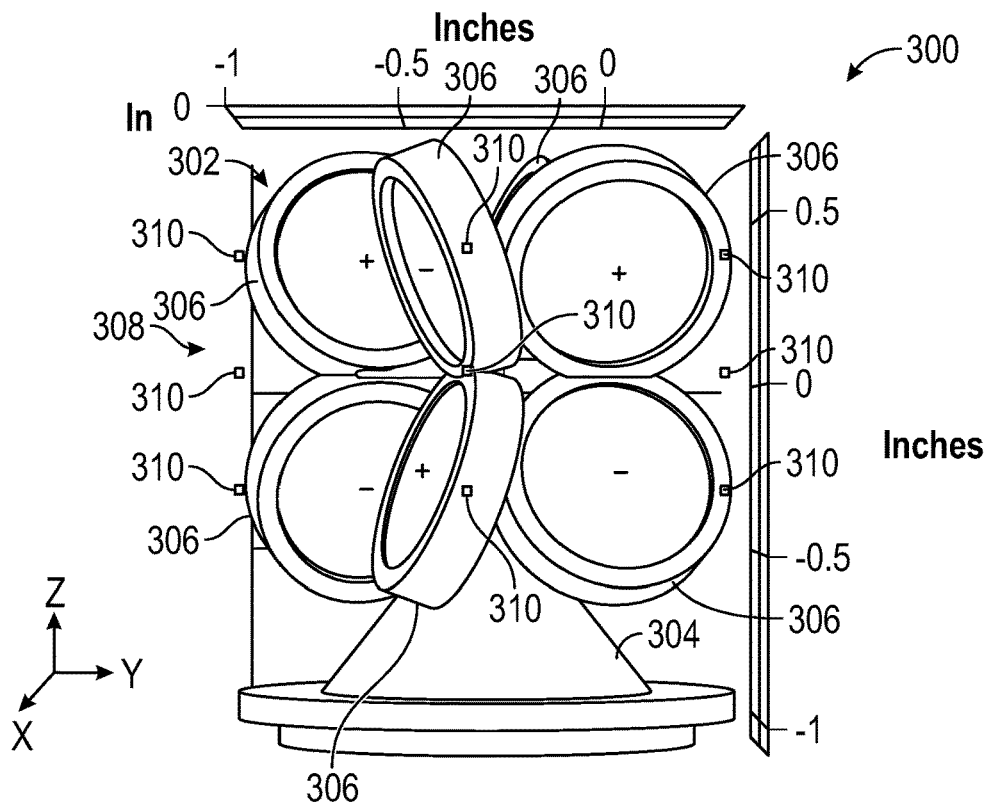
FIG. 4 is a side view of an exemplary hybrid microphone comprising a proximity microphone array and a spatial microphone array in accordance with one or more embodiments.
Figure 5:
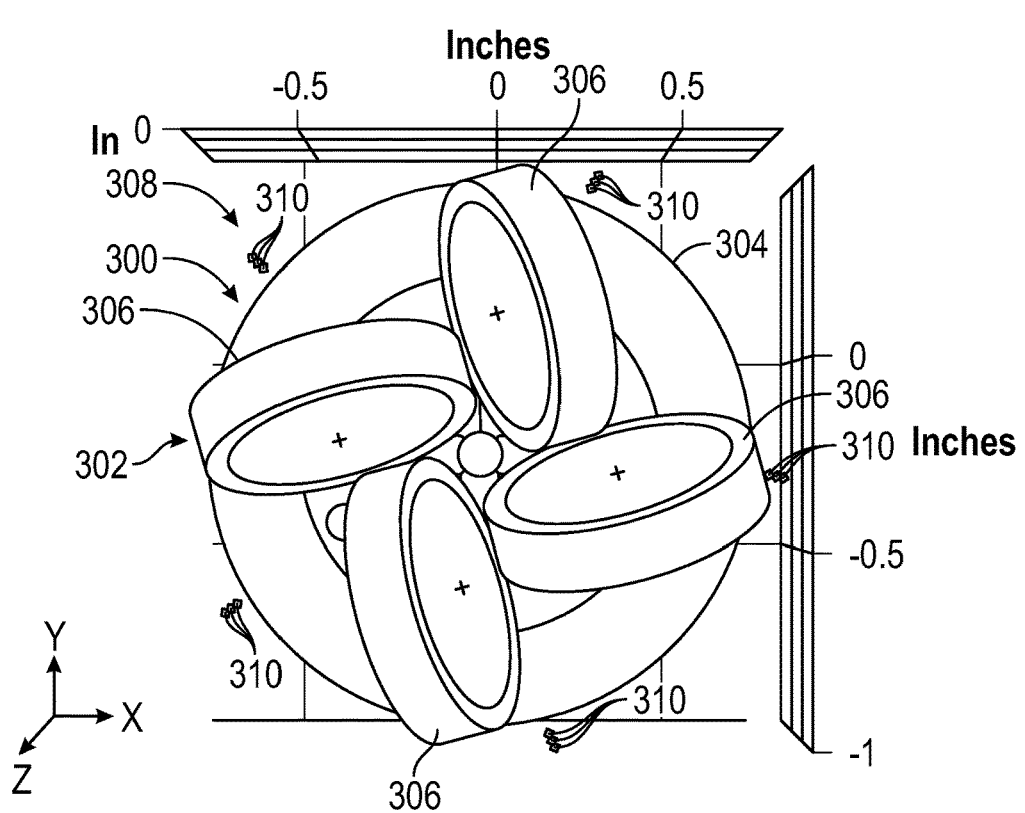
FIG. 5 is a top view of the hybrid proximity microphone shown in FIG. 4 in accordance with one or more embodiments.

In some embodiments, the microphone elements 106 can be tilted or angled towards or away from each, while still being radially-aligned, for example, as shown in FIG. 4. In such cases, the alignment of the microphone elements 106 may also be offset to vary the geometry of the sub-arrays 112 and 114, for example, as shown in FIG. 5, in order to purposely introduce detuning and optimize the working distance of the microphone 100. (Tilted and offset configurations for the directional microphone elements are described in more detail below with respect to FIGS. 9-12.) In still other embodiments, other numbers (e.g., larger or fewer) of microphone elements 106 in each layer are possible and contemplated. For example, though FIGS. 2A and 2B show four microphone elements 106 in each sub-array 112, 114, in another embodiment, each sub-array 112, 114 may include three microphone elements arranged symmetrically about the corresponding central point 116, 118. In still other embodiments, the microphone elements 106 may be arranged in a configuration that is not radially symmetric, such as, e.g., a tetrahedral design.

In embodiments, a distance or spacing between adjacent microphones 106a in the top layer 112 of the microphone array 102 can be selected to create a desired working distance, or the maximum distance between the audio source and the microphone 100 that still enables audio pick-up. Beyond this working distance, the sensitivity of the array 102 drops off considerably, while within the working distance, the array may experience the usual 1/r loss, where r equals a distance from the array center. This sensitivity drop-off may also be related to the relative distance between (a) the audio source and the first sub-array 112, which is variable, and (b) the first sub-array 112 and the second sub-array 114, which is fixed. (A more detailed description of signal attention at different distances is provided below with respect to FIG. 3.)

The spacing between adjacent microphone elements 106a in the top layer 112 may also determine the frequency at which the directivity of the microphone array 102 changes from cancellation (e.g., as described above with respect to FIG. 1) to omnidirectional, or the point at which a sensitivity drop-off occurs. For example, the closer together the microphone elements 106a are positioned, the higher this cut-off frequency will be. In one embodiment, the microphone elements 106a are configured to create an effective working distance of up to about 4 inches for frequencies up to about 6500 Hz. To provide coverage beyond that frequency, the microphone 100 may further include a second microphone array configured to accommodate the frequencies above the cut-off frequency, for example, as described below with respect to FIGS. 4 through 8c.

The working distance of the microphone array 102 can also be determined, or limited, by a geometry of the individual microphone elements 106 in the array and/or other physical constraints related to the microphone 100. For example, limitations related to the size and/or shape of each microphone element 106 may restrict how closely two elements 106 can be placed. In one embodiment, each microphone element 106 is a condenser microphone capsule with a generally circular shape and a diameter of about 0.5 inch. In such embodiment, the smallest possible working distance for the sub-array 112 (i.e. a cluster of four such condenser capsules) may be about three to four inches from the geometric center 116 of the array, with the exact working distance being further dependent on the orientation of the microphone elements 106 relative to each other, as described below.

In some embodiments, a geometry, or arrangement, of the microphone elements 106 can be optimized to accommodate a pre-existing form factor of the handheld microphone 100 and/or other physical constraints. For example, the microphone elements 106 may be arranged according to a size and shape of a pre-existing microphone grille for encasing the microphone array 102 at the top of the microphone handle 104. In some cases, the microphone elements 106 may also be arranged within the grille so that a distance between the front sub-array 112 and a front of the microphone grille is minimized and a distance between the microphone array 102 and a base of the microphone handle 104 is maximized.

Figures 9, 10:
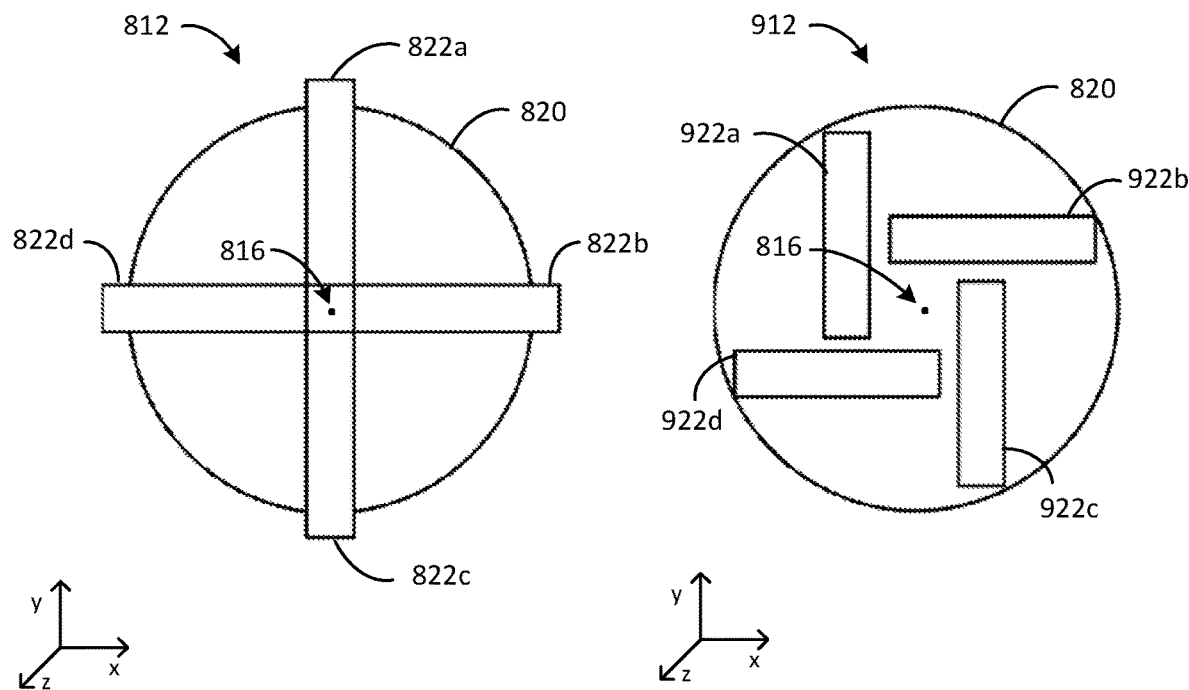
FIG. 9 is a schematic diagram illustrating a top view of an exemplary sub-array for implementing a proximity microphone, in accordance with one or more embodiments.
FIG. 10 is a schematic diagram illustrating a top view of another exemplary sub-array for implementing a proximity microphone, in accordance with one or more embodiments.
Figure 11:
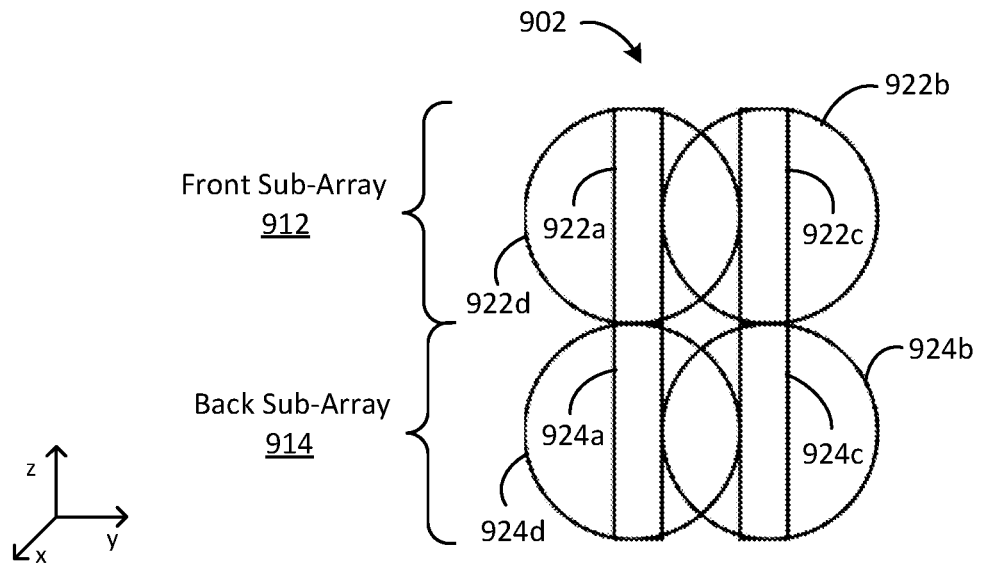
FIG. 11 is a schematic diagram illustrating a side view of a microphone array comprising the sub-array shown in FIG. 10 positioned above a second, similar sub-array, in accordance with one or more embodiments.

FIGS. 9 and 10 illustrate top views of two exemplary sub-arrays 812 and 912 for arranging a plurality of microphone elements 822 and 922, respectively, within a pre-existing microphone grille 820. The microphone grille 820 may be coupled to the microphone handle of a handheld microphone (such as, e.g., microphone handle 104 shown in FIG. 1) and may be configured to encase the microphone assembly of the handheld microphone. In the illustrated embodiments, the microphone grille 820 has a diameter of approximately 38 millimeters and a height of approximately 52 millimeters, and each of the depicted microphone elements 822 and 922 has a circular diameter of about 0.5 inch. As will be appreciated, other shapes and sizes for the microphone grille 820 and/or the microphone elements 822 and 922 may also be utilized. Each of the sub-arrays 812 and 912 may be similar to the front microphone sub-array 112 shown in FIG. 1 in terms of overall placement within a proximity microphone like the microphone 100. For example, each sub-array 812, 912 may be placed vertically above a second sub-array having a similar configuration (e.g., as shown in FIG. 11), in order to form a microphone array similar to the microphone array 102 shown in FIG. 1. The microphone elements 822 and 922 may also be substantially similar to the microphone elements 106 shown in FIG. 1 and described herein, except for the relative arrangement of the elements.

Referring now to FIG. 9, shown is a top view of a microphone cluster or sub-array 812 comprising four microphone elements 822a, 822b, 822c, and 822d (collectively referred to as microphone elements 822) arranged in a "cross-pattern." This pattern may be achieved by arranging the microphone elements 822 at right angles relative to a center 816 of the sub-array 812, so that microphone elements 822a and 822c are horizontally aligned along a first plane of the microphone grille 820 and microphone elements 822b and 822d are horizontally aligned along a second plane of the microphone grille 820 that is perpendicular to the first plane. The cross-pattern arrangement may improve a working distance of the sub-array 812 by placing the microphone elements 822 in closer proximity to each other, for example, as compared to the arrangement shown in FIG. 2A. However, when arranged in this manner, the overall sub-array 812 is larger in size than the diameter of the microphone grille 820, as shown in FIG. 9.

FIG. 10 is a top view of a microphone cluster or sub-array 912 configured to accommodate the physical constraints of the microphone grille 820. More specifically, the sub-array 912 comprises four microphone elements 922a, 922b, 922c, and 922d (collectively referred to as microphone elements 922) placed in an "offset cross-pattern" that is designed to fit the diameter of the grille 820. The microphone elements 922 still form a cross-pattern like that in FIG. 9, but the placement of each element 922a, 922b, 922c, 922d is offset, or horizontally displaced, from the original cross-pattern location to accommodate a geometry of the grille 820. In embodiments, the offset cross-pattern may be achieved by radially shifting each of the elements 822a, 822b, 822c, and 822d shown in FIG. 9 in a clockwise direction around the array center 816 until the element falls inside the microphone grille 820. The amount of displacement for each element and the direction in which the element is shifted (e.g., forward, backward, right, left) may vary according to the geometry (e.g., size and shape) the grille 820. In the illustrated embodiment, each element 922 has been shifted in a different direction along the same horizontal plane, but the total amount of horizontal displacement (or distance travelled) is substantially uniform. In other embodiments, the amount of displacement may vary to accommodate other (e.g., non-circular) grille shapes, for example.

FIG. 11 is a side view of an exemplary microphone array 902 comprising the sub-array 912 from FIG. 10 stacked above a second sub-array 914 having the same offset cross-pattern configuration as the first sub-array 912. Due to the vertical placement and radial alignment, the sub-array 912 can serve as the front sub-array of the microphone array 902, and the second sub-array 914 can serve as the back sub-array, making the two similar in operation to the front and back sub-arrays 112 and 114 shown in FIG. 1. For example, the microphone elements 924 of the back sub-array 914 may be configured to completely cancel out any audio received at the sides of the front sub-array 912, or substantially perpendicular to the microphone elements 922.

According to embodiments, the geometry of the microphone elements 922 may be optimized further to accommodate certain acoustic constraints of the array 902. In particular, a working distance of the front sub-array 912 may be minimized due to the straight, or perfectly vertical, orientation of the microphone elements 922 forming the sub-array 912. For example, the output of the front sub-array 912 may be completely cancelled out by the output of the back sub-array 914, even in close proximity. Accordingly, in some embodiments, the working distance of the array 902 can be increased by tilting or angling the microphone elements 922 and 924 towards each other, such that at least a limited output is present in the near-field.

Figure 12:
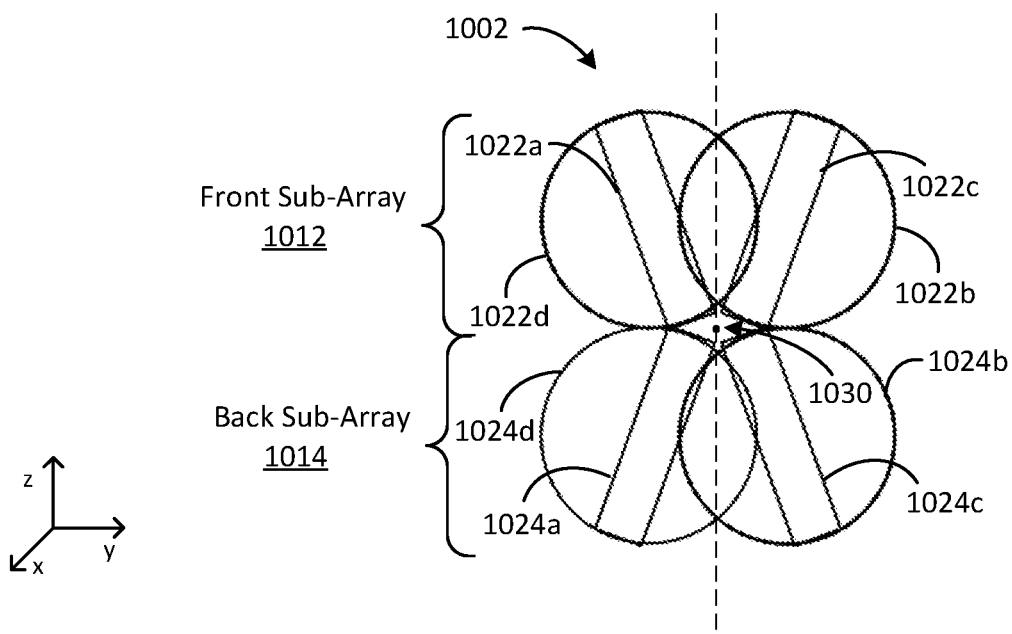
FIG. 12 is a schematic diagram illustrating a side view of another microphone array for implementing a proximity microphone, in accordance with one or more embodiments.

More specifically, FIG. 12 is a side view of another exemplary microphone array 1002 comprising a front sub-array 1012 and a back sub-array 1014 disposed a vertical distance below, and radially aligned with, the front sub-array 1012. In embodiments, the front sub-array 1012 comprises a plurality of microphone elements 1022a, 1022b, 1022c, 1022d (collectively referred to as "elements 1022") arranged in an offset cross-pattern, similar to the pattern formed by elements 922a, 922b, 922c, and 922d in FIGS. 10 and 11. Likewise, the back sub-array 1014 comprises a plurality of microphone elements 1024a, 1024b, 1024c, 1024d (collectively referred to as "elements 1024") arranged in an offset cross-pattern, similar to the pattern formed by elements 924a, 924b, 924c, and 924d in FIGS. 10 and 11. Unlike FIGS. 10 and 11, however, the microphone elements 1022 and 1024 are disposed in a tilted orientation configured to increase the working distance of the front sub-array 1012. The tilted orientation allows the microphone elements 1022 and 1024 to be placed in closer proximity to each other without changing the footprint or location of the elements 1022, 1024, for example, as compared to the straight orientation of FIG. 11. As a result, the overall footprint of the microphone array 1002 still fits within the geometry of the microphone grille 820, even though the individual elements 1022, 1024 are closer together.

In embodiments, the tilted orientation may be achieved by tilting or angling each of the microphone elements 1022, 1024 towards a center 1030 of the microphone array 1002. As shown in FIG. 12, by tilting all of the elements 1022, 1024 towards the center 1030, the interior-facing ends of each vertically-spaced pair of elements, such as, e.g., elements 1022a and 1024a, remain adjacent but the opposing, exterior-facing ends are pushed further apart. This arrangement of the microphone elements 1022 and 1024 allows for less than perfect cancellation between corresponding elements of the front and back sub-arrays 1012, 1014 (e.g., as compared to FIG. 11). As a result, the microphone array 1002 is able to produce at least a limited output at close proximity, or in the near field.

In embodiments, the exact polar response of the array 1002 may be a function of the amount of tilt (e.g., number of degrees) applied to each element 1022, 1024. For example, to achieve the tilted orientation, each microphone element 1022, 1024 may be tilted by the same number of degrees but in a different direction relative to the location of the element 1022, 1024. The exact number of degrees may be selected based on the geometry of the microphone grille 820, the geometry of the microphone elements 1022, 1024, the placement of the elements 1022, 1024 in each sub-array 1012, 1014, and/or a desired working distance for the array 1002. In a preferred embodiment, each microphone element 1022, 1024 is titled by +/−20 degrees, depending on the position of the element. In such cases, the polar response of the microphone array 1002 may be calculated using the equation: $[2*\sin(20 \text{ degrees})]*\cos(\Theta\text{-}90 \text{ degrees})$.

FIG. 3 is a plot 200 comparing signal attenuation of the proximity microphone 100 to that of a conventional microphone, to demonstrate that the proximity microphone 100 has a larger attenuation, or drop in sensitivity, at a distance than standard microphones, in accordance with embodiments. As shown, the proximity microphone 100 and the conventional microphone performed substantially the same at very small distances from the microphone. For example, at a distance of one inch from the microphone center, both the proximity microphone 100 and the conventional microphone exhibited little or no attenuation, as shown by lines 202 and 204, respectively. However, as distance increases, the proximity microphone 100 exhibits increasingly larger attenuation than the conventional microphone. For example, at a distance of two inches from the microphone center, the signal level of the proximity microphone 100, shown by line 206, drops significantly lower than the signal level of the conventional microphone, shown by line 208. The disparity in attenuation only increases, almost two-fold, at a distance of three inches from the microphone center, as shown by line 210 for the proximity microphone 100 and line 212 for the conventional microphone in plot 200.

FIGS. 4 and 5 illustrate a hybrid proximity microphone 300 configured to provide full range audio pick up at close range with high isolation in high SPL environments, in accordance with embodiments. The hybrid proximity microphone 300 comprises a first microphone array 302 that is similar to the microphone array 102 of the proximity microphone 100 shown in FIGS. 1, 2A, and 2B, but has the tilted, offset cross-pattern configuration shown in FIG. 12. The first microphone array 302 is coupled to a microphone support 304 of the microphone 300 for coupling to a handle (e.g., microphone handle 104 shown in FIG. 1), base, stand, or other component for supporting the microphone array 302. The microphone array 302 comprises a plurality of directional microphone elements 306 arranged in close proximity to each other and configured to capture near-field sounds within a first range of frequencies. For example, the directional microphone elements 306 may be clustered together and stacked in two layers, or rows, with opposing polarity, like the microphone array 102 shown in FIG. 1. As such, the first microphone array 302 may be configured to form a narrow, shallow lobe with close-range pick up directly in front of the microphone 300, similar to the microphone array 102 of the proximity microphone 100. In addition, the directional microphone elements 306 may be tilted towards each other and arranged in an offset cross-pattern configuration to increase a working distance of the array 302, as described with respect to FIG. 12.

Figure 6:
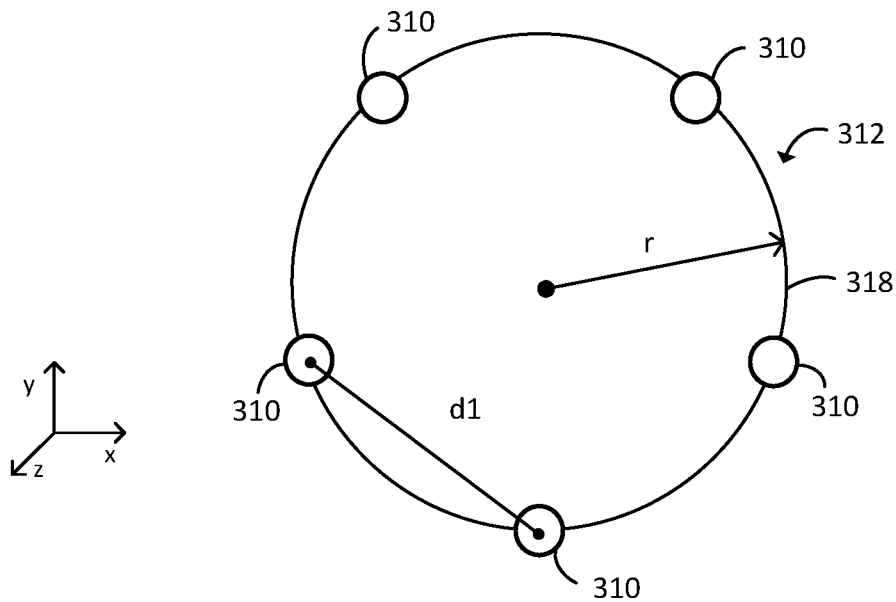
FIG. 6 is a block diagram illustrating a top view of an exemplary spatial microphone array in accordance with one or more embodiments.
Figure 7:
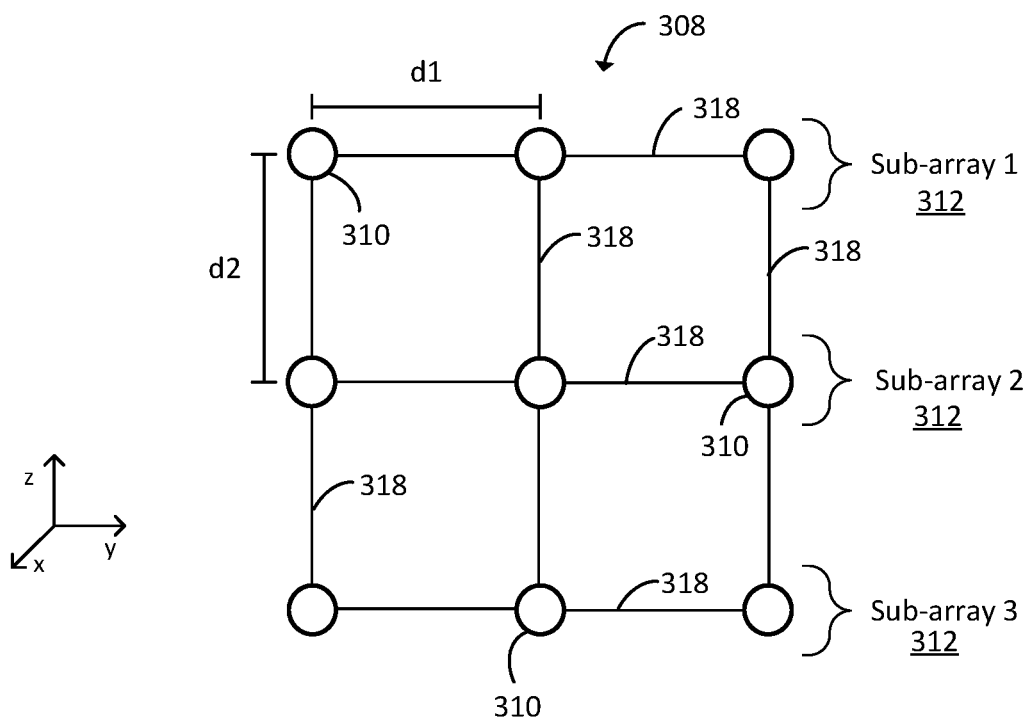
FIG. 7 is a side view of the spatial microphone array shown in FIG. 6 in accordance with one or more embodiments.

Referring additionally to FIGS. 6 and 7, the hybrid microphone 300 further comprises a second microphone array 308 comprising a plurality of omnidirectional microphone elements 310 arranged in a plurality of concentric rings or sub-arrays 312 and configured to capture near-field sounds within a second range of frequencies that is higher than the first frequency range covered by the first microphone array 302. As shown in FIGS. 4 and 5, the second microphone array 308 is disposed concentrically around the first microphone array 302 to form a spatial or three-dimensional array. The sub-arrays 312 can be vertically spaced apart from each other to form a stacked or layered configuration for the second array 308, as shown in FIGS. 4 and 7. Each sub-array 312 comprises a subset of the microphone elements 310 and may be formed by arranging the corresponding subset of elements 310 in a loop or other generally circular configuration (e.g., oval), and placing the elements 310 at equidistant intervals along said loop.

In embodiments, the second microphone array 308 is configured for operation above a cut-off frequency associated with the first microphone array 302 (or "proximity microphone array"). For example, the second microphone array 308 (or "spatial microphone array") may be configured for near-field acceptance at frequencies above 6.5 kilo-Hertz (kHz). The cut-off frequency of the first microphone array 302 may be determined, at least in part, by a size of the individual microphone elements 306 in the first array 302. More specifically, a size, or radius, of each element 306 may prevent the microphone elements 306 from being positioned close enough to each other to allow for certain high frequency coverage. For example, as will be appreciated, the distance between adjacent microphone elements within a given array can determine which frequency band or bands are optimally covered by the array. In the illustrated embodiment, because the depicted microphone elements 306 are circular capsules, each having a common radius, d, for example, the frequency response of the first microphone array 302 may be limited by the minimum possible distance between two adjacent capsules, or 2d. As described herein, this minimum distance between adjacent capsules also determines a working distance of the first microphone array 302 from a geometric center of the array. However, this working distance is only usable at frequencies below the cut-off frequency of the first microphone array 302, or at low and mid-range frequencies. Thus, the spatial microphone array 308 can be added to the directional microphone array 302 to create a usable work distance (e.g., 3-4 inches) at higher frequencies (such as, e.g., 6.5 kHz to 13 kHz).

Referring back to FIGS. 4-7, in some embodiments, the sub-arrays 312 of the second microphone array 308 are substantially identical to each other, in terms of microphone arrangement, overall size, and/or relative orientation, to optimize signal strength and provide high frequency performance. For example, the microphone elements 310 in each sub-array 312 may be arranged as illustrated in FIG. 6. More specifically, each sub-array 312 may include an equal number of microphone elements 310 spaced apart from each other at a uniform distance, d1. Further, each sub-array 312 may have a uniform radius, r, which may determine the amount of spacing between adjacent microphone elements 310 within each sub-array 312. In the illustrated embodiment, the second microphone array 308 includes a total of fifteen microphone elements 310 equally distributed across three sub-arrays 312, resulting in five microphone elements 310 per sub-array 312. In FIG. 7, a number of the microphone elements 310 are hidden from view. Namely, because FIG. 7 is a side view of the spatial microphone array 308, only three of the five microphone elements 310 in each of the sub-arrays 312 (e.g., sub-arrays 1, 2, and 3) are shown, as will be appreciated.

According to embodiments, the radius, r, for each sub-array 312 can be selected based on a number of factors, including, for example, an overall size of each microphone element 310, the number of microphone elements 310 in each sub-array 312, or the array 308 at large, coverage of desired frequency band(s) or octave(s) of interest, and/or an overall diameter of the first microphone array 302. In the case of the latter, the sub-array radius may be selected so that the second microphone array 308 is sufficiently large enough to completely surround the first array 302, as well as leave a required minimum distance between the two arrays 302 and 308 to ensure proper microphone performance. In a preferred embodiment, the radius of each sub-array 312 is approximately 0.75 inches, or a total diameter of approximately 1.5 inches, and is configured to optimally operate within a frequency range or octave of 6.5 kHz to 13 kHz.

In other embodiments, the number of microphone elements 310 in each sub-array 312 and/or the number of sub-arrays 312 in the second array 308 may vary. For example, in some embodiments, the microphone elements 310 may not be evenly distributed across the various sub-arrays 312, so that some sub-arrays 312 have more elements 310 than others. In some embodiments, the microphone array 308 may include more or fewer than three sub-arrays 312, for example, to accommodate lower or higher frequencies and/or to accommodate multiple frequency octaves. In some embodiments, the sub-arrays 312 may have varying radii to cover multiple and/or different octaves. For example, the sub-arrays 312 may be harmonically nested by selecting a progressively larger radius for each sub-array 312, so that the sub-arrays 312 cover progressively lower frequency octaves.

In embodiments, the sub-arrays 312 may be equally distributed from each other by placing a uniform vertical distance, d2, between adjacent sub-arrays 312, as shown in FIGS. 4 and 7. For example, in a preferred embodiment, the adjacent sub-arrays 312 are vertically spaced apart by approximately 0.35 inches. Other vertical spacing values may be selected for the array 308 based on, for example, an overall size of the microphone 300, coverage of a desired frequency band or octave, and/or other suitable factors. In some embodiments, the sub-arrays 312 can be stacked on top of each other and exactly aligned, so that the sub-arrays 312 are also radially-aligned, as shown in FIGS. 4 and 5. For example, the sub-arrays 312 may be oriented in the same direction, so that each microphone element 310 is vertically aligned with at least one element 310 from each of the other sub-arrays 312. In other embodiments, the sub-arrays 312 may be purposely misaligned, or radially offset from each other, to avoid axial alignment of any two microphone elements 310.

As shown in FIGS. 6 and 7, the microphone 300 may further include a support 318 that is coupled to, or supports, the second microphone array 308. The support 318 may be any type of support (e.g., printed circuit board (PCB), flex circuit, substrate, frame, etc.) and may have any size or shape suitable for supporting the three-dimensional shape of the second microphone array 308 and/or for surrounding the first microphone array 302 (e.g., circular, cylindrical, rectangular, hexagonal, etc.). In embodiments, each of the microphone elements 310 may be mechanically and/or electrically coupled to the support 318. For example, in the case of a PCB or flex circuit, the microphone elements 310 may be electrically coupled to the support 318, and the support 318 may be electrically coupled to one or more processors or other electronic device for receiving and processing audio signals captured by the microphone elements 310. In some embodiments, the support 318 includes more than one component for supporting the microphone elements 310, such as, e.g., a separate support for each sub-array 312. In other embodiments, the support 318 is a single unit, and all of the microphone elements 310 are coupled to the singe unit (e.g., a flex circuit).

In embodiments, the microphone elements 310 can be MEMS transducers or any other type of omnidirectional microphone. Appropriate beamforming techniques (e.g., using beamformer 504 shown in FIG. 15) can be applied to the microphone elements 310 of the second microphone array 308 to create a single, forward-facing, three-dimensional array lobe configured to pick up audio only from a front of the microphone 300, similar to the narrow, controlled beam pattern formed by the first microphone array 302. In some embodiments, the microphone elements 310, or the array lobe formed thereby, can be steered towards a desired direction (e.g., other than directly in front of the microphone 300) using appropriate beamforming or DSP techniques, as will be appreciated.

In a preferred embodiment, two additive techniques are combined to create the array lobe for the spatial array 308. First, the microphone elements 310 within each sub-array 312 may be individually summed together to generate a single planar, broadside lobe for that sub-array 312. The resulting lobe may be shaped to provide narrow pick up at the front and back sides of the sub-array 312. Then, the rear lobe may be removed from the planar lobes of the sub-arrays 312 using delay and sum beamforming techniques. To achieve this result, the sub-arrays 312 may be collectively treated as an end-fire array, with the planar sub-array lobes serving as the individual "elements" of the end-fire array. In addition, the sub-array lobes may be delayed so as to provide a coherent signal, using the speed of sound propagation to set the delay amount, which may be based on the spacing between adjacent sub-arrays 312 and/or the overall height of the spatial array 308. Other suitable beamforming techniques may also be used to combine the audio signals captured by microphone elements 310 into a single output for the overall spatial microphone array 308, as will be appreciated.

In embodiments, the final array lobe generated for the second microphone array 308 may have different sensitivity than the lobe generated for the first microphone array 302. One or more filters with appropriate gain components may be applied to the outputs of the arrays 302 and/or 308 in order to match the different sensitivities. The exact gain value for each filter may be determined based on the working distance of the first microphone array 302, a location of the sound source relative to the first microphone array 302, as well as other suitable factors. In some cases, appropriate DSP techniques may be used to apply such filters.

In some embodiments, the outputs of the first and second microphone arrays 302 and 308 may also be filtered (e.g., also using appropriate DSP techniques) to account for the different frequency response characteristics of the two arrays. For example, the first microphone array 302 may be configured to optimally operate in close proximity within a certain frequency range (e.g., below 7000 Hz), and the second microphone array 308 may be configured or tuned for operation in frequencies that are higher than that frequency range (e.g., above 7000 Hz). As described herein, at higher frequencies (i.e. above 7000 Hz), the first microphone array 302 may begin to exhibit undesirable omnidirectional behavior, instead of the cancellation-type behavior for which the first array 302 is designed. To avoid this omnidirectional response, the output of the first microphone array 302 may be coupled to a low pass filter with a cut-off frequency tuned to match that of the first array 302 (e.g., around 7000 Hz), and the output of the second microphone array 308 may be coupled to a high pass filter configured to accept frequencies above that cut-off frequency (e.g., above 7000 Hz).

Figure 8A:
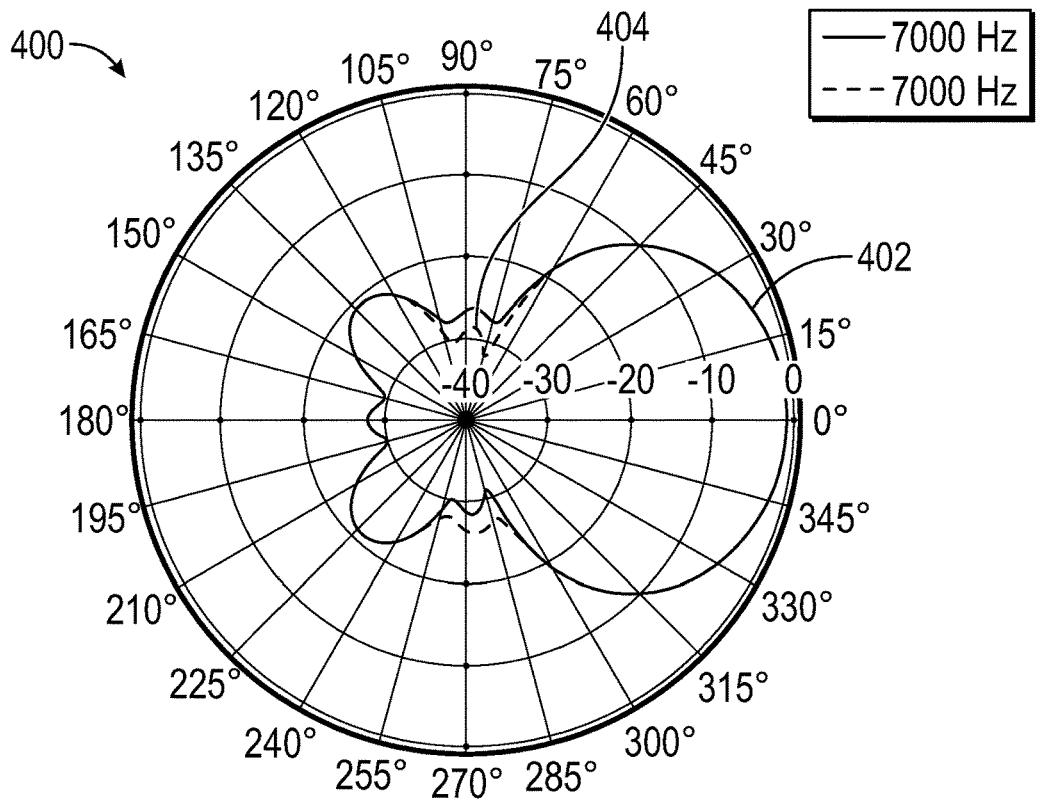
FIGS. 8A, 8B, and 8C are polar response plots for the spatial microphone array of FIGS. 6 and 7 in accordance with one or more embodiments.
Figure 8B:
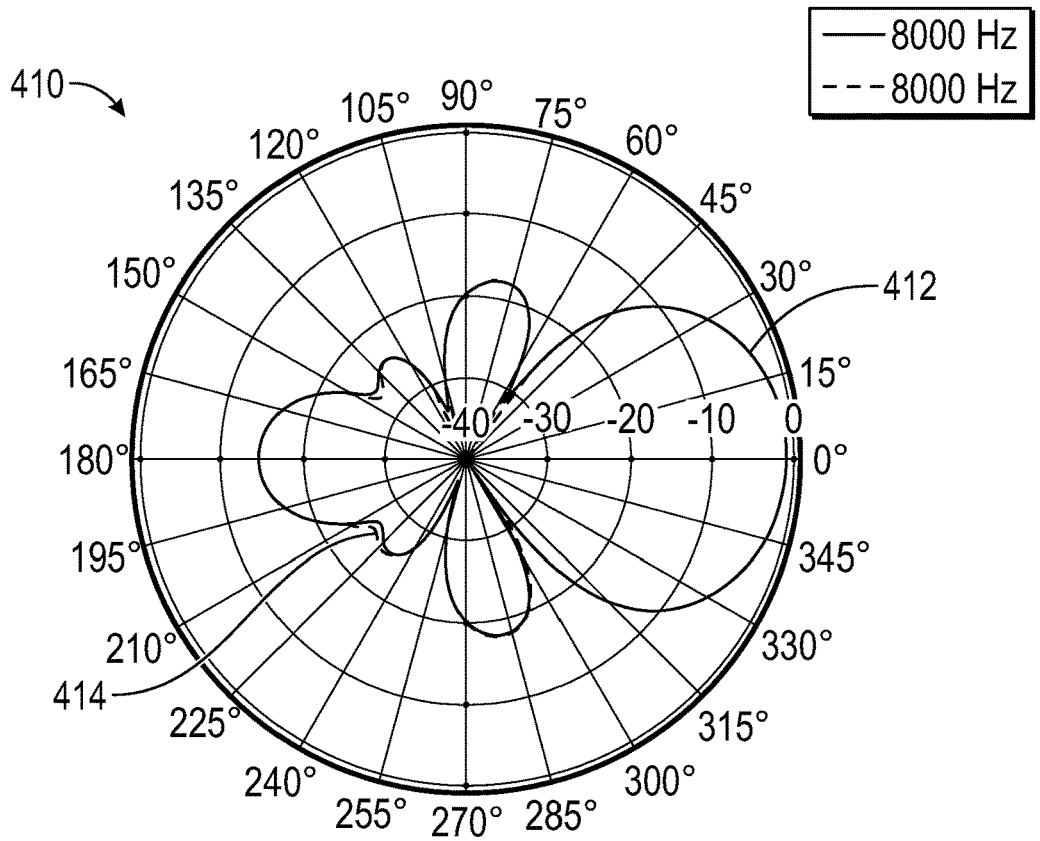
Figure 8C:
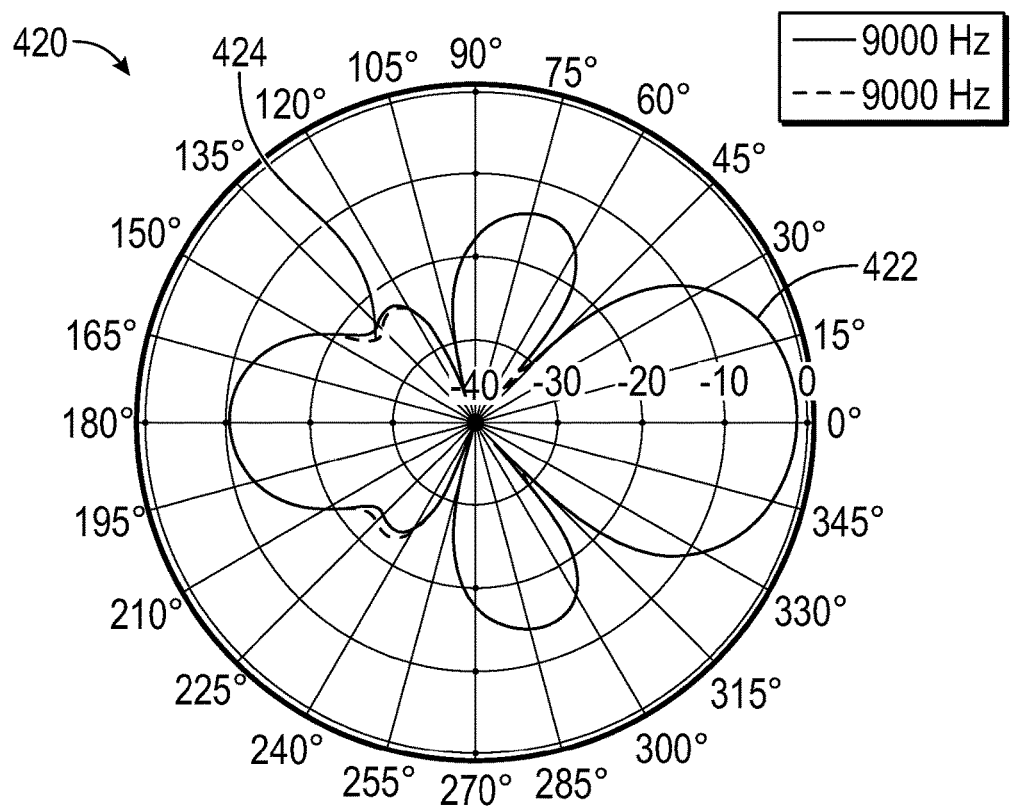

FIGS. 8A, 8B, and 8C are polar response plots for a spatial microphone array, like the second microphone array 308 shown in FIGS. 4-7, in accordance with embodiments. The plots show the final array lobe generated by the second microphone array 308 at various high frequencies in accordance with the techniques described herein. In each case, the resulting polar pattern is forward-facing and substantially narrow, especially at higher frequencies, and is uniform along at least two axes of the spatial microphone array, namely the x-axis and the y-axis.

More specifically, FIG. 8A depicts a polar response plot 400 for the second microphone array 308 at 7000 Hertz (Hz). Curve 402 illustrates the on-axis, or unsteered, frequency response of the array 308 along the x-axis. Curve 404 also shows the on-axis performance of the array 308, but along the y-axis. As shown, the two curves 402 and 404 are substantially similar, especially at the forward-facing portions of the lobes.

Similarly, FIG. 8B depicts a polar response plot 410 for the second microphone array 308 at 8000 Hertz (Hz). Curve 412 represents the on-axis, or unsteered, frequency response of the array 308 along the x-axis, while curve 414 shows the on-axis performance along the y-axis. As in plot 400, the two patterns 412 and 414 shown in plot 410 are substantially similar, with respect to both the forward-facing and rear-facing portions of the lobes.

Likewise, FIG. 8C depicts a polar response plot 420 for the second microphone array 308 at 9000 Hertz (Hz). Curve 422 represents the on-axis performance of the array 308 along the x-axis, while curve 424 shows the on-axis performance along the y-axis. Like the other two plots 400 and 410, the two patterns 422 and 424 of the plot 420 are also substantially similar, for both the forward-facing and rear-facing portions of the lobes.

FIG. 13 illustrates an exemplary microphone system 500 for implementing one or more of the microphone arrays described here, in accordance with embodiments. The microphone system 500 comprises a plurality of microphone elements 502, a beamformer 504, and an output generation unit 506. Various components of the microphone system 500 may be implemented using software executable by one or more computers, such as a computing device with a processor and memory, and/or by hardware (e.g., discrete logic circuits, application specific integrated circuits (ASIC), programmable gate arrays (PGA), field programmable gate arrays (FPGA), etc.). For example, some or all components of the beamformer 504 may be implemented using discrete circuitry devices and/or using one or more processors (e.g., audio processor and/or digital signal processor) (not shown) executing program code stored in a memory (not shown), the program code being configured to carry out one or more processes or operations described herein. Thus, in embodiments, the system 500 may include one or more processors, memory devices, computing devices, and/or other hardware components not shown in FIG. 5. In a preferred embodiment, the system 500 includes at least two separate processors, one for consolidating and formatting all of the microphone elements and another for implementing DSP functionality.

The microphone elements 502 may include the microphone elements included in any of the proximity microphone 100 shown in FIG. 1, the hybrid microphone 300 shown in FIGS. 4 and 5, the proximity microphone array shown in FIGS. 1 and 2, the spatial microphone array 308 shown in FIGS. 6 and 7, the microphone elements 822 shown in FIG. 9, the microphone elements 922 shown in FIGS. 10 and 11, the microphone elements 1022 shown in FIG. 12, the proximity microphone array 1100 shown in FIG. 16, and/or other microphone designed in accordance with the techniques described herein. In embodiments, the microphone elements 502 may be MEMS transducers that are inherently omnidirectional, other types of omnidirectional microphones, electret or condenser microphones, or other types of omnidirectional transducers or sensors. In a preferred embodiment, the microphone elements 502 are MEMS microphones.

The beamformer 504 may be in communication with the microphone elements 502 and may be used to beamform audio signals captured by the microphone elements 502. In embodiments, the beamformer 504 may include one or more components to facilitate processing of the audio signals received from the microphone elements 502, such as, e.g., microphone combining beamformer 600 of FIG. 14, delay and sum beamformer 700 of FIG. 15, sum and difference beamformer 1300 of FIG. 19, and/or virtual microphone combining beamformer 1400 of FIG. 20. The output generation unit 506 may be in communication with the beamformer 504 and may be used to process the output signals received from the beamformer 504 for output generation via, for example, loudspeaker, telecast, etc.

Other beamforming techniques may also be performed by the beamformer 504 to obtain a desired output as described herein. For example, for the hybrid microphone 300 shown in FIGS. 4 and 5, the beamformer 504 may be configured to aggregate an output of the proximity microphone array 302 with an output of the spatial microphone array 308 in order to generate a final output for the overall hybrid microphone 300 capable of covering a full range of audio frequencies (e.g., 20 hertz (Hz)≤f≤20 kilohertz (kHz)). In some cases, the beamformer 504 can be configured to match the sensitivities of the individual arrays 302 and 308 using filters (e.g., cross-over filtering), limit the frequencies covered by each of the arrays 302 and 308, and/or applying appropriate gain amounts to the individual array outputs.

Referring now to FIG. 14, microphone combining beamformer 600 may be configured to combine audio signals captured by a number, n, of omnidirectional microphone elements 602 (e.g., Microphone 1 to Microphone n) included in a given sub-array (e.g., sub-array 312 shown in FIG. 6) and generate a combined output signal having a directional polar pattern for the sub-array formed by said microphone elements 602, in accordance with embodiments. As an example, for the spatial microphone array 308 shown in FIGS. 4-7, the microphone elements 602 may be the subset of omnidirectional microphone elements 310 that are arranged in a loop to form one of the sub-arrays 312 of the array 308. In some embodiments, the beamformer 600 may be configured to treat each sub-array 312 as a broadside array, since the microphone elements 310 of each sub-array 312 are arranged broadside, or perpendicular to a preferred direction of sound arrival, as shown in FIGS. 4 and 5. For example, the beamformer 600 may generate a combined output for the sub-array formed by the microphone elements 602 by simply summing together the audio signals received from the microphone elements 602.

More specifically, as shown in FIG. 14, the beamformer 600 may receive individual audio signals from each of the microphone elements 602 and may provide said signals to a combiner network 604 of the beamformer 600. The combiner network 604 may be configured to combine or sum the received signals to generate a combined sub-array output for the microphone elements 602. For example, the combiner network 604 may include a plurality of adders or other summation elements capable of simply summing or aggregating the various audio signals together.

According to embodiments, the output generated for each sub-array by the beamformer 600 may be a single, planar broadside lobe with narrow pick up at the front and back of the sub-array. More specifically, though the microphone elements 602 themselves may be omnidirectional, the combined output of these elements 602 may be directional due to the geometry of the sub-arrays. For example, in the case of omnidirectional microphones arranged in a circular sub-array, or other ring-like configuration (e.g., as shown in FIG. 6), the omnidirectional patterns of the various elements may conflict with each other, such that the resulting sub-array output is bi-directional, or otherwise provides narrow pickup at both the front and back of the ring.

Referring now to FIG. 15, delay and sum beamformer 700 may be configured to combine a plurality of sub-array outputs 702 for a given microphone array to form a final, forward-facing combined output for the overall array, in accordance with embodiments. The sub-array outputs 702 may be received from the microphone combining beamformer 600 shown in FIG. 14, or one or more other beamformers included in the microphone system 500 (such as, e.g., beamformer 1400 shown in FIG. 20). As an example, for the spatial microphone array 308 shown in FIGS. 4-7, the delay and sum beamformer 700 may receive three sub-array outputs 702 from the microphone combining beamformer 600, one for each of the three sub-arrays 312 in the spatial array 308. According to embodiments, the beamformer 700 may be configured to remove the rear portions, or lobes, from the directional, or bi-directional, sub-array outputs 702 generated by the beamformer 600, thus leaving only the forward-facing portions for the combined array output.

More specifically, in order to obtain the desired array output, the beamformer 700 may be configured to treat the spatial microphone array 308 as a linear end-fire array comprised of three elements, namely sub-arrays 1, 2, and 3 shown in FIG. 7. Like the elements of an end-fire array, the vertically-stacked sub-arrays 312 are arranged in-line with the direction of on-axis sound propagation, or aligned along a vertical axis that is orthogonal to a top of the microphone 300. As a result, sound may reach sub-array 1 before reaching sub-arrays 2 and 3, and so on, thus creating different arrival times for the sound picked up by each sub-array 312.

As will be appreciated, in a differential end-fire array, the signal captured by the front microphone in the array (i.e. the first microphone reached by sound propagating on-axis) may be summed with an inverted and delayed version of the signal captured by the rear microphone in the array (i.e. positioned opposite the front microphone) to produce cardioid, hypercardioid, or supercardioid pickup patterns, for example. In such cases, the sound from the rear of the array is greatly or completely attenuated, while the sound from the front of the array has little or no attenuation. In accordance with embodiments, the beamformer 700 may be configured to combine the individual sub-array outputs 702 using similar techniques, in order to obtain a single, planar, forward-facing pick-up pattern for the overall array 308. For example, the beamformer 700 may apply appropriate delay and sum techniques to sum the combined output 702 of the front sub-array (e.g., sub-array 1) with inverted and delayed versions of the outputs 702 for the rear sub-arrays (e.g., sub-arrays 2 and/or 3), thus generating an overall combined array output that has the desired forward-facing lobe.

As shown in FIG. 15, the beamformer 700 may provide the individual sub-array outputs 702 to a delay network 704. The delay network 704 may be configured to introduce or add an appropriate time delay to each of the sub-array outputs 702. The amount of delay may be selected based on a spacing between the sub-arrays (e.g., distance d2 in FIG. 7), speed of sound propagation, a desired polar pattern, and/or other suitable factors. The delayed signal outputs may then be provided to the sum or summation network 706. The summation network 706 may be configured to combine or aggregate the signals received from the delay network 704 to create a combined output for the overall array (e.g., spatial array 308). According to embodiments, the delay network 704 may include a plurality of delay elements for applying appropriate delay amounts to respective microphone signals, and the summation network 706 may include a plurality of adders or other summation elements capable of summing the outputs received from the delay elements. In some embodiments, the summation network 706 may further include a gain element (not shown) configured to apply an appropriate amount of gain to the delayed output of the delay network 704, for example, in order to obtain a desired polar pattern and/or match the outputs of the various sub-arrays in terms of magnitude.

FIGS. 16-20 illustrate various aspects of an exemplary proximity microphone that is implemented using a microphone array comprised only of omnidirectional microphones and is configured to capture near-field sounds and reject far-field sounds within a predetermined range of frequencies (e.g., about 20 Hz to about 18.5 kHz) and at a predetermined working distance (e.g., less than about four inches or less than about three inches), in accordance with embodiments.

In particular, FIG. 16 illustrates an exemplary proximity microphone array 1100 comprising a plurality of omnidirectional microphone elements 1102 arranged in a spatial or three-dimensional configuration that is substantially similar to the second microphone array 308 (or spatial array) included in the hybrid proximity microphone 300 shown in FIGS. 4 through 7. For example, like the omnidirectional microphone elements 310 of the second array 308, the omnidirectional microphone elements 1102 of the proximity microphone array 1100 (also referred to herein as a "spatial array") can be arranged in a plurality of concentric rings or sub-arrays 1104 that are similarly sized and are vertically spaced apart from each other to form a stacked or layered configuration. Also, each microphone element 1102 can be located in a respective one of the sub-arrays 1104, such that each sub-array 1104 comprises a subset of the microphone elements 1102. Each sub-array 1104 may be formed by arranging the corresponding subset of elements 1102 in a circle or other loop-like shape (e.g., oval) and placing the elements 1102 at substantially equidistant intervals around the circle, as shown in FIGS. 16 and 17. Thus, like the sub-arrays 312 of the spatial array 308, the sub-arrays 1104 of the spatial array 1100 have a substantially uniform radius, substantially equal spacing between the microphone elements 1102 in each sub-array 1104, and a substantially uniform vertical distance between adjacent sub-arrays 1104. And like the microphone elements 310, the microphone elements 1102 can be MEMS transducers or any other type of omnidirectional microphone. While FIG. 16 shows the microphone elements 1102 residing on a cylindrical surface, it should be appreciated that the spatial microphone array 1100 may be implemented using any suitable type of support, including, for example, the support 318 described herein.

Figure 18:
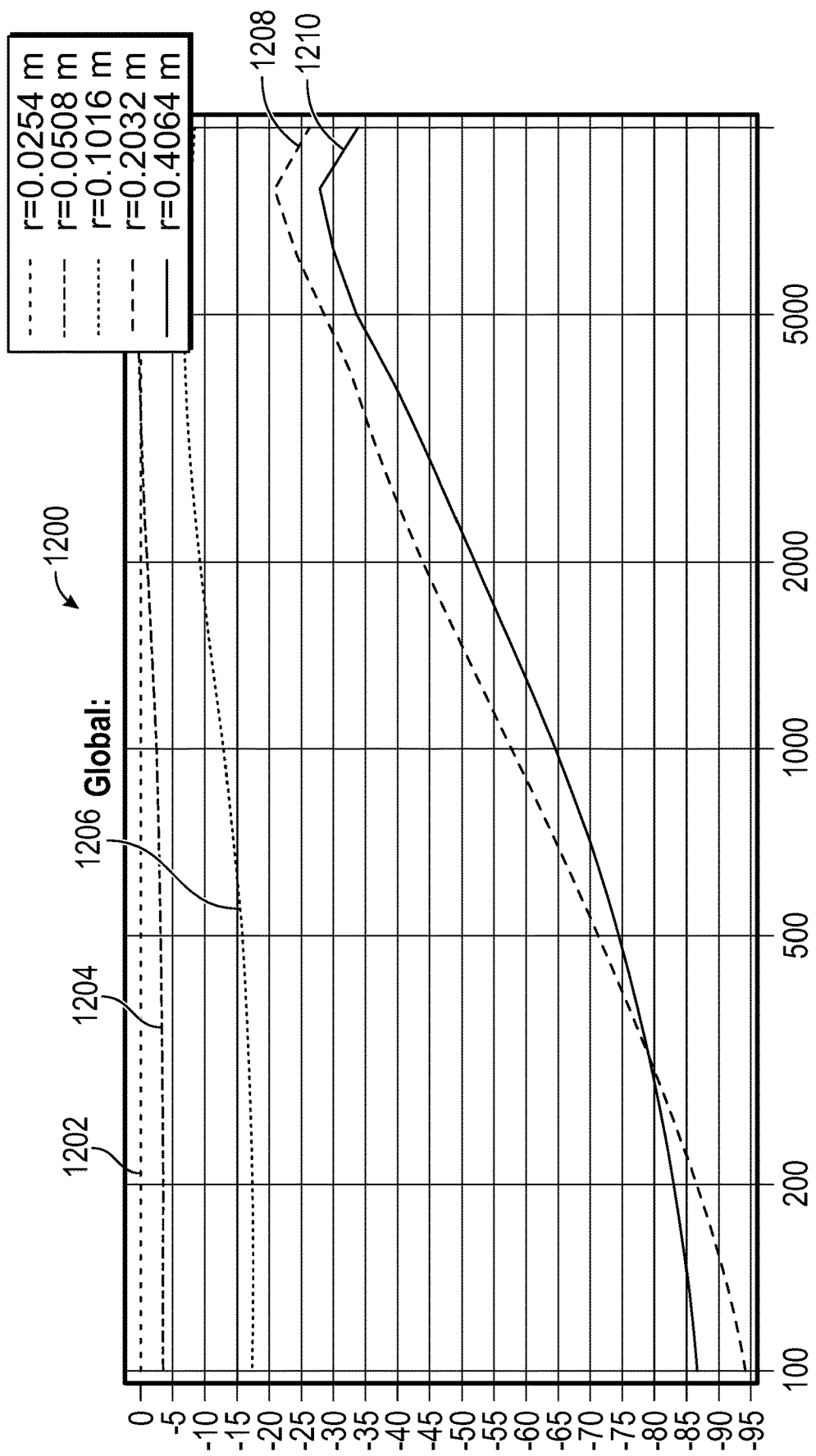
FIG. 18 is a graph illustrating responses measured at various distances from a center of the proximity microphone array of FIG. 16, in accordance with one or more embodiments.
Figure 19:
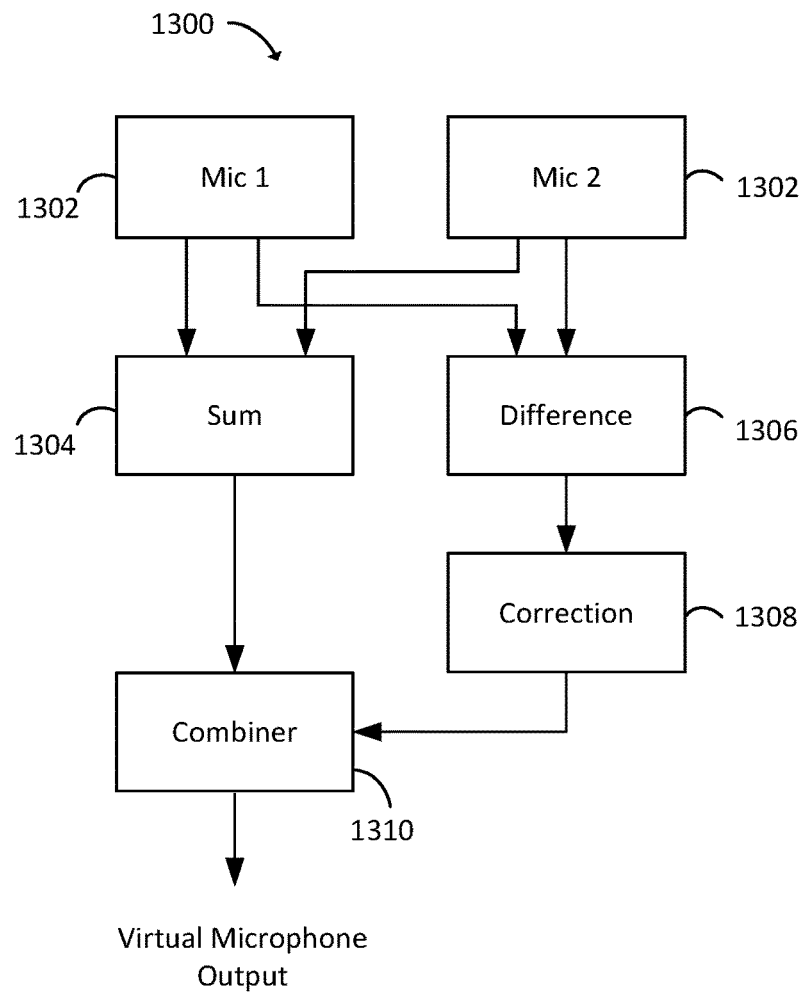
FIG. 19 is a block diagram of an exemplary sum and difference beamformer included in the microphone system of FIG. 13, in accordance with one or more embodiments.
Figure 20:
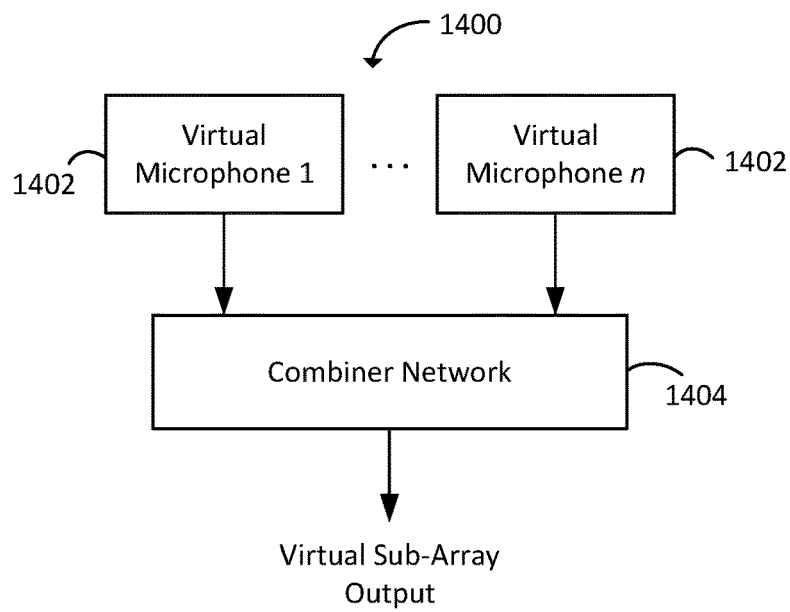
FIG. 20 is a block diagram of an exemplary virtual microphone combining beamformer included in the microphone system of FIG. 13, in accordance with one or more embodiments.

Unlike the second microphone array 308, however, the spatial array 1100 is configured to optimally operate in close proximity across all or most of the audible frequency range (e.g., 20 Hz to 20 kHz), for example, as shown in FIG. 18, rather than at only certain high frequencies. For example, in some embodiments, the spatial array 1100 is configured to provide near-field acceptance at frequencies ranging from 20 Hz up to 18 kHz. These features of the spatial array 1100 are achieved by applying certain beamforming techniques (e.g., as shown in FIGS. 19 and 20) to select pairs of the omnidirectional microphone elements 1102 and further combining the outputs of those pairs to produce a forward-facing directional polar pattern that mimics the cancellation-type behavior of the condenser microphone elements 306 within a desired working distance, but also extends this behavior to the entire range of applicable frequencies. In various embodiments, the usable working distance of the spatial array 1100 is about two inches or less, about three inches or less, or about four inches or less from a center of the array 1100. Thus, the all-omnidirectional microphone array 1100 can provide full range audio pick up at close range with high isolation in high SPL environments, similar to the hybrid proximity microphone 300, but without requiring the use of condenser or other inherently directional microphones.

As an example, FIG. 18 shows a frequency response plot 1200 demonstrating the on-axis frequency response of the proximity microphone array 1100 for sound sources located at various distances from a center of the spatial array 1100 and across a wide range of frequencies (e.g., 100 Hz to 10 kHz). Responses were measured at increasing distances from the center of the spatial array 1100, starting at about one inch, or 0.0254 m, for a first response curve 1202 and doubling in distance for each subsequent response curve 1204-1210. As will be appreciated, normal on-axis losses for a traditional microphone are about 6 decibels (dB) per doubling of distance. The response plot 1200, or more specifically, curves 1202 and 1204, show losses of less than 6 dB within the desired working distance (e.g., about 2 inches) across the depicted frequency range. However, outside that working distance, the microphone response is reduced at a much greater rate and over the entire range, for example, as shown by curves 1206, 1208, and 1210.

More specifically, the response plot 1200 is normalized to the near field response, so that the first response curve 1202 is fixed at a loss of 0 dB at about 0.0254 m from the sound source across all applicable frequencies. A second response curve 1204 shows a loss of about 0 to 4 dB at approximately 2 inches, or 0.0508 m, across all applicable frequencies. A third response curve 1206 shows a loss of about 8 to 18 dB at approximately 4 inches, or 0.1016 m, across all applicable frequencies. A fourth response curve 1208 shows a loss of about 20 to 95 dB at approximately 8 inches, or 0.2032 m. And a fifth response curve 1210 shows a loss of about 27 to 87 dB at approximately 16 inches, or 0.4064 m, across all applicable frequencies.

Referring back to FIGS. 16 and 17, shown is an exemplary technique for utilizing a geometry of the spatial array 1100 to enable full range frequency coverage at close proximities using only the omnidirectional microphone array. In particular, embodiments include pairing select omnidirectional microphone elements 1102 from the different sub-arrays 1104 based on (1) an angle formed by the paired elements 1102 relative to an x-y plane of the array 1100 and (2) a spacing between the paired elements 1102. The paired microphone elements 1102 are then combined (e.g., using beamformers 1300 and 1400) to re-create the inherent directionality of the condenser microphones in the microphone array 1002 of FIG. 12, for example.

As illustrated in FIG. 17, the geometry of the spatial array 1100 may be substantially similar to that of the second microphone array 308 shown in FIG. 7. For example, each sub-array 1104 includes a subset of the microphone elements 1102, and the elements 1102 of each sub-array 1104 are disposed equidistant from each other, or spaced apart by a uniform horizontal distance, d1. In the embodiment shown in FIG. 16, the spatial array 1100 includes a total of fifteen microphone elements 1102 equally distributed across three sub-arrays 1104a, 1104b, and 1104c, resulting in five microphone elements 1102 per sub-array 1104, like the second microphone array 308.

Further, the sub-arrays 1104, themselves, may be equally spaced apart from each other, or separated by a uniform vertical distance, d2, also like the array 308. As shown in FIG. 17, this means central sub-array 1104b is positioned equidistant from top sub-array 1104a and bottom sub-array 1104c. In one exemplary embodiment, adjacent sub-arrays 1104 are vertically spaced apart by a distance of approximately 0.35 inches.

In addition, a radius, r, of the circle formed by each sub-array 1104 (e.g., as shown in FIG. 6) can be selected based on an overall size of each microphone element 1102, the number of microphone elements 1102 in each sub-array 1104, overall microphone size concerns, coverage of desired frequency band(s) or octave(s) of interest, as well as other factors, similar to the array 308. In one exemplary embodiment, the radius of each sub-array 1104 is approximately 0.75 inches, or a total diameter of approximately 1.5 inches, and is configured to optimally operate within a frequency range or octave of 20 Hz to 18.5 KHz.

Another geometrical component of the spatial array 1100 is a uniform diagonal distance, d3, between the microphone elements 1102 of adjacent sub-arrays 1104, as shown in FIG. 17. The diagonal distance d3, is measured between a given microphone element 1102 in the central sub-array 1104b and any one of the microphone elements 1102 disposed diagonally up or down and to either the left or the right of the given element. For example, a first microphone element 1102a in the central sub-array 1104b may be spaced apart from a second microphone element 1102b in the top sub-array 1104a by the diagonal distance d3. Likewise, the distance between the first microphone element 1102a and a third microphone element 1102c in the bottom sub-array 1104c may be equal to the diagonal distance d3. In embodiments, the diagonal distance, d3, may be determined based on other dimensions of the array 1100, such as, e.g., the uniform horizontal distance, d1, between adjacent microphone elements 1102, the uniform vertical distance, d2, between adjacent sub-arrays 1104, and/or the radius, r, of each sub-array 1104. In one embodiment, the diagonal distance, d3, is equal to about 0.8 in (or 21 millimeters (mm)).

To achieve bidirectionality behavior using the omnidirectional microphone elements 1102, each element 1102 of the central sub-array 1104b may be used to create two distinct microphone pairs: one for forming a virtual front microphone that mimics the front microphones 1022a shown in FIG. 12 and one for forming a virtual back microphone that mimics the back microphone 1022b. Using the microphone elements 1102 of the central sub-array 1104b to create both the front and back bidirectional pattern formations minimizes the spacing between adjacent virtual microphones, which can increase a bandwidth of the overall array. For example, this technique allows the virtual microphones to be spaced closer together than the condenser microphones shown in FIG. 12, thus enabling the spatial array 1100 to have a higher cut-off frequency than that of the condenser array.

In embodiments, the virtual front microphones can be created by pairing the microphone elements 1102 of the central sub-array 1104b with select microphone elements 1102 from the top sub-array 1104a that satisfy prescribed angular and spacing parameters. Likewise, the virtual back microphones can be created by pairing the microphone elements 1102 of the central sub-array 1104b with select microphone elements 1102 from the bottom sub-array 1104c that also satisfy prescribed angular and spacing parameters.

In embodiments, the angular parameter sets a requisite value, $\Theta$, for the angle at which the microphone pair tilts relative to an x-y plane of the spatial array 1100. This angle can set or establish a direction of greatest acceptance for the bidirectional formation represented by the resulting virtual microphone. Moreover, the working distance can be dependent on the angle, $\Theta$. In some cases, the angle or amount of tilt may be selected to mimic or re-create the tilted condenser microphones in FIG. 12. In one embodiment, the angle, $\Theta$, is +/−about 25 degrees. As shown in FIG. 16, in some embodiments, a first angular parameter may be used to select microphone pairs for forming the virtual front microphones, and a second angular parameter that is substantially equal in value (or number of degrees) but opposite in direction may be used to select microphone pairs for forming the virtual back microphones. By assigning opposing directionalities to the virtual front and back microphones in this manner, the resulting outputs purposely conflict, or cancel each other out, to an extent, leaving only a narrow pick-up angle for detecting sounds in close proximity.

Also in embodiments, the spacing parameter sets a requisite value for the amount of space or distance between the microphone elements 1102 forming a given microphone pair. This spacing can set or determine an ideal in-speech bandwidth of the bidirectional pattern formation represented by the resulting virtual microphone. In particular, the requisite distance can be selected to meet a minimum amount of space required between the paired microphone elements 1102 in order to have a well-formed bidirectional pattern, or a bidirectional formation with maximum side rejection within the frequencies that are compatible with speech. In one embodiment, the spacing value is selected so that the virtual microphone exhibits ideal bidirectional behavior within a bandwidth of about 250 Hz to 5.6 kHz, but still provides good side rejection in the frequencies above and below this range. In the illustrated embodiment, the spacing value is equal to the diagonal distance, d3, and is the same for each microphone pair, regardless of the directionality. The presence of uniform inter-microphone spacing for each microphone pair ensures uniformity in the polar patterns created for the virtual front and back microphones and enables the virtual microphones to fully mimic bi-directional microphone cartridges.

In the illustrated embodiment, when creating microphone pairs to form a virtual front microphone, the first angular parameter and the spacing parameter can be satisfied by selecting the microphone element 1102 in the top sub-array 1104*a* that is shifted clockwise by one position relative to the position of a given microphone element 1102 in the central sub-array 1104*b*. For example, FIG. 16 shows a first virtual front microphone being formed by pairing a first microphone element 1102*a* located in a first position of the central sub-array 1104*b* with a second microphone element 1102*b* located in a second position of the top sub-array 1104*a*. As illustrated, the distance between the two microphone elements 1102*a* and 1102*b* is equal to the diagonal distance d3, and the pair extends at the angle, Θ, relative to the x-y plane.

Likewise, when creating microphone pairs to form a virtual back microphone, the second angular parameter and the spacing parameter can be satisfied by selecting the microphone element 1102 in the bottom sub-array 1104*c* that is shifted clockwise by one position relative to the position of a given microphone element 1102 in the central sub-array 1104*b*. For example, FIG. 16 shows a first virtual back microphone being formed by pairing the first microphone element 1102*a* located in the first position of the central sub-array 1104*b* with a third microphone element 1102*c* located in a second position of the bottom sub-array 1104*c*. As shown, the distance between the two microphone elements 1102*a* and 1102*c* is equal to the diagonal distance d3, and the pair extends at the angle, Θ, relative to the x-y plane.

As indicated by the arrows shown in FIG. 16, the fifteen microphone elements 1102, distributed across three sub-arrays 1104, can be combined or linked to form ten distinct microphone pairs, with each element 1102 in the central sub-array 1104*b* being used to create two separate pairs. According to embodiments, each pair of omnidirectional microphone elements 1102 can be independently processed using a first beamforming component, such as, e.g., sum and difference beamformer 1300 shown in FIG. 19, to form a virtual microphone that mimics the bidirectional behavior of either the front microphone 1022*a* or the back microphone 1022*b* shown in FIG. 12. For example, half, or five, of the microphone pairs shown in FIG. 16 may be combined to form virtual front microphones, while the other half may be combined to form virtual back microphones.

A second beamforming component, such as, e.g., virtual microphone combining beamformer 1400 shown in FIG. 20, can be used to combine or aggregate the virtual front microphones to form a virtual front sub-array that mimics or represents the front sub-array 1012 shown in FIG. 12, and combine the various virtual back microphones to create a virtual back sub-array that represents the back sub-array 1014 shown in FIG. 12. Finally, the output representing the virtual front sub-array and the output representing the virtual back sub-array can be combined or summed together using a third beamforming component to remove the rear lobe from the planar lobes of the virtual front and back sub-arrays and thus generate a single forward-facing output for the spatial array 1100 with low sensitivity at large distances (e.g., far-field) and high or peak sensitivity at short distances (e.g., near-field), on-axis. In this manner, the spatial array 1100 can be configured to produce a limited output only for sounds at close proximity, or in the near field, similar to the final output of the array 1002.

More specifically, FIG. 19 depicts a sum and difference beamformer 1300 configured form a bidirectional (or other directional) output based on audio signals captured by, and received from, a given set or pair of omnidirectional microphones 1302. In particular, beamformer 1300 may be configured to use appropriate sum and difference techniques on the first and second microphones 1302 to form virtual microphones, or bidirectional outputs with narrowed lobes (or sound pick-up patterns) in both front and back directions, for example, as compared to the full omni-directional polar pattern of the individual microphones 1302. The beamformer 1300 can be included in beamformer 504 or otherwise form part of the microphone system 500 shown in FIG. 13. For example, an output of the beamformer 1300 may be provided to one or more other components of the beamformer 504, such as, e.g., virtual microphone combining beamformer 1400 shown in FIG. 20.

In embodiments, the output produced by the beamformer 1300 may represent one of the virtual microphones shown in FIG. 16. In such cases, the first and second microphones 1302 can be arranged in two different locations of a microphone array that satisfy certain angular and spacing parameters associated with said array, for example, as described herein with respect to the spatial array 1100. As an example, the first microphone 1302 (e.g., Mic 1) may include one of the microphone elements 1102 included in the central sub-array 1104*b* of the spatial array 1100, and the second microphone 1302 (e.g., Mic 2) may include the microphone element 1102 in either the top sub-array 1104*a* or the bottom sub-array 1104*c* that is shifted one position over, going clockwise, from the first microphone 1302.

As shown in FIG. 19, the beamformer 1300 comprises a summation component 1304 and a difference component 1306. During operation, a first audio signal received from the first microphone 1302 (e.g., Mic 1) and a second audio signal received from the second microphone 1302 (e.g., Mic 2) are provided to the summation component 1304, as well as the difference component 1306. The summation component 1304 can be configured to calculate a sum of the first and second audio signals (e.g., Mic 1+Mic 2) to generate a combined or summed output for the pair of microphones 1302. The difference component 1306 may be configured to subtract one of the audio signals from the other (e.g., Mic 1−Mic 2 or Mic 2−Mic 1) to generate a differential signal or output for the first and second microphones 1302. As an example, the summation component 1304 may include one or more adders or other summation elements, and the difference component 1306 may include one or more invert-and-sum elements.

According to embodiments, a location of the second microphone 1302 (e.g., Mic 2) relative to the first microphone 1302 (e.g., Mic 1) within the proximity microphone array can determine the order in which the audio signals are subtracted by the difference component 1306. In general, the difference component 1306 can be configured to subtract a back, or rear, audio signal from a front audio signal (e.g., F-R). Thus, if the second microphone 1302 is located closer to a front of the array than the first microphone 1302 (e.g., the pairing of microphone elements 1102a and 1102b to form a virtual front microphone in FIG. 16), the difference component 1306 will subtract the audio signals generated by the first microphone 1302 from the audio signals generated by the second microphone 1302 (e.g., Mic 2–Mic 1 in FIG. 13, or F1-R1 in FIG. 16). Conversely, if the first microphone 1302 is closer to the front of the array (e.g., the pairing of microphone elements 1102a and 1102c to form a virtual back microphone in FIG. 16), the difference component 1306 will subtract the audio signals of the second microphone 1302 from the audio signals of the first microphone 1302 (e.g., Mic 1–Mic 2 in FIG. 13, or F2-R2 in FIG. 16). In some embodiments, the beamformer 1300 may be configured to determine whether the first microphone element 1302 (e.g., Mic 1) is at the front or back of a given microphone pair and select the appropriate subtraction order based thereon. In other embodiments, the beamformer 1300 may be configured to determine whether the first microphone element 1302 is being used to create a virtual front microphone or a virtual back microphone and select the subtraction order accordingly.

Beamformer 1300 further comprises a correction component 1308 for correcting the differential output generated by the difference component 1306. The correction component 1308 can be configured to correct the differential output for a gradient response caused by the difference calculation. For example, the gradient response may give a 6 dB per octave slope to the frequency response of the microphone pair. In order to generate a first-order polar pattern (e.g., bidirectional) for the microphone pair over a broad frequency range, the differential output must be corrected so that it has the same magnitude as the summation output. In a preferred embodiment, the correction component 1308 applies a correction value of $(c*d)/(j*\omega*f)$ to the differential output to obtain a corrected differential output for the microphone pair 1302 (e.g., $(F-R)*((c*d)/(j*\omega*f))$), where c equals the speed of sound in air at 20 degrees Celsius, d equals the distance between the first and second microphones 1302 (e.g., d3), $\Theta$ equals the angular frequency, and f equals the frequency of the audio signal being corrected. In some cases, a second magnitude correction may be performed to match the sensitivity of the difference component to that of the summation component.

The beamformer 1300 also includes a combiner 1310 configured to combine or sum the summed output generated by the summation component 1304 and the corrected difference output generated by the correction component 1308. The combiner 1310 thus generates a combined output signal with a directional polar pattern (e.g., bidirectional) from the input signals provided by the pair of omnidirectional microphones 1302. In this manner, the beamformer 1300 can be used to create a virtual microphone output that mimics the behavior of a bidirectional microphone, like the condenser microphones shown in FIG. 12.

FIG. 20 illustrates an exemplary virtual microphone combining beamformer 1400 configured to combine or aggregate a number, n, of virtual microphones 1402 (e.g., Virtual Microphone 1 to Virtual Microphone n) to generate a combined output signal with a directional polar pattern, in accordance with embodiments. Each virtual microphone 1402 can be a virtual microphone output generated by the beamformer 1300 of FIG. 19, and the combined output may represent a virtual sub-array comprised of the n virtual microphones 1402. For example, the individual virtual front microphone outputs generated using the beamformer 1300 can be combined using the beamformer 1400 to create a virtual front sub-array output that mimics the front sub-array 1012 shown in FIG. 12. Likewise, the individual virtual back microphone outputs generated using the beamformer 1300 can be combined using the beamformer 1400 to create a virtual back sub-array output that mimics the back sub-array 1014 shown in FIG. 12.

As shown in FIG. 20, the beamformer 1400 comprises a combiner network 1404 configured to receive individual input signals from each of the virtual microphones 1402 and combine or sum the received signals to generate the combined virtual sub-array output. As an example, the combiner network 1404 may include a plurality of adders or other summation elements capable of simply summing or aggregating the various audio signals together.

The front and back virtual sub-array outputs generated by the beamformer 1400 are provided to a third beamformer to produce a combined array output for the overall microphone array. In some embodiments, the third beamformer is a sub-array combining beamformer that simply sums the two outputs. For example, the third beamformer may be substantially similar to the beamformer 1400 shown in FIG. 20 and therefore, is not shown for the sake of brevity. In such cases, the third beamformer can be configured to receive first and second virtual sub-array outputs from the beamformer 1400, instead of virtual microphone outputs 1402, and combine or aggregate the first and second virtual sub-array signals using a combiner like the combiner network 1404 shown in FIG. 20 and described herein.

In other embodiments, each virtual sub-array output generated by the beamformer 1400 may be provided to the delay and sum beamformer 700 shown in FIG. 15 to produce a combined array output for the overall microphone array that is specifically tailored for handling high frequency signals. As will be appreciated, in the case of spatial array 1100, the beamformer 700 will receive two sub-array outputs, as opposed to the three sub-array outputs received for the second microphone array 308. Other than that difference, the beamformer 700 may apply the same delay and sum beamforming techniques (e.g., as described herein with respect to FIG. 15) to the virtual sub-array outputs in order to generate the combined array output. For example, the beamformer 700 can be configured to remove the rear lobes from the planar lobes of the virtual sub-arrays by treating the two virtual sub-arrays as the elements of a differential end-fire array, as described herein.

Thus, the techniques described herein provide a high performance microphone capable of near-field acceptance and broadband far-field cancellation with high isolation in harsh and high sound pressure level (SPL) environments, as well as high gain before feedback. Some embodiments of the microphone include multiple directional microphone elements arranged in a close-coupled array with a geometry configured to "hear" sounds only at close range (e.g., 4 inches or less), or in the near-field, and to reject sounds that are a "reasonable" distance away (e.g., more than 4 inches), or in the far-field. Other embodiments further include a spatial array disposed concentrically around the first array and comprising a plurality of omnidirectional microphone elements arranged in multiple rings, or circular sub-arrays. The spatial array may be configured to minimize far-field acceptance above a cutoff frequency (e.g., 6.5 kHz) of the first array, while the first array may be configured for far-field rejection up to and including the cutoff frequency, thus enabling the microphone to provide full range audio coverage overall. Still other embodiments forgo the first array and manipulate just the spatial array of omnidirectional microphones to achieve the same results as the directional and omnidirectional combination. In either case, the microphone may be especially suited for vocal use in loud, noisy environments.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A proximity microphone comprising:
   a microphone array comprising a plurality of omnidirectional microphone elements arranged in a plurality of concentric sub-arrays, each sub-array comprising a respective subset of the microphone elements, the subsets of microphone elements being vertically aligned, and the sub-arrays being arranged in a stacked configuration, wherein the plurality of sub-arrays have a substantially uniform radius of less than one inch, substantially equal spacing between the microphone elements in each sub-array, and a substantially uniform vertical distance between adjacent sub-arrays;
   at least one support coupled to each of the plurality of sub-arrays, the at least one support configured to support the stacked configuration of the sub-arrays and provide a clear acoustic path between a first microphone element in a first one of the sub-arrays and a second microphone element in a second one of the sub-arrays that is located diagonally from the first microphone element,
   wherein the microphone array has a peak sensitivity at a working distance of less than about four inches from the center of the microphone array.

2. The proximity microphone of claim 1, wherein the microphone array is configured to capture near field sounds and reject far field sounds within a frequency range of about 20 hertz (Hz) to about 18.5 kilohertz (kHz).

3. The proximity microphone of claim 1, wherein each sub-array is formed by arranging a subset of the plurality of microphone elements in a circle having the uniform radius.

4. The proximity microphone of claim 1, wherein each omnidirectional microphone element is a micro-electrical mechanical system (MEMS) microphone transducer.

5. The proximity microphone of claim 1, further comprising a first beamforming component configured to form first and second bidirectional outputs based on audio signals received from first and second pairs of the omnidirectional microphone elements, respectively.

6. The proximity microphone of claim 5, further comprising a second beamforming component configured to:
   form a first sub-array output by combining a first plurality of bidirectional outputs generated by the first beamforming component, and
   form a second sub-array output by combining a second plurality of bidirectional outputs generated by the first beamforming component.

7. The proximity microphone of claim 6, wherein the plurality of sub-arrays includes a top sub-array, a central sub-array, and a bottom sub-array, and the first plurality of bidirectional outputs is formed by pairing each microphone element in the central sub-array with a respective one of the microphone elements in the top sub-array, and the second plurality of bidirectional outputs is formed by pairing each microphone element in the central sub-array with a respective one of the microphone elements in the bottom sub-array.

8. The proximity microphone of claim 6, further comprising a third beamforming component configured to generate a forward-facing output for the microphone array by combining the first sub-array output with the second sub-array output.

9. A microphone comprising:
   a microphone array comprising a plurality of omnidirectional microphone elements arranged in a plurality of concentric sub-arrays, each microphone element being located in a respective one of the sub-arrays, the sub-arrays being vertically aligned and arranged in a stacked configuration, and the plurality of sub-arrays comprising a top sub-array, a central sub-array, and a bottom sub-array, wherein the microphone array has a peak sensitivity at a working distance of less than about four inches from the center of the microphone array, and the plurality of sub-arrays have a substantially uniform radius of less than one inch;
   at least one support coupled to each of the plurality of sub-arrays, the at least one support configured to support the stacked configuration of the sub-arrays and provide a clear acoustic path between a first microphone element in a first one of the sub-arrays and a second microphone element in a second one of the sub-arrays that is located diagonally from the first microphone element; and
   one or more beamforming components configured to:
      form a first plurality of bidirectional outputs by pairing each microphone element in the central sub-array with a respective one of the microphone elements in the top sub-array;
      form a second plurality of bidirectional outputs by pairing each microphone element in the central sub-array with a respective one of the microphone elements in the bottom sub-array; and
      generate a forward-facing output for the microphone array based on the first and second bidirectional outputs.

10. The proximity microphone of claim 9, wherein the one or more beamforming components are further configured to:
   form a first virtual sub-array output by combining the first plurality of bidirectional outputs;
   form a second virtual sub-array output by combining the second plurality of bidirectional outputs; and generate the forward-facing output for the microphone array by combining the first virtual sub-array output with the second virtual sub-array output.

11. The proximity microphone of claim 9, where the plurality of sub-arrays have having substantially equal spacing between the microphone elements in each sub-array and a substantially uniform vertical distance between adjacent sub-arrays.

12. The proximity microphone of claim 9, wherein each omnidirectional microphone element is a micro-electrical mechanical system (MEMS) microphone transducer.

13. The proximity microphone of claim 9, wherein the microphone array is configured to capture near field sounds and reject far field sounds within a frequency range of about 20 hertz (Hz) to about 18.5 kilohertz (kHz).

14. A proximity microphone comprising:
- a microphone array comprising a plurality of microphone elements arranged in a plurality of layers, the layers being stacked such that each microphone element of a given layer is vertically aligned with respective microphone elements in the other layers, wherein the microphone array has a peak sensitivity at a working distance of less than about four inches from the center of the microphone array, and the plurality of layers have a substantially uniform radius of less than one inch;
- at least one support configured to support the plurality of layers of the microphone array and provide a clear acoustic path between a first microphone element in a first one of the layers and a second microphone element in a second one of the layers that is located diagonally from the first microphone element.

15. The proximity microphone of claim 14, wherein the microphone array is configured to capture near field sounds and reject far field sounds within a frequency range of about 20 hertz (Hz) to about 18.5 kilohertz (kHz).

16. The proximity microphone of claim 14, wherein the plurality of microphone elements comprise micro-electrical mechanical system (MEMS) microphone transducers.

17. The proximity microphone of claim 14, wherein the plurality of microphone elements comprise condenser microphone capsules.

\* \* \* \* \*

UNITED STATES PATENT AND TRADEMARK OFFICE
CERTIFICATE OF CORRECTION

PATENT NO. : 12,028,678 B2
APPLICATION NO. : 17/086082
DATED : July 2, 2024
INVENTOR(S) : Brent Robert Shumard et al.

It is certified that error appears in the above-identified patent and that said Letters Patent is hereby corrected as shown below:

In the Specification

Column 27, Line 51, "$\Theta$" should be changed to --$\omega$--.

In the Claims

Claim 11, Column 31, Line 5, "have having" should be changed to --have--.

Signed and Sealed this
Fifteenth Day of April, 2025

Coke Morgan Stewart
*Acting Director of the United States Patent and Trademark Office*